United States Patent [19]
Lightfoot et al.

[11] Patent Number: 5,621,728
[45] Date of Patent: Apr. 15, 1997

[54] LEVEL 1 GATEWAY CONTROLLING BROADBAND COMMUNICATIONS FOR VIDEO DIAL TONE NETWORKS

[75] Inventors: Regina Lightfoot, New Carrollton, Md.; Bill Goodman, Collegeville, Pa.; Bahman Amin-Salehi, Washington, D.C.; Ulric E. Arthur, Burtonsville, Md.; John A. Bigham, Pottstown, Pa.; Kamran Sistanizadeh, Arlington, Va.

[73] Assignee: Bell Atlantic Network Services, Inc., Arlington, Va.

[21] Appl. No.: 413,812

[22] Filed: Mar. 28, 1995

Related U.S. Application Data

[63] Continuation-in-part of Ser. No. 304,174, Sep. 12, 1994.

[51] Int. Cl.$^6$ .................................................. H04L 12/56
[52] U.S. Cl. ............................ 370/60.1; 370/58.1; 370/79; 370/94.1
[58] Field of Search ........................... 370/60.1, 60, 94.1, 370/79, 94.2, 58.1, 110.1, 95.1, 58.2, 15; 455/4.2, 5.1; 380/20, 10; 348/10, 12, 8, 7; 379/90

[56] References Cited

U.S. PATENT DOCUMENTS

| | | | |
|---|---|---|---|
| 4,506,387 | 3/1985 | Walter | 455/612 |
| 4,949,187 | 8/1990 | Cohen | 358/335 |
| 4,963,995 | 10/1990 | Lang | 358/335 |
| 4,987,486 | 1/1991 | Johnson et al. | 358/86 |
| 5,027,400 | 6/1991 | Baji et al. | 380/20 |
| 5,057,932 | 10/1991 | Lang | 358/335 |
| 5,067,123 | 11/1991 | Hyodo et al. | 370/58.1 |
| 5,130,792 | 7/1992 | Tindell et al. | 358/85 |
| 5,132,992 | 7/1992 | Yurt et al. | 375/122 |
| 5,133,079 | 7/1992 | Ballantyne et al. | 455/4.1 |
| 5,218,602 | 6/1993 | Grant et al. | 370/58.2 |
| 5,231,494 | 7/1993 | Wachob | 358/146 |
| 5,247,347 | 9/1993 | Litteral et al. | 358/85 |
| 5,253,275 | 10/1993 | Yurt et al. | 375/122 |
| 5,426,699 | 6/1995 | Wunderlich et al. | 380/20 |
| 5,467,212 | 11/1995 | Huber | 359/168 |
| 5,477,263 | 12/1995 | O'Callaghan et al. | 348/7 |

*Primary Examiner*—Wellington Chin
*Assistant Examiner*—Melissa Kay Carman
*Attorney, Agent, or Firm*—Lowe, Price, LeBlanc & Becker

[57] ABSTRACT

In advanced digital networks for providing selective point-to-point communications between subscribers terminals and broadband server equipment operated by a plurality of independent information service providers, routing through the network is controlled by functionality identified as a Level 1 Gateway. In an enhanced video dial tone network additionally providing an array of broadcast services from multiple providers, the Level 1 Gateway also provides high level control over at least some of the broadcast services. The Level 1 Gateway will perform a variety of functions including communications port management of transmissions of information between subscribers and servers, processing of billing information and session management. The Level 1 Gateway generates menus of providers and broadcast services, either as a function of providers and services available through a particular portion of the network or in a customized fashion specified by individual subscribers. The Level 1 Gateway may also provide a PIN number functionality, e.g. to permit parents to limit which providers and broadcast services that their children can access. The Level 1 Gateway is itself an interactive device in that subscribers can input information and receive display information from the Gateway to define or modify their own video dial tone service through the network.

14 Claims, 21 Drawing Sheets

FIGURE 2A

```
*********************
*    PLEASE CALL     *
*   1-800-###-####   *
*   TO SUBSCRIBE TO  *
*    BELL ATLANTIC   *
*   VIDEO DIAL TONE  *
*       SERVICES     *
*********************
```

FIGURE 2B

```
***********************
*     YOUR VIDEO      *
*      PROVIDER       *
*    PREFERENCE IS    *
*   NOT RECOGNIZED    *
*     -----------     *
*   PLEASE STANDBY    *
*    FOR A MENU OF    *
*   VIDEO PROVIDERS   *
***********************
```

FIGURE 2C

```
*************************
*     WELCOME TO        *
*    BELL ATLANTIC      *
*   VIDEO DIAL TONE     *
*       SERVICES        *
*************************
```

FIGURE 2D

VIDEO PROVIDERS: XX

QQ  QQQQQQQQQQQQQQQ
QQ  QQQQQQQQQQQQQQQ
QQ  QQQQQQQQQQQQQQQ
QQ  QQQQQQQQQQQQQQQ
QQ  QQQQQQQQQQQQQQQ
QQ  QQQQQQQQQQQQQQQ
QQ  QQQQQQQQQQQQQQQ
QQQQQQQQQQQQQQQ

FIGURE 2E

```
*************************
*   PLEASE   STANDBY    *
*   FOR CONNECTION      *
*         TO            *
*   QQQQQQQQQQQQQ       *
*************************
```

FIGURE 2F

```
*************************
*      TEMPORARY        *
*   NETWORK PROBLEMS    *
*      ---------        *
*   PLEASE  TRY  AGAIN  *
*          LATER        *
*************************
```

FIGURE 2G

```
*********************
*    TEMPORARY      *
* NETWORK PROBLEMS  *
*     ---------     *
* PLEASE  TRY AGAIN *
* LATER OR SELECT   *
* ANOTHER PROVIDER  *
*********************
```

FIGURE 2H

```
*********************
* THIS PROVIDER IS  *
*   CURRENTLY NOT   *
*     AVAILABLE     *
*     ---------     *
* PLEASE  TRY AGAIN *
*       LATER       *
*********************
```

FIGURE 2I

```
***********************
*   THIS  PROVIDER  IS    *
*     CURRENTLY  NOT      *
*        AVAILABLE        *
*         ---------       *
*   PLEASE   TRY  AGAIN   *
*   LATER OR SELECT       *
*   ANOTHER  PROVIDER     *
***********************
```

FIGURE 2J

```
***********************
*    THIS  PROVIDER'S     *
*      PORTS ARE BUSY     *
*         ---------       *
*    PLEASE   TRY  AGAIN  *
*           LATER         *
***********************
```

FIGURE 2K

```
***********************
*  THIS PROVIDER'S    *
*   PORTS ARE BUSY    *
*      ----------     *
*  PLEASE  TRY  AGAIN *
*  LATER  OR  SELECT  *
*  ANOTHER  PROVIDER  *
***********************
```

FIGURE 2L

```
***********************
*  YOUR  CONNECTION   *
*  TO  THIS  PROVIDER *
*  HAS  BEEN  DENIED  *
*      ----------     *
*  PLEASE   CONTACT   *
*    THE  PROVIDER    *
***********************
```

FIGURE 2M

```
* * * * * * * * * * * * * * * * * * *
*         TECHNICAL                 *
*                                   *
*        DIFFICULTIES               *
*                                   *
*          ---------                *
*                                   *
*       PLEASE CALL YOUR            *
*                                   *
*       SET TOP PROVIDER            *
*                                   *
* * * * * * * * * * * * * * * * * * *
```

LEVEL 1 GATEWAY CONTROLLING BROADBAND COMMUNICATIONS FOR VIDEO DIAL TONE NETWORKS

CROSS-REFERENCE TO RELATED APPLICATION

This application is a continuation-in-part of pending U.S. patent application Ser. No. 08/304,174 filed Sep. 12, 1994, the disclosure of which is incorporated herein by reference in its entirety.

TECHNICAL FIELD

The present invention relates to routing and access control and billing functionalities in video distribution networks capable of providing subscribers with access to multiple information service providers.

ACRONYMS

The written description and drawings use a large number of acronyms to refer to various services and system components. Although generally known, use of several of these acronyms is not strictly standardized in the art. For purposes of this discussion, acronyms therefore will be defined as follows:

Asymmetrical Digital Subscriber Line (ADSL)
Asynchronous Transfer Mode (ATM)
ATM Adaptation Layer (AAL)
ATM cell Adaptation Unit (AAU)
ATM Packet Demultiplexer (APD)
Broadcast (BC)
Broadcast Consolidation Section (BCS)
Broadcast Service Area (BSA)
Carrier Access Billing System (CABS)
Cell Loss Priority (CLP) bit
Central Office (CO)
Customer Record Information System (CRIS)
Customer Premises Equipment (CPE)
Digital Cross-connect Switch (DCS)
Digital Entertainment Terminal (DET)
Drop and Continue (D/C)
Electrical to Optical (E/O)
Ethernet (ENET)
First-In-First-Out (FIFO) buffers
Header Error Check (HEC) word
Integrated Services Digital Network (ISDN)
Interactive Multimedia Television (IMTV)
Level 1 (L1)
Level 1 Gateway (L1GW)
Level 2 (L2)
Level 2 Gateway (L2GW)
Local Loop Distribution (LLD) network
Local Video Access Node (LVAN)
Media Access Control (MAC)
Moving Pictures Experts Group (MPEG)
Network Interface Controller (NIM)
Network Interface Device (NID)
Operations and Support System (OSS)
Optical to Electrical (O/E)
Over-the-Air (OTA)
Packetized Elementary Streams (PES)
Payload Type (PT)
Pay-Per-View (PPV)
Permanent Virtual Circuit (PVC)
Permanent Virtual Circuit Controller (PVCC)
Personal Identification Number (PIN)
Physical Layer Convergence Protocol (PLCP)
Plain Old Telephone Service (POTS)
Program Identification (PID) number
Program Reference Clock (PRC)
Public Access Channel (PAC)
Public Switched Network (PSN)
Quadrature Amplitude Modulation (QAM)
Quadrature Phase-Shift Keyed (QPSK) modulation
Time-Division Multiple Access (TDMA)
Vestigial Sideband (VSB) modulation
Video Dial Tone (VDT)
Video Information Provider (VIP)
Video Information User (VIU)
Video Network Hub (VNH)
Video Provider Service Center (VPSC)

BACKGROUND ART

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were available for the new programming. However, programming was generally prescheduled, with the viewer left to tune to the designated channel at the appointed time to view a particular program.

To increase revenues, cable television systems have initiated distribution of premium channels viewable only by subscribers having appropriate descramblers. The subscriber tunes the descrambler to receive a premium channel, descramble the video and audio information and supply a signal capable of reception on a standard television set. Pay-per-view programs, which evolved later, include recently released movies, live concerts and popular sporting events. Subscribers wishing to view a pay-per-view program place an order with the cable operator. At the designated time, the subscriber's descrambler is activated by some control from the cable operator to permit viewing of the pay-per-view programming. However, the subscriber is still restricted to viewing the programming at the scheduled time. There is no capability of delivering programming to a subscriber on demand, that is, immediately or at a subscriber-specified time and date.

More recently, several different wideband digital distribution networks have been proposed for offering subscribers an array of video services, including true Video On Demand service. The following U.S. Patents disclose representative examples of such digital video distributions networks: U.S. Pat. No. 5,253,275 to Yurt et al., U.S. Pat. No. 5,132,992 to Yurt et al., U.S. Pat. No. 5,133,079 to Ballantyne et al., U.S. Pat. No. 5,130,792 to Tindell et al., U.S. Pat. No. 5,057,932 to Lang, U.S. Pat. No. 4,963,995 to Lang, U.S. Pat. No. 4,949,187 to Cohen, U.S. Pat. No. 5,027,400 to Baji et al., and U.S. Pat. No. 4,506,387 to Walter. In particular, Litteral et al. U.S. Pat. No. 5,247,347 discloses a digital video distribution network providing subscribers with access to multiple Video On Demand service providers through the public switched telephone network, as described in more detail below.

U.S. Pat. No. 5,247,347 to Litteral et al., the disclosure of which is hereby incorporated in its entirety into this disclosure by reference, discloses an enhanced public switched telephone network which also provides a video on demand service to subscribers over the public switched telephone network. A menu of video programming information is displayed at the subscriber's premises by a set-top terminal and a TV set. The subscriber may transmit ordering information via the public switched telephone network to the independent video information providers. Video programming may be accessed and transmitted to the subscriber directly from a video information provider (VIP) or through a video buffer located at a central office (CO) serving the subscriber.

Connectivity between the central office and the subscriber for transmission of video data is provided by an asymmetrical digital subscriber line (ADSL) system. ADSL interface units at the central office multiplex digital video information with voice information to be transmitted to the subscriber and support two-way transmission between the subscriber's line and the X.25 packet data network of one or more control channels. A complimentary ADSL interface unit at the subscriber's premises separates downstream video control signals and voice telephone signals from the line and multiplexes upstream control signals and voice telephone signals onto the line.

A subscriber can request transmission of video data using a telephone instrument by dialing a Voice Response Unit (VRU) of a video gateway device, through the voice telephone switch and dialing in selection information. Alternatively, the user can access the video gateway device and select a video using a remote control device, the set-top terminal and the control signaling channel through the network. The VIP's equipment identifies the requested title and determines if the title is available.

If the title is found, the corresponding data file is opened and a reserve idle communications port is identified for transmission of the video data to an input node of a digital cross-connect switch (DCS). The video data file is transmitted from the VIP's video storage device, through the DCS, to the designated ADSL interfaces for transmission to the requesting subscriber's premises. The ADSL interface on the subscriber premises demultiplexes the broadband program transmission off of the subscriber loop and applies the digital data stream to a decoder unit in the set-top terminal. The decoder unit decompresses the audio and video data, and converts the digital audio and video to corresponding analog signals. The decoder can supply baseband analog audio and video signals to a television receiver, or these analog signals can be modulated to a standard television channel frequency for use by the television receiver.

The prior art video networks have not addressed many problems which arise when the networks must be adapted to provide end users with equal access to multiple video information providers. For example, the prior art documents do not suggest an efficient procedure for accumulating usage data and billing for the switched network broadband connectivity to multiple providers. Also, the prior art systems have not addressed the need for the interactions of the end users with the video dial tone network to be readily adaptable to end user demands as well as the need to provide equal access to all of the broadcast and interactive service providers available to each end user. Thus a need clearly exists for an enhanced network control and billing system, which is both efficient and highly user friendly.

DISCLOSURE OF THE INVENTION

The principle object of the present invention is to provide a seamless, smooth approach for connecting a video information user (VIU) to the video information provider (VIP) of their choice, in a multiple provider environment. The connection to the VIP of choice must be provided in a non-discriminatory manner that makes it easy for the user to get to that particular provider.

One more specific objective of the present invention is to provide effective techniques for billing for the communication connectivity services between multiple information service providers and end users through a broadband network.

Another objective of the present invention is to provide efficient techniques for informing subscribers of information service providers available to them through the network and responding to subscriber selections of providers to establish communication between subscribers and providers. This objective might include development of enhanced techniques for offering subscriber menus of available VIP's and or a VIP's.

A further objective of the present invention is to develop enhanced mechanisms to allow an end user to interact with a selective connectivity broadband communication network to customize services provided to that subscriber through the network.

Another objective of the invention is to provide enhanced control over establishment of communications between a subscriber and a particular information service provider, e.g. so that only authorized subscribers of that provider can communicate and/or so that subscribers can personally limit who can use their network service to access a particular provider.

Another objective is to develop network control means, providing one or more of the required enhanced functionalities discussed above, which is readily adaptable to use in a variety of different types of video distribution networks.

The present invention provides a number of the detailed network features needed to offer a truly effective video dial tone service. In particular, the present invention provides a number of enhanced network functionalities through a gateway node, referred to as the 'Level 1 Gateway'. In a network providing access to multiple service providers, the user identifies the provider of choice to the Level 1 Gateway. In response, the Level 1 Gateway controls the broadband routing functionality of the network to establish a downstream broadband communication link and a two-way communication signaling link between the provider and the user.

The Level 1 Gateway accumulates usage data for billing purposes. For example, in one embodiment a billing system processes the usage data to bill the service provider for connect time for the broadband communication links. The VIP's then bill their individual subscribers. Alternatively, the billing system can process the broadband usage information together with rate information from the service providers to produce combined bills for direct billing to the subscribers.

The Level 1 Gateway receives notification of the status of broadband communications links as they are being set up and during ongoing communications through those links. The Level 1 Gateway therefore can inform a subscriber when a requested session can not be set up with a selected service provider, i.e. because the provider's server ports are all busy or because the subscriber is not registered with the particular provider or due to some technical problem. The Level 1 Gateway also recognizes when an established link develops a fault or is interrupted and can stop accumulating usage or billing data regarding that link. The Gateway can also notify the subscriber and/or the service provider of the failure.

The Level 1 Gateway will also store various information relating to each subscriber's services and control service through the network accordingly. At least some of this stored data is accessible to the subscriber through a direct interaction with the Level 1 Gateway. For example, the user can identify certain service providers to the Level 1 Gateway and define an authorization code or identification number which must be input before the network should provide a session with equipment operated by those providers.

Many of the functions of the Level 1 Gateway relate principally to set up, monitoring and billing for point-to-point type interactive sessions. However, a number of the Gateway functions also apply to broadcast services. For example, the interaction with the Level 1 Gateway can be used to advance order upcoming broadcast pay-per-view events. At the time for the event to begin, the Level 1 Gateway will transmit appropriate notice to the ordering subscriber's terminal. In response, the terminal may display the notice to the subscriber or the terminal may automatically turn on and/or tune to the appropriate communication link through the broadcast network to obtain the ordered event. The interactive features of the Level 1 Gateway also permit subscribers to specify limitations they wish to place on their broadcast services, e.g. total number of hours of usage within some defined interval and/or time of day/week of permitted usage. The Level 1 Gateway will then control the broadcast network and/or the subscriber's terminal in accord with the limits defined by the subscriber.

Examples of two different networks using the inventive Gateway functionality are described in detail. As illustrated by such examples, the functions of this Gateway can be incorporated into a wide variety of advanced broadband communication networks.

The preferred network provides an enhanced video dial tone capability, allowing users to select service providers for an array of broadcast services, as well as for point-to-point interactive services. The preferred network architecture comprises a backbone subnetwork and an access subnetwork. The backbone subnetwork provides point-to-point two-way communication sessions for broadband interactive multimedia communications signals with a selected one of the information providers. The access subnetwork receives digital broadband information signals from the selected information provider, via the backbone subnetwork, for transmission to one of the digital entertainment terminals. The access subnetwork also supplies control signals from the one digital entertainment terminal to the backbone subnetwork for transmission to the selected information provider. The access subnetwork also provides broadcast transport. Specifically, the access subnetwork receives broadcast digital broadband information signals for selective distribution to the digital entertainment terminals. In the preferred network architecture, the level 1 gateway of the present invention interacts with the respective subnetwork controllers to activate various broadcast services through the network and to set-up and tear down two-way communication sessions.

In the preferred implementation of this enhanced video dial tone network, the backbone subnetwork comprises one or more asynchronous transfer mode (ATM) switches. A permanent virtual circuit (PVC) controller serves as the ATM backbone subnetwork controller. The access subnetwork utilizes RF broadcast transport of both digital and analog information signals. The preferred implementation of the access subnetwork comprises hubs which convert ATM streams into digital packet streams for RF broadcast and a number of local video access nodes connected to each hub. The local video access nodes convert ATM streams for interactive services, as received from the ATM switch, into digital packet streams for RF transmission together with the RF broadcast signals from the hub.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIGS. 2A to 2M illustrate various displays generated in response to instructions from the Level 1 Gateway during broadband call processing.

BEST MODE FOR CARRYING OUT THE INVENTION

Figure 1:
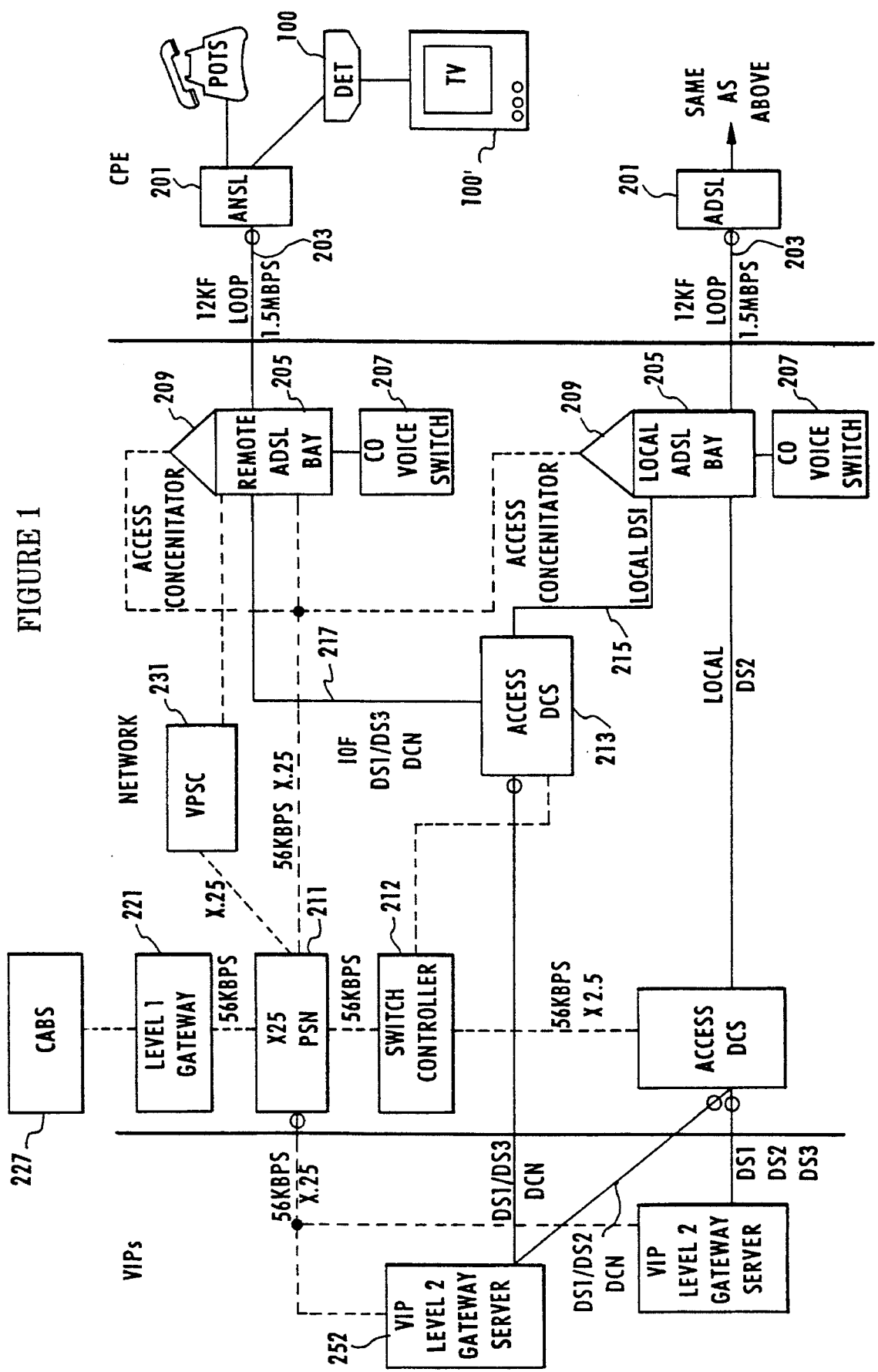
FIG. 1 is a block diagram of an example of a first Video Dial Tone network utilizing a Level 1 Gateway, in accord with the present invention.

The Level 1 Gateway of the present invention is useable in a variety of different broadband distribution networks which offer subscriber's selective communication with a plurality of broadband or video information service providers. FIG. 1 depicts one such network, referred to as a Video Dial Tone Network, which is a direct improvement over the network disclosed in the above cited Litteral et al. Patent. For ease of understanding, an overview of the Video Dial Tone network is set forth below, followed by a more detailed description of the functions of the Level 1 Gateway in that network. Subsequent sections provide an overview of the preferred network architecture, a detailed description of the preferred network architecture and a discussion of the Level 1 Gateway operations in the context of the preferred network architecture.

Architecture of Basic Video Dial Tone Network

FIG. 1 is a block diagram an exemplary broadband network for providing interactive services, such as video on demand, home shopping or purchasing, home banking, medical information, ticket ordering, gaming, etc. In the network shown, the customer premises equipment (CPE) consists of a set top terminal identified as "DET" (digital entertainment terminal) 100 and a telephone (POTS or ISDN). The connections to the central office utilize Asymmetrical Digital Subscriber Line (ADSL) technology, typically over twisted wire pair, similar to that disclosed in the above cited Litteral et al. Patent. The ADSL connection provides a 1.5 Mbits/s downstream video information channel, a two-way telephone connection and a two-way 16 kbits/s control channel. The illustrated Video Dial Tone network architecture may use some form of fiber extension in the actual subscriber loops, to provide services to subscribers located more than 1.5 kilo-feet from a central office (see e.g. U.S. Pat. No. 5,534,912, in the name of Bruce Kostreski, entitled "Extended Range Video On Demand System"). In the network illustrated in FIG. 1, the drop to the subscriber's premises is always a wired ADSL loop.

As shown in FIG. 1, the network interface module in the DET 100 connects to an ADSL multiplexer/demultiplexer 201 similar to the in-home ADSL unit in the above discussed Litteral et al. Patent. The connection between the network interface module of the DET 100 and the in-home ADSL unit 201 may consist of an RJ48C line and connectors. Such a link comprises six wire pairs, two for the broadband data, two for upstream signaling and two for downstream signaling.

Each ADSL subscriber line 203 will connect to an ADSL bay 205 located in or associated with the subscriber's local central office. For each subscriber line 203, the ADSL bay 205 includes an ADSL multiplexer/demultiplexer similar to the central office ADSL unit in the above discussed Litteral et al. Patent. The ADSL bay 205 provides transport for voice signals on the subscriber loop to and from the associated voice switch 207. The ADSL bay 205 also connects to an access concentrator 209 for providing two-way signaling connections through an X.25 type packet switched data network 211. The ADSL bay 205 also receives broadband digital signals for downstream transport over the ADSL line 203 to each subscriber's premises from a digital cross connect switch 213, labelled "Access DCS" in the drawing. One ADSL line 203 to the home carries one channel of video programming and provides a single output channel. The output channel can provide a video signal to a VCR (not shown) or to the TV set 100'. The various Access DCS switches throughout the network are controlled by switch controller 212.

If the ADSL bay 205 is local, i.e. located in the same telephone company central office as the cross connect switch DCS 213, the ADSL bay 205 connects to the Access DCS 213 via an appropriate number of local DS1 connections 215. In service areas where an ADSL bay does not carry enough traffic to warrant an associated Access DCS, the ADSL bay will be located in a remote central office facility. Such a remote ADSL bay connects to the Access DCS 213 via a SONET type optical fiber link 217 providing an appropriate number of multiplexed channels to service the number of subscribers connected to the particular ADSL bay.

Video Information service Providers (VIP's) may access the downstream broadband portion of the system at a hub location (not shown) within a given LATA. The hub will not perform any switching. High capacity optical fiber links are aggregated at the hub to provide each VIP with a number of connections (e.g. one or more OC-3 links) from their respective video server to each Access DCS within the LATA.

The Access DCS 213 provides both point-to-point connections and point-to-multipoint connections. Individualized interactive services, such as Video On Demand, home shopping/purchasing and banking, use point-to-point connections wherein the Access DCS connects one broadband input port from a VIP's server to one output port going to the subscriber's ADSL line. Narrowcast and broadcast services utilize point-to-multi-point connections of one input port to a plurality of output ports.

The illustrated architecture of the Video Dial Tone network utilizes two levels of gateways, both of which will communicate with subscribers' DET's via the X.25 data network 211 and the signaling channel on the ADSL subscriber loops 203.

The Level 1 Gateway 221 performs a variety of network connectivity related functions, including communications port management of transmissions of information between subscribers and servers, processing of billing information and session management. Normally, each subscriber accesses the Level 1 Gateway (e.g. to select and access a particular VIP's server) by operation of a remote control device which causes the subscriber's DET 100 to transmit data signals to the Level 1 Gateway via the 16 kbits/s control channel and the X.25 packet switched data network 211. The Level 1 Gateway transmits one or more selection menus to the subscriber's DET 100 as screens of text data carried by the same path back through the network.

In the present implementation, text or graphics information from the Level 1 Gateway is displayed as a page of data. Alternatively, the text or graphics data could be overlaid on a video display received through the broadband network, e.g. over one of the broadcast channels carried through the more advanced networks discussed below.

In a typical scenario, the user would turn on the DET terminal 100, and in response to data signals from the Level 1 Gateway 221, the terminal would display an initial selection menu. The subscriber would input a selection, and in response to an appropriate data signal from the DET 100, the Level 1 Gateway 221 would instruct the various network components to set up a virtual circuit to the level 2 gateway of a selected VIP for signaling purposes and a direct downstream path from the VIP's server through the digital cross-connect switch 213 for video transmission.

The Level 1 Gateway 221 accumulates usage statistics relating to the broadband communication links through the network and supplies those statistics to a billing system, e.g. to a carrier access billing system (CABS) 227 as shown in FIG. 1. The Level 1 Gateway 221 also exchanges various network operational status information with the switch controller 212 and with a video provider service center (VPSC) 231.

These and additional functions of the Level 1 Gateway are discussed in more detail below.

A level 2 gateway provides a number of services for the Information Providers. These services include transmission of menus of available information to subscribers, searches of available information, targeted advertisement insertion, previews, trailers, etc. The level 2 gateway will download video or audio menus to each subscriber's DET for display, thereby allowing each subscriber to select desired information. Once a subscriber makes a selection, the level 2 gateway will signal the appropriate server to schedule transmission of the selected information through the established downstream video transmission path. The Level 1 Gateway accumulates connectivity charge information for purposes of billing each called VIP. The level 2 gateway records transactions, e.g. movies viewed, by each subscriber for billing purposes. The level 2 gateway also interacts with the DET 100 and controls the associated servers to download executable program code for storage in the DET system memory.

The switch controller 212 monitors operations of the digital cross connect switches 213 and provides appropriate information to the Level 1 Gateway. For example, if the switch controller 212 indicates that a broadband communication link through one of the switches has failed for some reason, the Level 1 Gateway will terminate its accumulation of usage data for billing for the particular broadband session. The video provider service center (VPSC) 231 performs a related monitoring function with regard to the ADSL loops.

The ADSL bays 205 monitor communications over the subscriber lines 203 by periodically enquiring as to the status of each on-premise ADSL unit 201. The ADSL bays 205 in turn inform the video provider service center (VPSC) 231 of any detected failures via data connections to that center (only one such data connection is illustrated in FIG. 1). In the presently preferred embodiment of the network of FIG. 1, the service center (VPSC) 231 is manned operations support personnel. In response to a failure alarm indicating one of the ADSL lines is down, the center 231 provides a display for review by one of the technicians. A VIP may also call in and indicate that the VIP's system 252 has detected some form of failure. Based on the displayed information and/or the information from the VIP, the technician decides whether in fact a failure has occurred. If so, the technician initiates an X.25 data call and transmission of a message from the video provider service center (VPSC) 231 to the Level 1 Gateway 221 identifying the failed link and instructing the Gateway 221 to tear down the particular broadband link. The Level 1 Gateway 221 terminates its accumulation of usage time data for that link and instructs the switch controller 212 to tear down the link.

Upon detection of a fault and reporting thereof to the video provider service center (VPSC) 231, personnel at the center can initiate action to correct the fault. For example, if the switch controller 212 reports a fault in a particular switch 213, the personnel at the service center (VPSC) 231 can call a technician at the central office housing that switch and have that technician test the switch and correct any faults actually discovered. Similarly, if an ADSL bay 205 reports some fault on the twisted wire pair 203 or loss of communications with the on-premises ADSL unit 201, the personnel at the service center (VPSC) 231 can dispatch a repair technician to locate and correct the fault on the line or in the on-premises unit.

As discussed in more detail with regard to later network embodiments, it is preferred for more advanced versions of the network that the function of the video provider service center (VPSC) 231 be fully automated to instruct the Level 1 Gateway 221 to stop billing data accumulation and tear down faulty broadband links without human intervention.

The Video Dial Tone network of FIG. 1 provides video on demand and other broadband interactive multimedia services offered by a plurality of service providers. For example, using the upstream data channel, the subscriber can send a request for a particular movie from his VIP of choice, and the VIP's server will retrieve and transmit that movie as an Moving Pictures Experts Group (MPEG) digital data stream on the 1.5 Mbits/s downstream channel to the digital audio/video processor in the subscriber's DET 100.

Although other digital compression encoding schemes may be used, such as DIGICIPHER™, the preferred embodiments of the present invention utilize MPEG encoding and decoding. MPEG (moving picture experts group) is a broad generic standard for video program compression, and MPEG 2 is a second generation compression standard for packetized transport of one or more compressed video program signals in a single stream. A number of specific compression algorithms will satisfy MPEG requirements. Typically, MPEG permits encoding of audio/video program materials into digitized, compressed format at rates in the range of 1.5 to 6 Mbits/sec.

In the illustrated network, the DET 100 includes a CPU, comprising a 386 or 486 microprocessor and associated memory (RAM, ROM and EPROM) and an audio/video decoder, controlled by the CPU. The audio/video decoder decompresses the digitized broadband information. The preferred embodiment of the audio/video decoder comprises an MPEG video decoder, an MPEG audio decoder, and an MPEG demultiplexer for selectively routing MPEG encoded video and audio packets carried on the digital broadband channel to the MPEG video decoder and the MPEG audio decoder, respectively. The DET also includes a graphics display generator for generating displays of received text data, such as the initial turn-on selection menu, discussed in more detail below. The DET also includes digital to analog converters and appropriate drivers to produce output signals compatible with a conventional television set from the decoded audio/video information and the graphics display. Each DET also includes means to receive selection signals from a user and transmit appropriate data signals over a narrowband channel through the particular video network.

The digital entertainment terminal (DET) 100 is a programmable device to which different individual video information providers (VIP's) can download different applications software. At least one VIP, typically a vendor of the DET, also can download portions of the operating system. The DET will permanently store only an operating system and a loader program, to control initial communications with a Level 1 Gateway or to facilitate initialization into a simplified CATV type mode of operation.

The structure and operation of the DET 100, outlined above, are described in more detail in commonly assigned application Ser. No. 08/250,791, filed May 27, 1994, entitled "Dynamically Programmable Digital Entertainment Terminal" (attorney docket no. 680–083), the disclosure of which is entirely incorporated herein by reference.

Level 1 Gateway Functionality in Basic Network

Physically, the Level 1 Gateway is a mini-computer, and in the Video Dial Tone network of FIG. 1, that computer would have interfaces for X.25 packet data communications. In one implementation, the Level 1 Gateway is a UNIX based machine, such as a Tandem Integrity type computer. Essentially, the Level 1 Gateway comprises a processor CPU, with associated RAM and ROM, as well as mass data storage and retrieval means, e.g. various disc drives. There is one Level 1 Gateway per LATA, as shown in FIG. 1. However, for service areas encompassing a number of LATA's, the video dial tone network would include a plurality of Level 1 Gateways.

Figure 2:
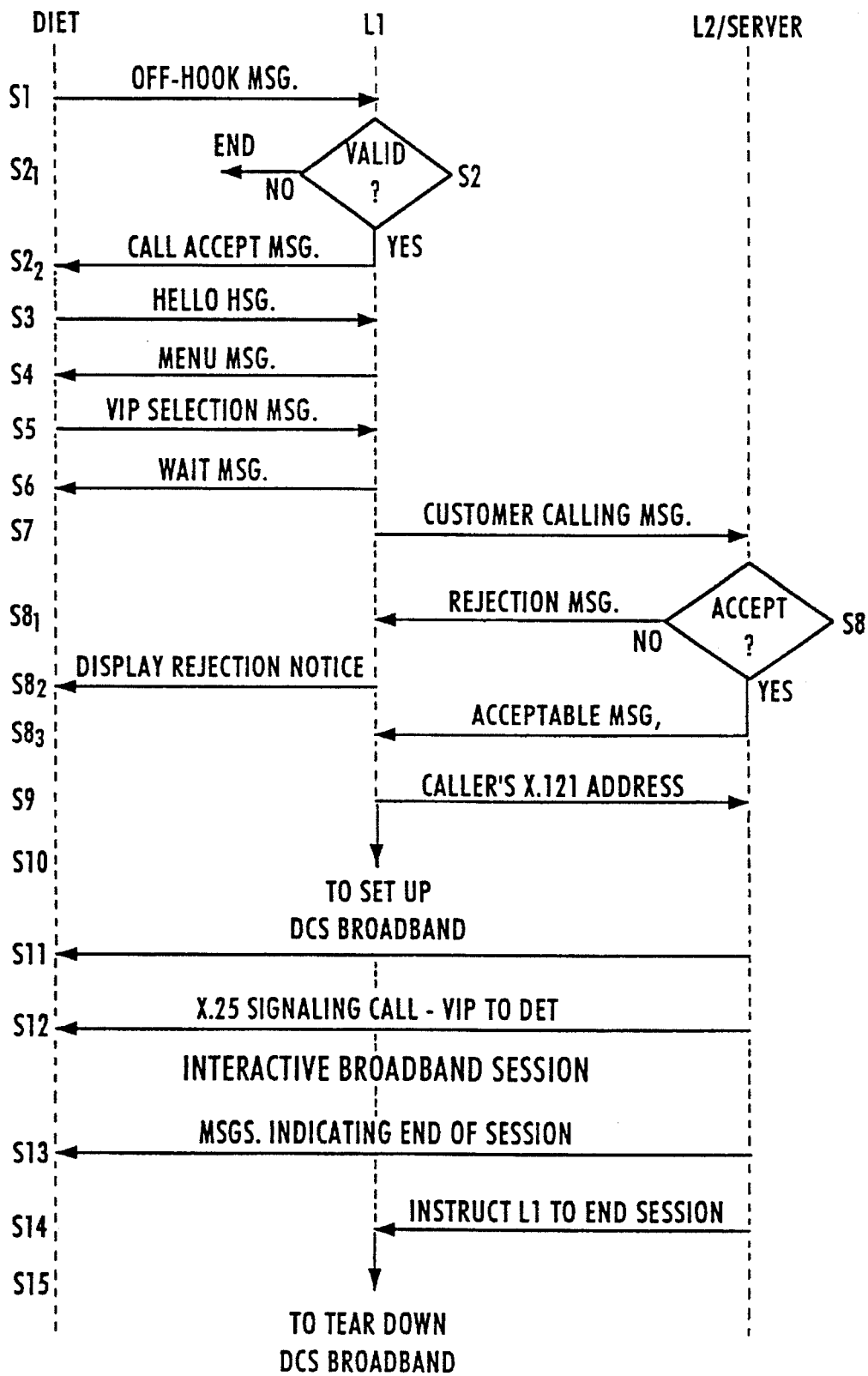
FIG. 2 illustrates, in simplified form, the flow of messages between various components of the network of FIG. 1 during establishment of an interactive broadband communication session.

FIG. 2 provides a somewhat simplified illustration of the process flow, with particular emphasis on the exchange of signals involved in setting up, carrying on and tearing down an interactive broadband session between a DET and a selected VIP's equipment.

To access the system, the customer turns on the digital entertainment terminal (DET) 100. As shown at step S1 in FIG. 2, the DET transmits an "offhook" message upstream to the Level 1 Gateway servicing that DET. Specifically, the DET type terminal transmits an X.25 message through the upstream signal path to the access concentrator 209. This is a generic off-hook message, and the message from the terminal 100 carries no addressing. The access concentrator 209 identifies the off-hook DET 100 by identifying the physical ADSL port on the access concentrator through which it received the message and assigns a signalling address to that terminal. The access concentrator 209 populates the correct X.121 address for the sender into the call request message and populates the correct X.121 address for the Level 1 Gateway 221 into the message. The access concentrator 209 sends the addressed message through the X.25 packet switched network 211 to the Level 1 Gateway 221. Thus, the call is terminated in the Level 1 Gateway 221 as an X.25 data call, and a two-way virtual circuit is dedicated to data communications between the Gateway 221 and the DET 100 for the duration of the call set-up processing. The X.121 addresses are used for call set. During call set-up an available X.25 virtual circuit is defined for data flow in both directions, and subsequent packet transmissions will utilize appropriate packet headers to follow that virtual circuit node-to-node through the X.25 packet network.

The Level 1 Gateway 221 includes a file for each subscriber containing the subscriber's billing telephone number, the subscriber's X.121 address for signaling purposes, and the port identification of the broadband connection of the subscriber's line to the digital cross-connect switch (DCS) 213 serving the particular subscriber. When the Level 1 Gateway 221 receives the addressed message from the access concentrator 209, that Gateway uses the X.121 address of the caller to check its internal database to determine if the caller is a valid video dial tone customer (S2). If the caller is not a valid customer, the system tears downs the session ($S2_1$). Although not shown as a separate step in FIG. 2, the Level 1 Gateway will typically transmit an instruction to the DET 100 to display some service denial message, such as that shown in FIG. 2A, as part of the operations to terminal communications with the particular DET. If the caller is a valid customer, the Level 1 Gateway 221 transmits an X.25 call accept message back to the DET 100 ($S2_2$) and waits for the first application level message.

Once the call is accepted and an X.25 signalling link is provided, the set-top terminal DET 100 sends an initiation message that says "hello" (S3). This "hello" message includes basic information such as a customer premises equipment (CPE) identifier and a CPE type designation of the particular DET. This information is primarily for the level 2 gateway. The Level 1 Gateway 221 normally transmits back menu information, as ASCII data in X.25 message form (S4). The menu gives the customer the option to ask for a particular video information provider (VIP), such as the VIP operating the system 252. In the illustrated example, each VIP provides a level 2 gateway and some form of broadband information server 252 connected to the network.

Each level 2 gateway is assigned a 4-digit code. Some DET's will have the option of preassigning a 4-digit VIP code, so that such a terminal always automatically transmits the preassigned 4 digit VIP code immediately with the initial "hello" message. Inclusion of the 4 digit VIP code in the initial message indicates the subscriber's VIP preference. As a result, the customer could always go to the same preferred VIP, and the customer need never see a VIP selection menu. The Level 1 Gateway 221 checks the validity of the VIP code. Assuming the VIP code is valid, the Gateway 221 would see that this call is from a valid customer and initiate signaling communication with the particular VIP's level 2 gateway immediately.

If the Level 1 Gateway 221 detects that a received VIP preference code was not a valid VIP identifier code, the Gateway 221 transmits a message to the DET 100 through the signaling channel instructing the DET to display the notice shown in FIG. 2B. As shown in that drawing, the displayed notice informs the customer that the video provider preference was not recognized. The notice also informs the subscriber that a VIP selection menu will be forth coming. The Level 1 Gateway will wait for some finite period to permit the subscriber to review the displayed notice and then proceed with call processing as if a standard "hello" message had been received (without any VIP preference code), as discussed in more detail below.

The DET and/or remote control associated therewith will have appropriate keys to write a VIP preference into the memory of the DET 100. The DET 100 and/or remote control will also have a key or keys for input of an instruction to override the preprogrammed VIP preference. If the subscriber overrides the preference, the DET 100 will issue a normal "hello" message without the VIP identifier code, and processing will advance as if a standard "hello" message had been received (without any VIP preference code), as discussed below.

If there is no VIP preference code in the X.25 "hello" message (see S3) or the preference code was invalid, the Level 1 Gateway 221 sends a banner followed a few seconds thereafter by a menu, through the downstream signaling channel (34). The banner display (FIG. 2C) depicts an initial greeting, such as "Welcome to Bell Atlantic Video Dial Tone Services". The menu is a screen of text and/or graphic images listing VIP's available to this customer. FIG. 2D shows the format of the menu display. As shown, the menu displays the number of available providers (VIP's), lists each provider by two-digit code, and gives the name of each provider. Although shown as two separate displays, the banner and first menu page can be combined into one display page requiring only a single transmission by the Level 1 Gateway. Alternatively the banner may be eliminated. One line of the menu page can indicate that the menu includes additional pages and what keys to actuate to request the next page from the Level 1 Gateway. If a customer selects an additional VIP menu page, the DET 100 transmits an appropriate request message to the Level 1 Gateway 221, and that Gateway transmits back another page of data for display.

The remote control or keypad input on the set-top terminal has arrow keys which allow the user to select from the VIP's listed on the visually displayed menu. The subscriber reviews the menu on their television set, and operates the arrow keys to move a cursor across the menu to an appropriate point on the screen, after which the user presses an <ENTER> key on the keypad or remote control. Alternatively, the user can enter the two digits shown in the VIP's listing beside the name and then press <ENTER>. In response to either type of VIP selection input, the DET 100 transmits an appropriate data signal upstream through the network to the Level 1 Gateway 221 (S4). When the Level 1 Gateway sends the selection menu to the set-top terminal, if no response is received from the DET 100 within a predetermined period, the Level 1 Gateway tears down the X.25 signaling link to that terminal. As discussed in more detail below, the Level 1 Gateway 221 will normally receive the selection input message from the DET 100 within the predetermined period and will translate that message into the 4 digit code for the selected VIP's level 2 gateway.

The VIP menu, formatted as pages of data in the manner shown in FIG. 2D, is created as a function of which VIP's have access to each access digital cross-connect switch (DCS). As shown in FIG. 1, the video dial tone network uses a number of DCS's serving different geographical areas and different subscribers. The DCS's will typically be in different central offices. Not all VIP's connect to and provide services through all of the DCS's. When a subscriber accesses the Level 1 Gateway 221, that Gateway knows which DCS services that subscriber and which VIP's have server ports on that DCS. The Level 1 Gateway 221 therefore limits the VIP's listed on the menu sent to the subscriber's DET 100 to those VIP's providing services through the particular DCS. In the currently preferred embodiment, the information on the menu that pertains to the various available providers is kept alphabetically. Alternatively, the Level 1 Gateway 221 may randomly rearrange the order of the VIP listings in the menu on some periodic basis.

The present invention also permits the customer to modify the menu to their own personal tastes. Thus, if there are ten providers available through a particular DCS, and the customer has opted to see only three on a regular basis, the Level 1 Gateway recognizes the customer's DET and transmits a customized menu listing only those three to the customer's DET terminal for display.

As outlined above, the user typically reviews the menu displayed on the TV screen and selects one of the available VIP's. In response, the user's DET 100 transmits a signal identifying the number of the selection from the menu upstream to the Level 1 Gateway 221 (S5). The Level 1 Gateway always knows what menu it sent to the particular DET. The Level 1 Gateway 221 uses the precise menu information and a table of VIP identifier codes to translate the selection input signal from the DET 100 into an actual 4-digit VIP identification address for the level 2 gateway of the particular VIP that the person selected. The Level 1 Gateway 221 sends an X.25 message to the DET 100 saying please wait while we connect to the VIP's system 252 (S6). In response, the DET produces a standby display, such as the display shown in FIG. 2E. The display preferably will identify the VIP that the customer is awaiting connection to. The row of 'Q's in FIG. 2E indicate the display space in which the VIP's name is inserted.

The Level 1 Gateway 221 next goes over a locked up "permanent" virtual circuit through the X.25 network, to communicate with the level 2 gateway of the VIP's system 252. Specifically, the Level 1 Gateway 221 contacts the level 2 gateway and indicates, through a standard message, that it has a customer calling (S7). The Level 1 Gateway 221 identifies the customer to the level 2 gateway by sending the standard billing telephone number for the calling customer to the level 2 gateway. The CPE identification information and the CPE-type information for the DET 100 that was sent in the initial origination message is also sent to the level 2 gateway (VIP) at this time. The VIP's level 2 gateway may accept or reject the call (S8) after receiving the initial request indicating a customer is available.

When the Level 1 Gateway 221 initially asks the level 2 gateway if a calling subscriber is a valid customer, the Level 1 Gateway expects a response accepting or rejecting the call within a set time, and if the response is not received in that time, the Level 1 Gateway sets off an appropriate alarm. The Level 1 Gateway 221 would inform the DET 100 of the inability to reach the selected VIP and instruct the DET to provide an appropriate display through the TV 100' to the user. The display might inform the user that there is some form of network problem and either instruct the user to try again later (FIG. 2F) or to select another provider (FIG. 2G), depending on whether other providers are available as indicated on the VIP selection menu presented to this subscriber. Alternatively, the Gateway 221 could use one of the provider—unavailable message of FIGS. 2H and 2I.

The level 2 gateway may reject the call for a number of reasons. For example, that gateway may look up the caller's telephone number in a list of the VIP's subscribers' telephone numbers to determine if the caller in fact subscribes to the VIP's services. The level 2 gateway may also check on the calling subscriber's current billing/payment status. Non-subscribers and/or subscribers who are delinquent in paying their bills to the VIP would be rejected. The level 2 gateway might also reject a call if all its existing server output ports on the DCS 213 serving the particular subscriber are currently in use. If the level 2 gateway decides to reject a call, that gateway sends a message back to the Level 1 Gateway 221 indicating a rejection of the call (S8$_1$). The rejection message indicates the reason for the rejection. The Level 1 Gateway 221 transmits a message to the DET 100 instructing that terminal to display an appropriate one of the notices shown in FIGS. 2H through 2L as a call rejection notice on the associated TV 100' (S8$_2$).

The specific rejection notice displayed to the calling subscriber depends on the circumstances of the particular call rejection. If the provider can not service the broadband call at this time because of some server failure, the message would indicate to the user that the provider is not available. If no other providers are available to the particular caller, the message would suggest that the caller try again later, as in FIG. 2H. Alternatively, if the caller has access to other providers the message would suggest that the caller select another provider, as shown in FIG. 2I. If all of the selected the provider's server ports are busy, the Level 1 Gateway would instruct the DET 100 to display one of the busy notices shown in FIGS. 2J and 2K, depending on whether or not other providers are available to the particular caller. If the VIP arbitrarily denies access, e.g. because the caller is not a recognized subscriber or has not paid her bill, then the Level 1 Gateway would instruct the DET 100 to display a call denial message, such as shown in FIG. 2L.

Alternatively, the level 2 gateway accepts the call, provides a server output port and gives an identification for that port to the Level 1 Gateway 221 (S8$_3$). In response, the Level 1 Gateway 221 transmits the X.121 address of the calling customer to the level 2 gateway (S9). The Level 1 Gateway 221 looks in its internal record to find the broadband port number for the requesting customer and sends a message to the switch controller 212 instructing one of the DCS's 213 to connect the server port the VIP provided to the broadband port for the subscriber, to thereby set up the broadband communication link (S12). The level 2 gateway uses the customer's X.121 and its own X.121 address to initiate a new X.25 signaling communication type call to the subscriber's DET 100 (S11).

If the broadband connection is successfully set up, the switch controller 212 transmits back an indication that the broadband connection has been established. Then the Level 1 Gateway 221 tears down its own X.25 signaling connection with the subscriber's DET 100. At that time, the Level 1 Gateway 221 informs the level 2 gateway that it has set up a good broadband link, and the Level 1 Gateway 221 initiates a billing record for the call. An interactive broadband session ensues via the broadband and signaling links.

Alternatively, if the switch controller 212 could not establish the broadband communication link, the controller 212 informs the Level 1 Gateway 221 of that fact and the specific reason it could not establish the broadband link. The Level 1 Gateway passes that information on to the level 2 gateway. The codes identifying the basis for the failure to complete the broadband call provide the level 2 gateway information as to whether the failure is a one time condition or is continuous, whether or not the failure is network-wide, etc. This information is useful to the operator of the level 2 gateway, for example, to determine whether to continue to send requests for broadband channels through the Level 1 Gateway or to suspend operations until receiving notice that a network fault has been cleared. The Level 1 Gateway 221 also provides an appropriate message through the signaling channel for display by the DET 100 informing the customer. The displayed message might offer the customer the option to select another VIP if the fault relates only to accessing the selected VIP (similar to FIG. 2I), and if the customer does so, the call processing begins again with transmission and display of the VIP selection menu.

When a broadband session ends, e.g. as indicated by an exchange of appropriate messages between the DET and the level 2 gateway (S13), the level 2 gateway instructs the Level 1 Gateway 221 to tear down the broadband session connection (S14). The instruction includes the customer's billing telephone number and the server port identification for the VIP port used for the broadband communication. In response, the Level 1 Gateway 221 stops the billing timing for that broadband session and transmits an instruction through the switch controller 212 to the DCS 213 to tear down the broadband connection between the server port and the customer's broadband port (S15).

The port identifications are always ten-digit numbers. Of the digits, the second, third and forth digit positions identify the digital cross-connect switch (DCS) in question. At any point, when a VIP's level 2 gateway sends a ten-digit server port identification number to the Level 1 Gateway, for setting up or tearing down a link to a particular subscriber port, the Level 1 Gateway compares the second, third and fourth digits to the corresponding digits of the subscriber's port identification to determine if the server port is in fact on the same digital cross-connect switch as the subscriber's port. If the digits do not match as they should, the Level 1 Gateway informs the level 2 gateway of the error and requests a new server port identification.

The Level 1 Gateway 221 creates a log record that contains specific information including the time that the Level 1 Gateway received or sent each message. Information of a failure is furnished by the switch controller 212. The switch controller will indicate between which ports the failure occurs. The Level 1 Gateway then notifies level 2 gateway and possibly the set-top terminal that a network failure has occurred and the communication link is lost.

The Level 1 Gateway collects usage statistics for billing purposes. The VIP's may choose to collect audience statistics through the level 2 gateways. In the preferred implementation of the video dial tone network of FIG. 1, the subscriber may be charged a flat monthly charge, e.g. on her telephone bill, for video dial tone service. The usage sensitive charges for the broadband connections through the network, however, go to the VIP's. However, an alternate implementation of the present invention combines network usage charges with VIP's service charges into a single bill to be sent directly to each subscriber.

For billing purposes, the Level 1 Gateway creates a billing record for each call which resulted in an actual broadband connection through one of the digital crossconnect switches (DCS's). The billing record identifies the level 2 gateway, by its 4-digit code. The billing record includes an identification of the customer by billing telephone number, the type of call (e.g. ADSL or fiber), an identifier of the digital cross connect switch (DCS) which provided the broadband connection, an identifier of the particular Level 1 Gateway that serviced the call, the connect date, the time that the broadband connection was first established, and the elapsed time until teardown of the broadband link. The Level 1 Gateway supplies all of this information directly through a transmission link to the telephone company's carrier access billing system (CABS) 227 for processing into appropriate invoices for billing the VIP, in a manner substantially similar to billing of an Interexchange Carrier. The usage data can be downloaded periodically to the CABS 227, or the Level 1 Gateway may initiate downloading in response to a manual request from the system administrator. Each VIP establishes its own rates and procedures for actually billing the end users. The Level 1 Gateway and CABS systems may also accumulate data and bill the VIP's for the X.25 signaling links, but in the current implementation there would not be any separate charges for the various X.25 signaling communications.

In the illustrated implementation, the video dial tone network essentially bills the VIP for the broadband connection time, and each VIP in turn bills its subscribers. As an alternative, the Level 1 Gateway 212 can supply the broadband usage information to a customer record information system or 'CRIS' (not shown). CRIS would store information as to each VIP's service charges and would process that information together with the usage data from the Level 1 Gateway to generate a combined bill for the end user/subscriber. The subscriber would pay the billed amount to the network operations company, typically the local telephone company, and the network operations company would divide the received revenues between itself and the VIP(s).

To change connections from one VIP to another, the user initiates a sign-off procedure with the first VIP. The first VIP's level 2 gateway instructs the Level 1 Gateway 221 to tear down the broadband link, as discussed above, and the DET 100 initiates a new VIP selection procedure with the Level 1 Gateway in a manner similar to the initial turn-on communication discussed above.

If the user simply turns off the set-top terminal DET 100 in the middle of a video session, the DET will send some form of "terminate" message through the signaling link to the level 2 gateway. The level 2 gateway would instruct the Level 1 Gateway 221 to tear down the broadband connection and stop billing in the above discussed manner. When the subscriber turns the DET 100 back on, that terminal begins a new communication with the Level 1 Gateway 221 in the normal manner. If for some reason the broadband link with the first VIP has not yet been torn down, e.g. because of some failure or time delay incurred in that VIP's signaling the Level 1 Gateway 221 to take down the first connection, the Level 1 Gateway will discover this fact at the time it instructs the switch controller 212 to set up the second connection to the newly selected VIP. At that time, the Level 1 Gateway 221 will instruct the switch controller 212 to tear down the first connection and set up the second connection.

The Level 1 Gateway also offers a personal identification number (PIN) control functionality. This gives the end user the ability to assign a PIN number to one or more of the VIP's shown on the VIP selection menu. For example, certain VIP's might show materials which a parent might deem unsuitable for young children to view. Such a parent would assign a PIN to those VIP's. When someone selected such a VIP from the menu, the Level 1 Gateway 221 would instruct the DET 100 to output a prompting type display and/or audio message requesting input of the PIN. The parent would know the PIN and be able input the correct PIN, using the DET remote control, to access the VIP. However, a child not knowing the PIN would not be able to give the correct response to the prompt, and the Level 1 Gateway 221 would deny access.

In addition to the VIP selection options, the initial menu from the Level 1 Gateway will offer callers the ability to interact with that Gateway to control their video dial tone service. With this feature, the subscriber would initiate communications with the Level 1 Gateway in precisely the same manner as for a call to a video information provider (VIP), as discussed above with regard to FIG. 2. In the menu format of FIG. 2D, one or more of the VIP listing lines would identify Level 1 Gateway interactions, e.g. for "Personal Options". Selection of one such choice from the menu initiates an interactive session between the subscriber and the Level 1 Gateway. In the network of FIG. 1, the communications for this session will be entirely through the signaling channel. The DET 100 transmits upstream signals through the signaling link and the X.25 data call to the Level 1 Gateway 221, and the Gateway 221 transmits text or graphics displays and instructions to the DET 100 back downstream through that signaling path. In a further enhanced implementation, the Level 1 Gateway would have broadband communication capabilities.

A "Personal Options" session with the Level 1 Gateway would step the subscriber through a series of menus and inputs to select an option to modify (e.g. PIN number or customize menu) and collect the information from the subscriber needed to execute that option. For example, if the subscriber selected the PIN number option, the Level 1 Gateway would ask for a four digit PIN number input from the subscriber and then ask which VIP's on the menu the subscriber wanted that PIN applied to. The currently preferred implementation offers only a single PIN for all VIP's a subscriber chooses to restrict access to. Alternatively, the Level 1 Gateway could offer to apply different PIN numbers to different VIP's. A similar procedure permits a subscriber to set up a short list of VIP's that subscriber prefers.

In the implementation of FIG. 1, the "Personal Options" through the Level 1 Gateway 221 are limited to PIN number and menu customization. In more advanced networks offering additional services, such as broadcast video and pay-per-view, this Level 1 Gateway feature would allow the subscriber to set up and modify a wider variety of service options. For example, the Level 1 Gateway might offer a subscriber an option to specify or change a level of broadcast service. As another personal option, the Level 1 Gateway might offer a subscriber an "Hours of Service" control. If the subscriber selects this option, the Gateway would ask for input of a number for use as a threshold value. For each week (or other specified time interval), the Level 1 Gateway would monitor the number of hours of service provided to that subscriber's DET(s) and would terminate service to that subscriber's DET(s) if usage exceeded the threshold number input by the subscriber. This service time limitation might have an attendant PIN number based override to permit some member of the household (typically a parent) to override the hours of service limitation. The Level 1 Gateway could similarly offer subscribers the option to specify time of day/week limitations and then would deny service at other times unless a valid PIN number was received.

As noted during the above discussion, the Level 1 Gateway may receive an indication from the switch controller 212 that it can not establish a desired broadband connection. The controller 212 monitors operations of the individual DCS switches 213 at all times and will also inform the Level 1 Gateway upon detection of a fault or interruption in an established broadband connection. The Level 1 Gateway 221 transmits notice of an inability to establish a desired broadband session to the requesting DET, using notices such as shown in FIG. 2F and 2G depending on whether or not other VIP's are available to the particular subscriber at the time of the call. If the Level 1 Gateway 221 receives notice of a fault in an already established session, the Gateway 221 stops accumulating billing data for that session and transmits an X.25 message regarding the failure to the VIP's level 2 gateway. The level 2 gateway may provide an appropriate notice to the subscriber through the signaling link, if that portion of the session is still operative. Alternatively, the Level 1 Gateway may initiate a new X.25 call to the subscriber's DET 100 to provide an appropriate display notice.

The VPSC 231 monitors the operations of ADSL communications capabilities on each subscriber's line. If the VPSC 231 detects a fault in a line currently engaged in a broadband communication session, and the technician at the center 231 determines that the fault is real, then the VPSC 231 makes an X.25 call to the Level 1 Gateway 221 and sends an error message identifying the line to the Level 1 Gateway 221. The Gateway 221 stops accumulating billing data for that session and transmits a message to the switch controller 212 to tear down the session. Once the switch controller 212 provides a positive acknowledgement to the Level 1 Gateway 221 that the session has been torn down, the Gateway 221 provides a confirmation message to the VPSC 231. The Level 1 Gateway also transmits an X.25 message regarding the failure to the VIP's level 2 gateway. The level 2 gateway may provide an appropriate notice to the subscriber through the signaling link, if that portion of the session is still operative. However, in the preferred embodiment, the level 2 gateway terminates its X.25 call to the DET 100, and the Level 1 Gateway initiates a new X.25 call to the subscriber's DET 100 to provide an appropriate display notice regarding the line failure. If the problem was line related, a network problem type display notice, such as shown in FIG. 2F, could be used. If the fault report suggested some defect in the DET or broadband communications from the ADSL unit 201 to the DET 100, the Level 1 Gateway 221 would specify a display notice relating to the DET itself, such as that shown in FIG. 2M.

The Level 1 Gateway 221 can also initiate an audit of the status of a subscriber's line. The Level 1 Gateway issues an audit request for the subscriber line to the switch controller 212. The switch controller 212 determines the status of the subscriber's line and informs Level 1 Gateway whether the line is in service but idle, in service and in progress, or out of service and idle. Similarly, the Level 1 Gateway 221 can initiate an audit of the status of a source line from a server. The Level 1 Gateway issues an audit request for the server line to the switch controller 212. The switch controller 212 determines the status of the source or server line and informs Level 1 Gateway. For example, if the server line is operative but not involved in a connection, the reported connection status of the server line is "in service but idle".

When the Level 1 Gateway 221 instructs the switch controller 212 to establish a broadband connection, the Gateway 212 expects a response from the controller 212 within a predetermined time interval. If the controller 212 does not respond within the predetermined time interval, the Level 1 Gateway 221 will send an ABORT message to the switch controller 212 to cancel the session establishment message. The Level 1 Gateway 221 also informs the level 2 gateway of the failure to establish a connection and provides an appropriate notice of the failure to the subscriber through the X.25 signaling call still existent with the DET 100. The Gateway 221 will also record the failure in an alarm file.

When the Level 1 Gateway 221 instructs the switch controller 212 to tear down a broadband connection, the Gateway 212 expects a response from the controller 212 within a predetermined time interval. If the controller 212 does not respond within the predetermined time interval, the Level 1 Gateway 221 will send an ABORT message to the switch controller 212 to cancel the original session establishment message, and the Gateway 221 will also record the failure in an alarm file.

Presently Preferred Network

The above discussion has concentrated on operation of the Level 1 Gateway in the cross-connect switched type basic Video Dial Tone (VDT) network, however, that Gateway will work equally well in a variety of other enhanced Video Dial Tone network architectures with a wider range of service capabilities. Adaptation of the Level 1 Gateway to other network architectures principally requires that, instead of interacting with a switch controller and digital cross-connect switches (DCS's), the Level 1 Gateway interact with controllers of one or more subnetworks which provide the necessary network connectivity.

In the preferred architecture, the network includes two subnetworks, a backbone subnetwork and an access subnetwork. The backbone subnetwork, preferably an ATM switch network, provides point-to-point connectivity for interactive services. The access subnetwork provides local loop distribution of broadcast signals and interactive service signals from the backbone subnetwork. Also, the Level 1 Gateway preferably conducts signaling communications with the DET's, the level 2 gateways and one or more controllers of the subnetworks through the backbone subnetwork instead of through the X.25 packet switched system used in the Video Dial Tone Network of FIG. 1. The principal functionalities of the Level 1 Gateway discussed above, however, will generally remain the same and will be substantially enhanced by addition of new functionalities as discussed later.

Network Overview

Figure 3:
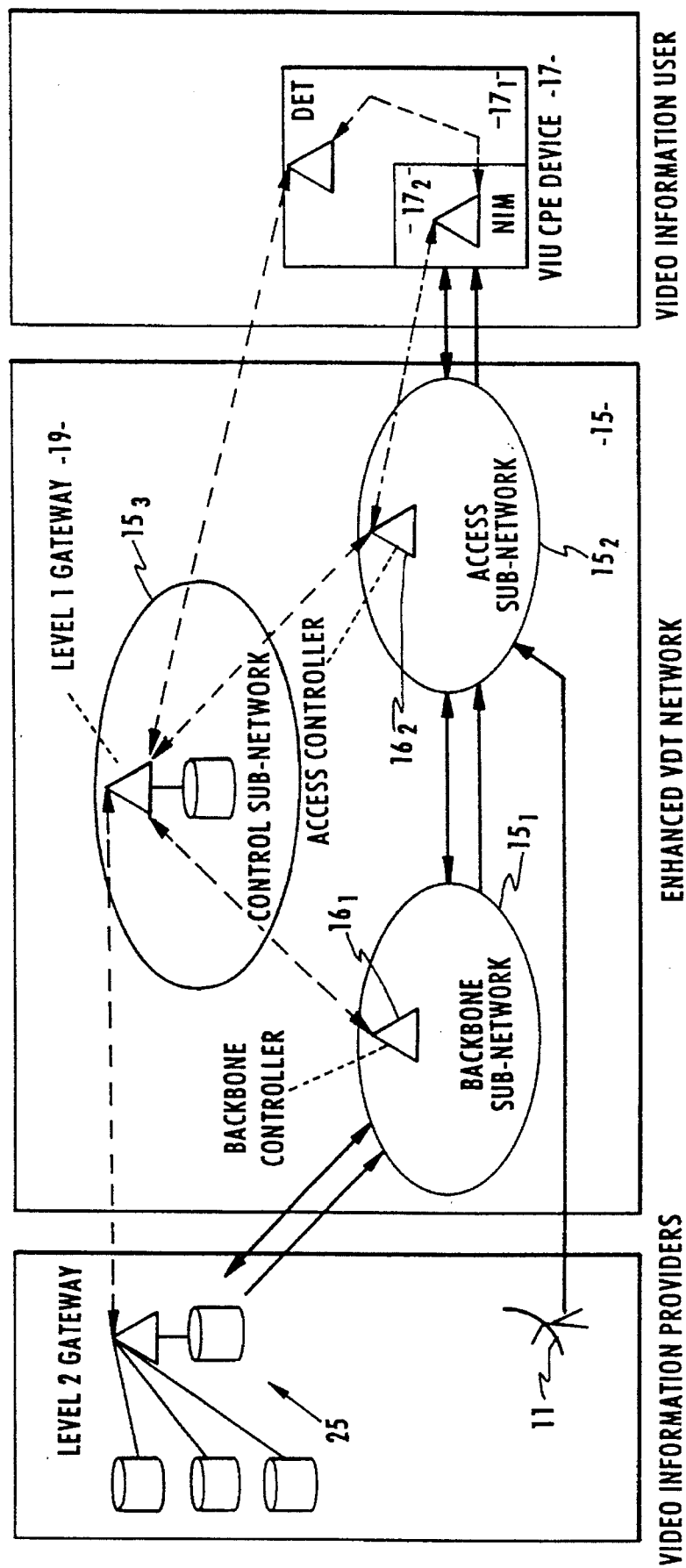
FIG. 3 is a simplified block diagram of a communication network using the Level 1 Gateway of the present invention to control a wide range of broadcast and interactive multimedia services.

FIG. 3 is a high level functional diagram of a network providing broadcast and interactive broadband services, through an a backbone subnetwork $15_1$ and an access subnetwork $15_2$, under control of the inventive Level 1 Gateway 19.

The preferred embodiment illustrated in FIGS. 5 to 9 and discussed later utilizes asynchronous transfer mode (ATM) transport in the backbone network and RF transport technology for local loop distribution to the subscriber's terminal through the access subnetwork. The Level 1 Gateway functionality of the present invention, however, applies to other broadband networks using other transport technologies in the backbone network and the access subnetwork.

FIG. 3 therefore provides a generic illustration of the video dial tone (VDT) transport network 15. As shown, the network 15 comprises a backbone subnetwork $15_1$ and one of several possible access subnetworks $15_2$. The access subnetwork distributes broadcast programming to customer premises devices 17 and dynamically provides transport for interactive service related signals to and from the customer premises devices 17. The backbone subnetwork $15_1$ provides two-way communications between IMTV service VIPs and nodes of the access subnetwork $15_2$.

Certain digital program signals carried on the network may be encrypted in the access subnetwork, using encryption technology and key codes. Details of specific encryption algorithms and the key codes for encrypting and decrypting the signals are well known to those skilled in the art and familiar with the relevant patents and literature. Preferred procedures for downloading the key codes to the elements in the access subnetwork which encrypt the signals and the decoders in the CPE devices will be discussed later.

The enhanced VDT network 15 may be considered as including a separate control subnetwork $15_3$, however, the principle component of that network is the Level 1 Gateway 19. The control subnetwork $15_3$ will also include some means to store a variety of information relating to services provided through the network, VIPs and VIUs for use by the Level 1 Gateway 19, either in a separate data storage system as shown, or in storage within the computer system serving as the Level 1 Gateway 19. The backbone subnetwork and the access subnetwork each include a controller which is the single point of contact between the Level 1 Gateway 19 and the respective subnetwork. Specifically, the backbone subnetwork $15_1$ includes a backbone controller $16_1$, and the access subnetwork includes an access controller $16_2$.

Figure 4:
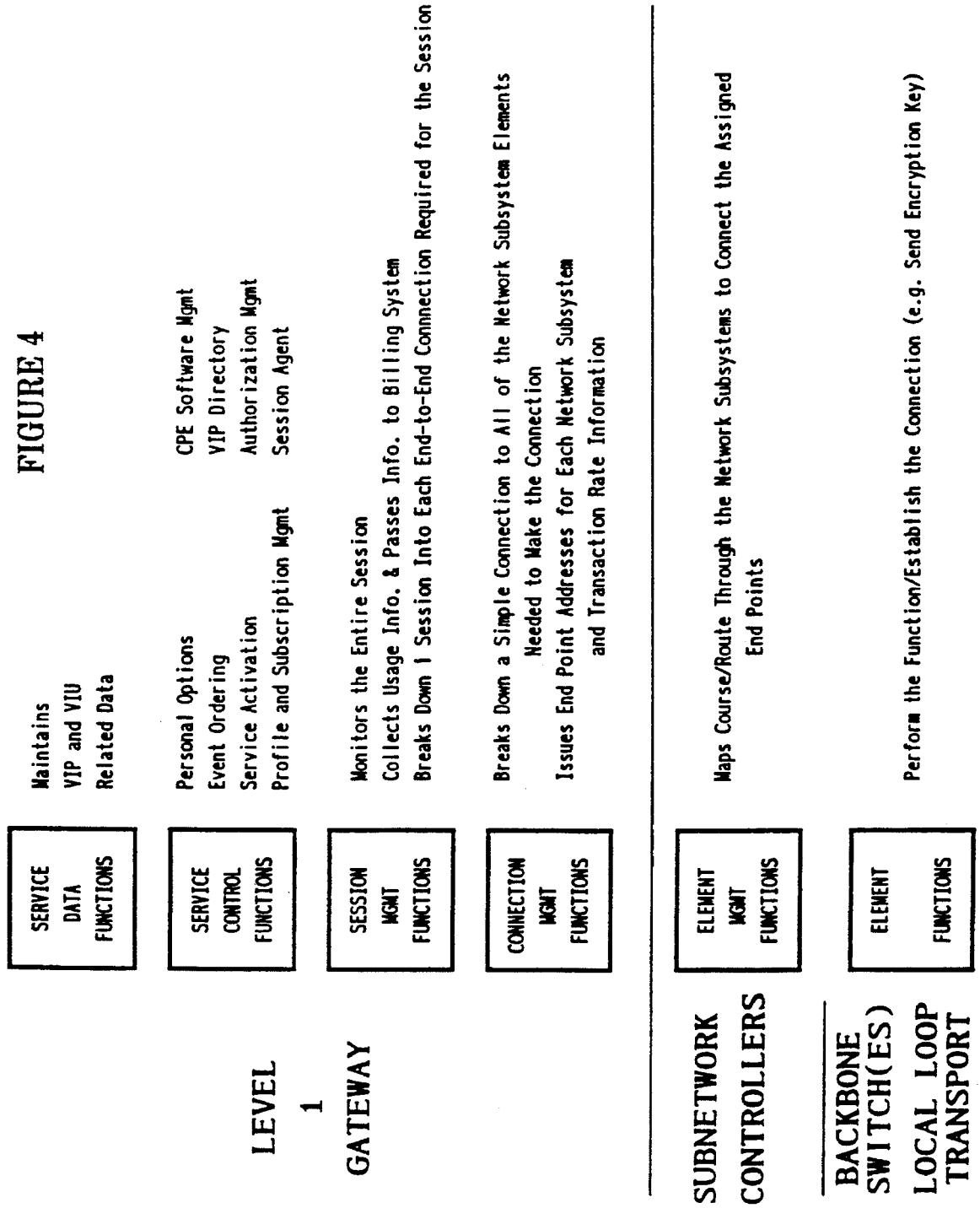
FIG. 4 presents a high-level overview of the control functions of a network of the type shown in FIG. 3 and delineates those functions performed by the Level 1 Gateway from those performed by other network components.

For example, in the network embodiment shown in FIG. 4 of the parent application, pending patent application Ser. No. 08/304,174 filed Sep. 12, 1994, the loop distribution interface and associated hybrid-fiber-coax distribution system constituted an access subnetwork. The video manager then served as the access subnetwork controller. The backbone network included the ATM switch, and the backbone subnetwork controller was the permanent virtual circuit (PVC) controller.

In the network illustrated in instant FIG. 3, a number of broadcast video information providers (VIPs) operate one or more broadcast sources 11, which have a one-way connection (downstream) to various nodes of the access subnetwork $15_2$. The broadcast signals may be analog or digital or a combination of both, as discussed below. In the preferred embodiment, each digital source supplies a number of broadcast programs to the access subnetwork $15_2$ in ATM cell form.

A source 11 will supply the program signals, e.g. ATM cells containing digitized broadcast information for a broadcast service, to the network 15 at all times that the service is to be available through the network. For video services, for example, the original source video material is digitally encoded and compressed, and the digital video information is packetized in ATM cells for transport through the network 15. The ATM cells can represent service signals for broadband services (e.g. video), audio services (e.g. radio) or data services (e.g. text).

In the preferred embodiment, the VIU's customer premises equipment (CPE) 17 consists of a Digital Entertainment Terminal (DET) $17_1$ which includes a network interface module (NIM) $17_2$ adapted to connect the DET to the specific type of loop distribution plant servicing the subscriber's premises. For broadcast services, the DET $17_2$ typically is able to select and process any digital or analog channel broadcast through the access subnetwork $15_2$ to which the customer subscribes.

For premium services requiring some form of network connection control, e.g. on-line selection of a pay-per-view event, the subscriber's terminal or CPE device 17 sends a request signal to the Level 1 Gateway 19 within the control subnetwork $15_3$, as illustrated by the separate dotted line from the DET to the Level 1 Gateway 19.

In response to the instructions from the Level 1 Gateway 19, the access controller $16_2$ causes the access subnetwork $15_2$ to supply program signals for the requested broadcast service to the customer's CPE device 17. The routing functionality of the access subnetwork for broadcast services depends on the structure thereof. In the preferred embodiment, enabling reception of a broadcast program requires identifying the RF channel carrying the program to the DET and supplying certain information needed to decode the program signals to the DET $17_1$ and/or the NIM $17_2$. The Level 1 Gateway 19 will store usage data identifying the requested service in its associated database, for billing purposes, for audience surveys, maintenance purposes, etc.

For interactive multi-media television (IMTV) type services, the system will include a number of interactive service video information providers (VIP's) systems 25. As discussed in more detail later, each IMTV VIP 25 operates some form of source or server for transmitting information downstream through the network 15 to a terminal which has requested an interactive session with the particular VIP. Each IMTV VIP 25 also operates a control element, referred to as a level 2 gateway, which provides two-way signaling communications to the Level 1 Gateway 19 and provides two-way signaling communications through the network 15 to the CPE devices 17 subscribers who have established interactive sessions with the VIP. The level 2 gateway controls operations of the server in response to instructions from the Level 1 Gateway 19 and various information input by subscribers through their respective CPE terminal devices 17.

The signaling communications for the IMTV VIP's 25 may go through a separate signaling network, as in the embodiment of FIG. 1, but in the preferred embodiment the signaling communications for those VIP's goes through the backbone subnetwork $15_1$. The IMTV VIP's will typically offer broadband interactive services, such as video on demand, video based home shopping and video games, but these VIP's may offer other interactive services, such as interactive text services and interactive audio services (e.g. voice mail and audio on demand).

To establish a session with one of the interactive VIP's 25, a user operates his or her terminal device 17 to interact with the Level 1 Gateway 19 to identify the particular VIP of choice. Once the subscriber selects the VIP 25, the Level 1 Gateway 19 instructs the backbone subnetwork $15_1$ and the access subnetwork $15_2$ to establish at least a broadband downstream link between the VIP's server and the particular subscriber's CPE device 17 and provides any necessary information to the IMTV VIP's equipment.

If the system uses a separate signaling network, the Level 1 Gateway 19 or the VIP's control equipment (level 2 gateway) would initiate a parallel two-way signaling link from the VIP's control equipment to the subscriber's terminal, in a manner similar to the operation in the network of FIG. 1. If the signaling rides on the backbone subnetwork $15_1$, the instructions from the Level 1 Gateway 19 to the controllers $16_1$ and $16_2$ could also establish the signaling link between the VIP's level 2 gateway and the subscriber's terminal device 17. Once the broadband and signaling links are up and running, the subscriber interacts with the VIP's equipment to obtain a particular desired service, e.g. to order a video of choice.

FIG. 4 depicts a functional hierarchy stack of the software and network operations relating to the Level 1 Gateway in the preferred network implementation. As shown in FIG. 4, the network functionality can be conceptually divided into six block elements, service data functions, service control functions, session management functions, connection management functions, element management functions and actual element functions. The service data functions, service control functions, session management functions, and connection management functions all are performed by software application modules running on the Level 1 Gateway 19.

In the diagram of FIG. 4 and the following description thereof, "VIU" refers to the video information user or subscriber.

The service data functions application module provides real time access to the customer and the network. The service data functions also include accumulation and maintenance of service related data. In particular, the service data includes VIP related data and subscriber or VIU (video information user) related data. The VIP related data function stores service profile information (VIP identification code, sever port information, level 2 gateway signaling address, type of DET's serviced by each VIP's equipment, etc.) for each VIP and makes that information available to the service control functionality as needed. The VIU related data function stores subscriber service profile information for each end user and makes that data available to the service control functionality as needed. The user profile data may include information such as the type of DET, DET identifications (if necessary), global address and/or billing telephone number, signaling address, etc.

The second functional level performed by an application software module running in the Level 1 Gateway 19 relates to the service control functions of the network. This is the level at which most of the interactions with the VIP and the subscriber take place. As shown, these interactions between the Level 1 Gateway and the DET include personal options, event ordering, service activation, profile and subscription management, CPE software management, VIP directory/menu, authorization management and session agent.

Personal options permits a subscriber to customize certain video dial tone related options through direct interaction with the Level 1 Gateway 19. Examples of personal options set up and modified through this interaction with the Level 1 Gateway include PIN numbers, VIP menus, and hours of service. Another personal option might allow the subscriber to specify certain times of the day or week when the network should permit access to certain broadcast or interactive services.

The event ordering interaction permits a subscriber to interact with the Level 1 Gateway to specify a pay-per-view event to be broadcast in the future which the user wants authorized in advance, to insure on-time reception. As part of this function, the Level 1 Gateway maintains event related data for the various broadcast VIP's and their respective events and interacts with the subscriber through the DET to inform the subscriber of upcoming events and receive event order inputs from the subscriber. The Level 1 Gateway 19 also signals the DET $17_1$ at the appropriate time to at least notify the user and may instruct the DET to turn on and/or select the appropriate channel and digital video slot to receive and display the ordered event.

The service activation function permits the user to specify various levels of broadcast service that are to be provided to the subscriber through the subscriber's DET's. The profile and subscription management function is similar and related to the service activation function. The profile and subscription management application provides an automated means for the user to alter the user's profile and subscription information stored in the Level 1 Gateway. This software application submodule communicates relevant change information to necessary systems, e.g. CPE software management, session management and/or network management, to implement desired changes. For example, this application submodule can be used to change scrambling, encryption or interdiction status of a broadcast channel for the user. As another example, through the profile and subscription management function the Level 1 Gateway would interact with the subscriber to add service for a new DET at the subscriber's premises.

Under the CPE software management function, the Level 1 Gateway will download software needed by the DET for a particular call, if needed. Examples of such software downloaded from the Level 1 Gateway include broadcast channel maps, signaling protocol versions, and complete signaling protocols. Also, if the DET $17_1$ is not capable of communicating with a VIP selected by the subscriber, the Level 1 Gateway 19 can download a translation program to the DET to convert messages compatible with the DET to and from message formats compatible with the VIP's equipment. Depending on the type of downloaded software, the downloading may occur only once at the time of installation, periodically or on an as-needed basis.

The VIP directory/menu application submodule presents an interface to the end user to navigate among video dial tone service features offered through the network. This application submodule presents the user with options, receives selections from the users and translates selections into service requests for processing by the session agent function application submodule. Options available to the user, in an initial preferred embodiment, include: establishing an internal session (within Level 1 Gateway) with a profile/subscription application, establishing an internal session (within Level 1 Gateway) with an event scheduling/ordering application, establishing an external session (with a level 2 gateway) to a particular interactive VIP, help functions, terminate a current session and resume an earlier interactive session (one of two maximum). For some VIP's, the VIP directory/menu application software may also provide menus of the particular VIP's services. For example, if one VIP offered video on demand, home shopping and home banking services, that VIP might have the Level 1 Gateway present the user with a menu of those services before actually proceeding to establish the session with that VIP's equipment. The VIP would have access to the menu data to update that data as needed.

The authorization management application submodule provides a generic authorization control capability that can be re-used across different ones of the services applications. This functionality would be separate and in addition to the PIN number functionality offered by the personal options. The authorization management application software, for example, might be used to define a pass code to permit a subscriber access to the event scheduling/ordering application, particularly if the subscriber is paying for the ordered event by credit card.

The session agent function or application submodule of the Level 1 Gateway actually translates a subscriber's request to communicate with a particular VIP and that VIP's acceptance of the call from the subscriber into a command to the next level to take actions to set up the desired communication session. Specifically, the agent application maintains status information for each user session, whether the session has an external end-point to a VIP or an internal end point within the Level 1 Gateway (e.g. to the directory/menu application, the event scheduling/ordering application, etc.). The session agent application responds to various requests from the user, from the VIP, or from the application within the Level 1 Gateway to establish, modify or breakdown a session and provides appropriate instructions to the session manager application to actually establish, modify or breakdown sessions. In turn, the session agent functionality receives feedback from the session manger as to the results of the instructions and in response thereto provides reports to the end users and to the VIP's. The session agent application submodule controls which sessions are active at any time, from an end user perspective, and which if any sessions become active upon termination of an existing active session. For applications internal to the Level 1 Gateway, the session agent also effectively wakes up and terminates the relevant application. Another feature of the session agent application is that it provides a mechanism to notify the user of events, e.g. network failures. Finally, the session agent functionality provides billing related information to the billing system.

As seen from the above discussion, the service control functions provide commands to the next lower level functionality to start making and/or terminating the communication connections through the network. The next lower level functionality, the session management functions breaks down each session into each end-to-end connection required for that session. The session management software application module maintains addresses of the network interface points of all of the VIP servers and each user's DET. The session management module functionality responds to requests from the session agent application to establish and breakdown session, relates user and VIP identifiers to the appropriate addresses for their respective network interface points and converts each individual session between two network interface points into the individual connection links needed for that session. The session management application module then provides appropriate requests to the network connection management functionality to establish and break down the individual connections which make up a session, and the session management application module receives feedback on the results of those requests. The session management application also monitors the entire session to maintain status information regarding active system topologies, and this application collects the actual usage information and passes that information to the billing system.

The connection management application module also has access to addresses of the network interface points of all of the VIP servers and each user's DET as well as the addresses of the entry and exit points of each subnetwork. The connection management application breaks down each end-to-end connection identified by the session management functionality into all of the network subsystem elements needed to complete the connection. This application coordinates with the subnetwork controllers (backbone controller $16_1$ and access controller $16_2$) to determine availability of necessary transport capability and issues requests with end point addresses for each network subsystem (e.g. from an IMTV VIP and from the access subnetwork controller) for the requisite connectivity. Using this methodology, the connection management application module responds to requests from the session management function to establish and break down a connection between interface points of a VIP and an end user by providing corresponding requests to the relevant subnetwork controllers. The connection management application also receives feedback from the element management functionality applications performed by those controllers and notifies the service management application of events, such as failures.

Each element management function maps the course or route through the respective network subsystem and provides instructions to the relevant network elements to produce the actual connections. In the preferred embodiment, ATM element management is the function of the PVC controller which corresponds to the backbone controller $16_1$ of FIG. 3. Routing through the access subnetwork in the hybrid fiber-coax distribution network to the individual terminal devices 17 is controlled by an access subnetwork controller discussed in more detail below.

In the preferred implementation, the ATM element management functionality maintains a view of allocated ATM connections and available resources across the ATM portion of the network. The backbone subnetwork controller functionality responds to commands from the connection management application of the Level 1 Gateway to establish paths through the backbone subnetwork. In the ATM subnetwork implementation, the PVC controller provides instructions to the ATM switching elements to establish the connections. The backbone subnetwork controller functionality also collects event and status data and aggregates traffic statistics through the backbone switching elements. Another function of the backbone subnetwork element management application is to notify the connection management application of events, such as failures, in the backbone subnetwork.

The access subnetwork management applications performed by the access subnetwork controller respond to requests from the connection management application of the Level 1 Gateway 19 to establish both downstream video communications and one-way or two-way signaling communications over the hybrid fiber-coax distribution system.

The last element of the functional hierarchy stack depicted in FIG. 4 relates to the actual element functions. For the ATM implementation of the backbone subnetwork, this function is preformed by the ATM switch or switches which will provide switched ATM virtual circuits for point to point connections from VIP's servers to ports of the access subnetwork. As part of its operations, the PVC controller will collect traffic statistics from the ATM switch(es) and monitor the status of the backbone switch fabric and of individual connections. Each ATM switch receives and responds to commands from the ATM portion of the element management function, i.e. from the PVC controller, to establish and tear down ATM connections and provides notice of various events (including failures) to the element management function.

The actual element function for routing through the hybrid fiber-coax implementation of the access subnetwork to individual DET's is performed by allocation of channel resources and control of the encryption and decryption operations in that subnetwork, as discussed in more detail below with regard to FIGS. 5 to 9.

Specific Network Architecture

Figure 5:
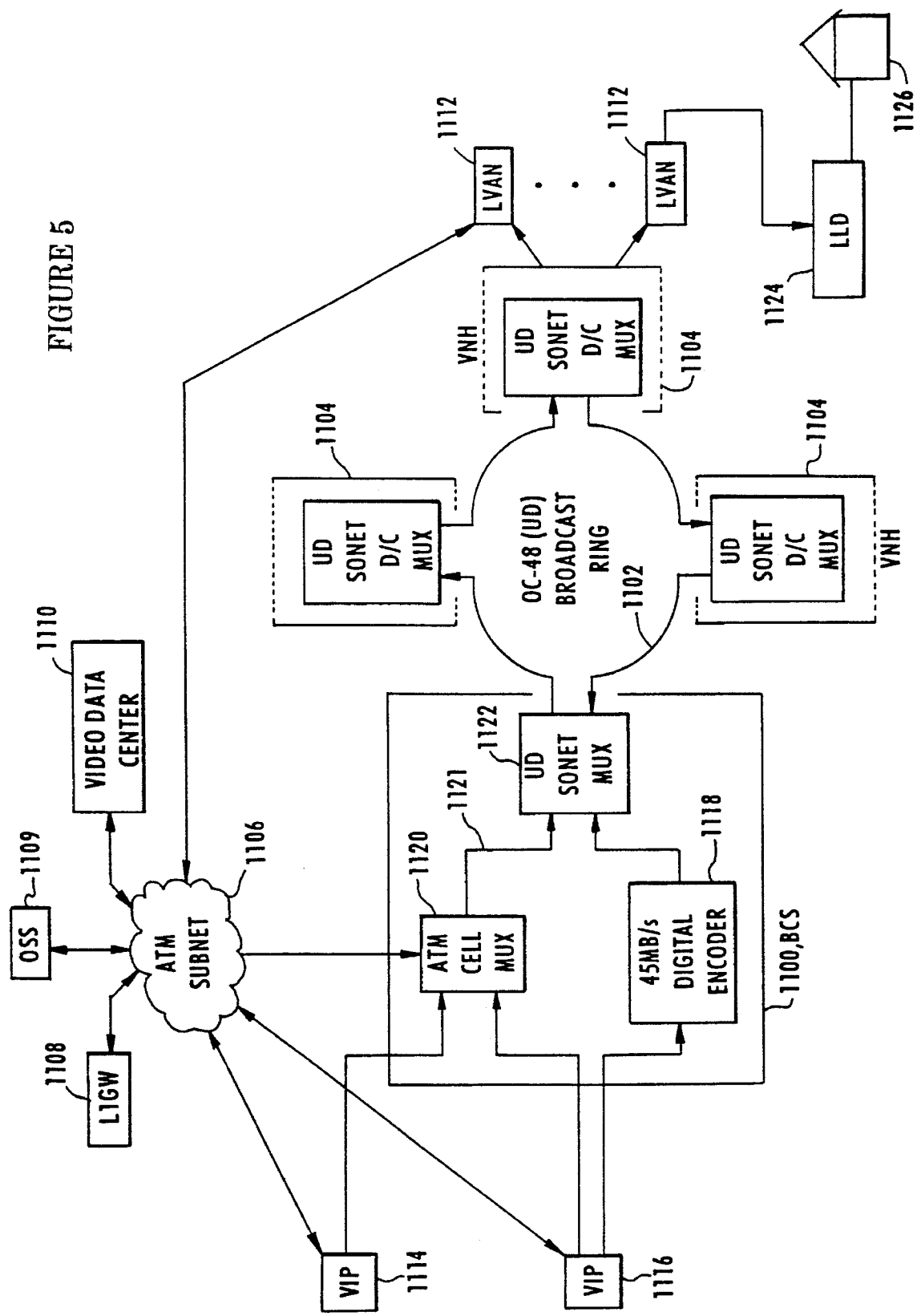
FIG. 5 is a block diagram of a distributed network architecture for the preferred implementation of the broadband data full service type video dial tone network utilizing the inventive Level 1 Gateway according to the present invention.

FIG. 5 discloses a distributed network architecture for a broadband data full service type enhanced video dial tone network according to a preferred embodiment of the present invention. FIGS. 6 to 9 provide more detailed illustrations of portions of the network of FIG. 5.

The network of FIG. 5 includes a Level 1 Gateway 1108, an ATM subnetwork 1106 and an access subnetwork. In this implementation, the access subnetwork includes at least the broadcast ring 1102, the video network hub offices (VNHs) 1104, a plurality of local video access nodes (LVANs) 1112, and a plurality of local loop distribution (LLD) networks 1124 providing communications between customer premises 1126 and the serving LVAN 1112. The broadcast consolidation section (BCS) 1100 may also be considered as a part of the access subnetwork. The network interface module (NIM) portion of the user terminal preferably also is an element of the access subnetwork.

As in the network overview of FIG. 3, each subnetwork includes a subnetwork controller. For the ATM subnetwork 1106, the controller is a PVC controller 1248, shown in FIG. 9. The access subnetwork controller 1240 also is shown in FIG. 9.

Figure 7:
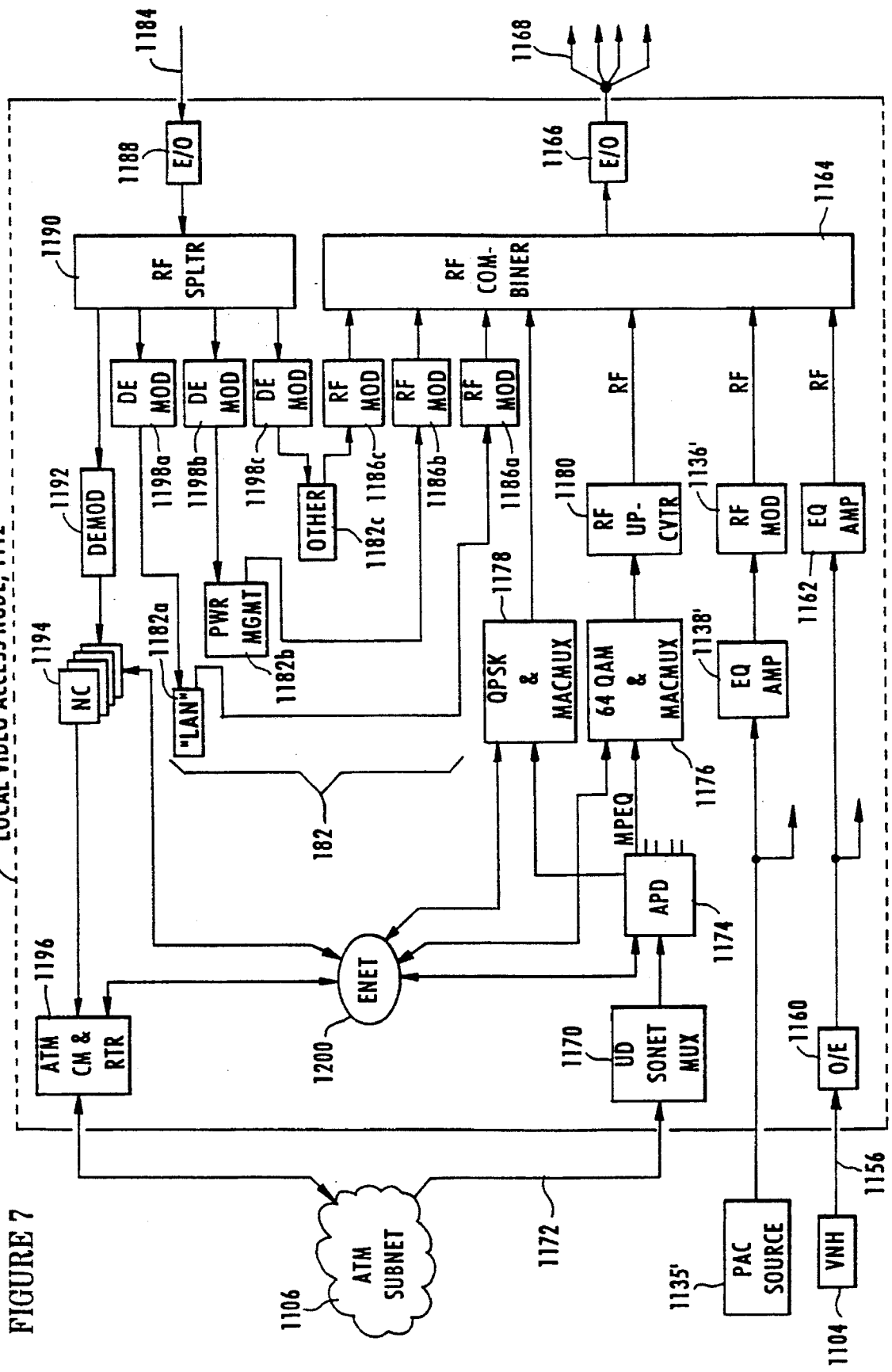
FIG. 7 is a block diagram of one of the local video access node type end offices shown in FIG. 5.
Figure 8:
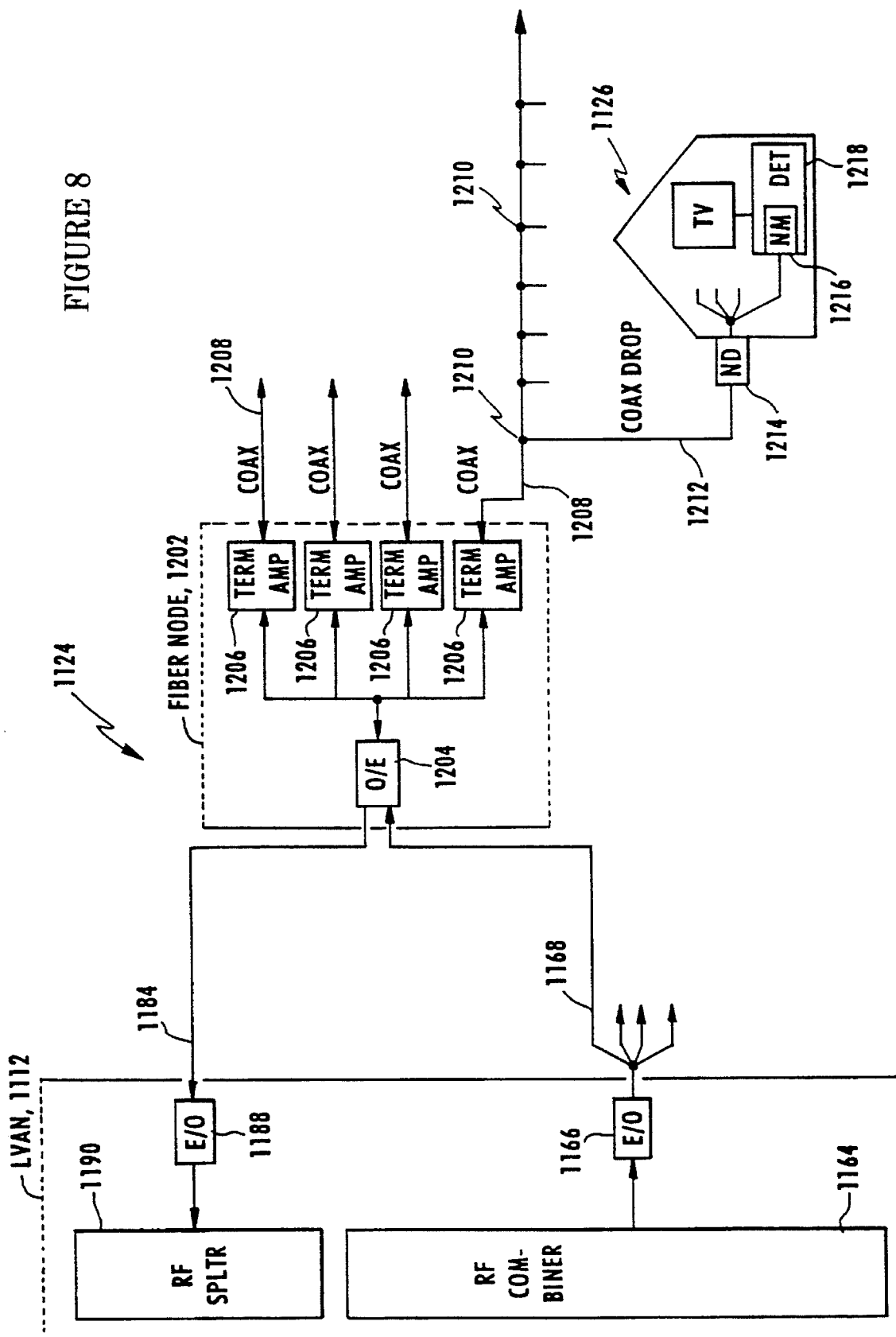
FIG. 8 is a block diagram of one local loop distribution system portion of the network shown in FIG. 5.
Figure 9:
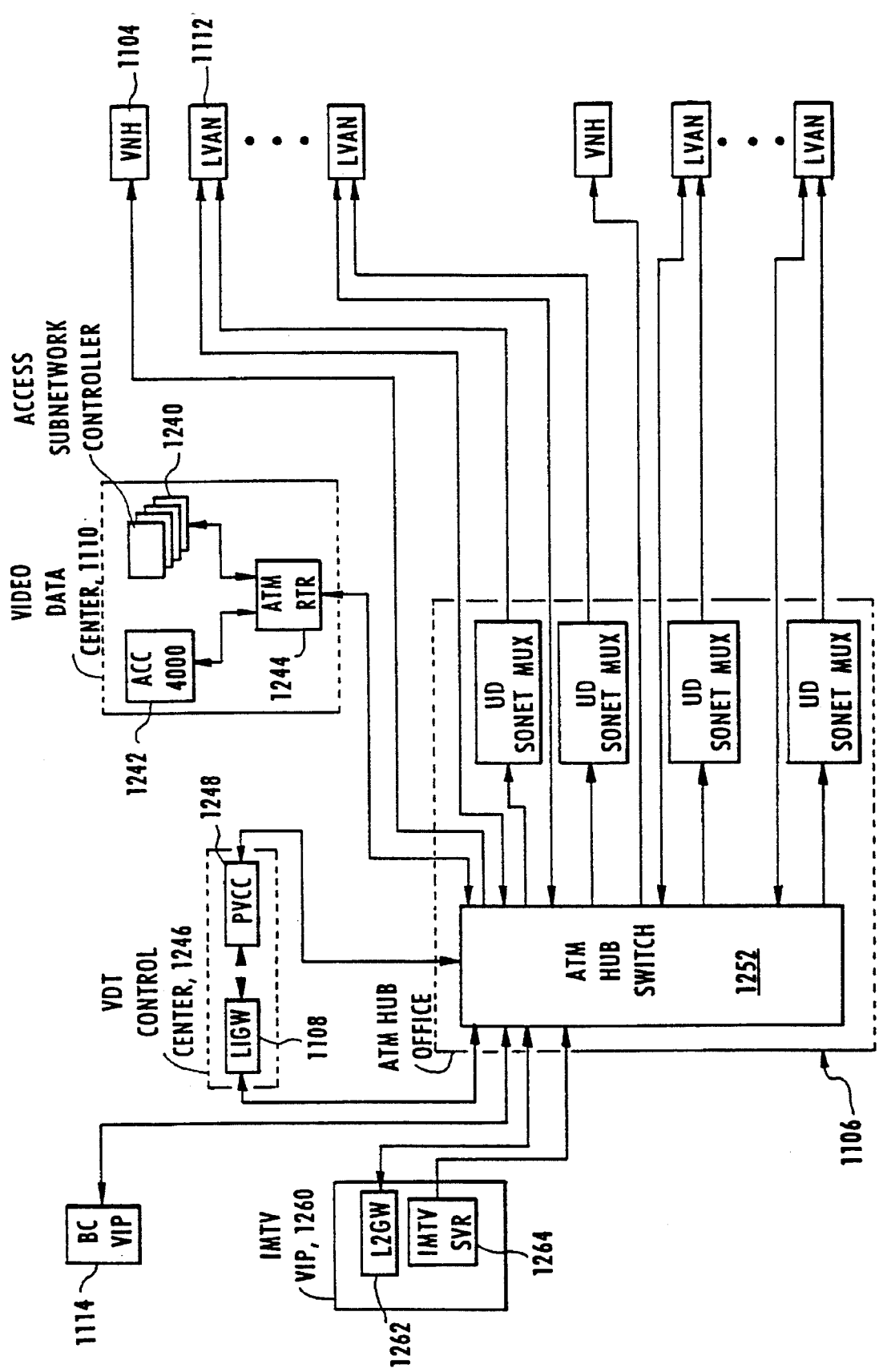
FIG. 9 is a block diagram of the ATM backbone network and the control systems for the network shown in FIG. 5.

The physical structure of the Level 1 Gateway 1108 in the network of FIGS. 5 to 9 is essentially the same as in the earlier embodiment except that the interfaces are different. Essentially, the Level 1 Gateway 1108 is a UNIX based computer having adequate processing power and data storage capacity. In this embodiment, the Gateway 1108 has an interface for two-way ATM cell based communication through the ATM backbone subnetwork. In an initial implementation, the Level 1 Gateway 1108 has a direct data communication interface to the PVC controller 1248, as shown in FIG. 9. In that implementation, the PVC controller 1248 interfaces to the programmed control elements of the ATM hub switch 1252 through an X.25 packet data interface.

In a future implementation, the PVC controller 1248 will have an ATM interface to the hub switch 1252. Through this interface, the PVC controller 1248 will transmit instructions to the hub switch 1252 and receive confirmations and various reports from the hub switch. The Level 1 Gateway 1108 will also communicate with the PVC controller 1248 using ATM through the ATM subnetwork, in a manner similar to the communications between that gateway and the access subnetwork controller 1240. The ATM interface between the PVC controller 1248 and the hub switch 1252 also will permit that controller to communicate with ATM access switches under its control.

The PVC Controller 1248 and the access subnetwork controller 1240 also are computers having the appropriate network interfaces and software programming. The ACC 4000 is a computer system programmed to administer encryption keys and NIM network addresses in the hybrid-fiber-coax type access subnetwork. Computers similar to the ACC 4000 are used today in CATV headend systems, but those computers also run software relating to other CATV operations, e.g. billing.

The network shown in FIG. 5 is arranged to centralize signal processing tasks within a LATA in order to minimize hardware. At the same time, the disclosed network provides maximum flexibility by providing communications to local access nodes, each serving a local loop of subscribers.

The network disclosed in FIG. 5 includes a broadcast consolidation section (BCS) 1100, a broadcast ring 1102, a plurality of video network hubs (VNHs) or video access nodes (VAN) 1104 coupled to the broadcast ring 1102, an ATM backbone subnetwork 1106, a Level 1 Gateway 1108, a video data control center 1110, and a plurality of video end offices or local video access nodes (LVANs) 1112. According to the preferred embodiment, each of the video network hubs 1104 will serve a corresponding plurality of up to six (6) LVANs 1112. In addition, the preferred embodiment will provide up to sixteen (16) VNHs 1104 serviced by the ring 1102.

The broadcast consolidation section 1100 serves as the broadcast head-end and network interface for broadcast VIPs 1114 and 1116. The broadcast consolidation section 1100 is adapted to receive broadcast video data in any format that may be convenient for the VIP. Specifically, the broadcast consolidation section 1100 includes a digital encoder 1118 to convert baseband analog video signals, for example from VIP 1116, into a digitally-compressed DS-3 signal stream. Alternatively, the digital encoder 1118 could be replaced with an MPEG-2 encoder to provide compressed MPEG-2 packets at a DS-3 rate.

The broadcast consolidation section 1100 also includes an ATM cell multiplexer 1120, also referred to as an ATM edge device, which performs policing and rate conversion of incoming ATM streams. The ATM edge device 1120 performs policing of ATM cell streams by monitoring the data rate of incoming data streams from VIPs. For example, if the VIP 1114 has subscribed by contract to transmit a data stream at 3 Mbits/s to the network, the ATM edge device 1120 will prohibit or drop ATM cells that are transmitted above the subscribed bit rate; in this case, a 6 Mbits/s stream would be rejected as an unauthorized rate.

In order to maximize the data-carrying capacity of the ATM streams supplied to the ATM edge multiplexer 1120, the VIP 1144 and the VIP 1116 will preferably supply digital video signals in compressed MPEG-2 format that are transported in ATM cells.

The MPEG-2 standard, recognized in the art, provides a standardized format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although video frames can vary in length, the transport packets have a fixed 188 byte size. Thus, different frames are broken down into different numbers of MPEG transport packets. For example, for a 6 Mbits/sec encoding system, a group of frames consisting of a total of 15 frames for one-half second of video breaks down into approximately 4000 transport packets.

Transport stream packets consist of a 4 byte header section, an optional adaptation field and a payload section. The header information includes, inter alia, a synchronization byte, a variety of different flags used in reconstruction of the video frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program reference clock (PRC) value within the optional adaptation field. For example, the PRC may be present in only 10 out of every 4000 video transport packets.

MPEG-encoded packets can be output in a variety of data rates. For example, the MPEG-2 compression standard is able to encode a video program to a 6 Mbits/sec bit stream, and packetize up to four (4) 6 Mbits/sec bit streams into a single 27 Mbits/sec stream. For other lower-rate data streams carrying text or signaling information, up to eight (8) 3 Mbits/sec bit streams can be packetized into a single 27 Mbits/sec stream, and up to sixteen (16) 1.5 Mbits/sec bit streams can be packetized into a single 27 Mbits/sec stream. Alternatively, six (6) analog audio-video program signals can be processed in parallel to provide six (6) 6.312 Mbits/sec MPEG-2 packets that can be output on a single 45.736 Mbits/sec DS-3 bit stream. In addition, a synchronous optical fiber such as SONET at 155 Mbits/sec (DL-3) can carry twenty (20) 6 Mbits/sec MPEG streams.

Thus, each of the VIPs 1114 and 1116 are preferably able to compress up to six (6) NTSC analog audio/video program signals in parallel into an MPEG-2 format. The resulting six (6) MPEG-2 packet streams with the appropriate overhead information are combined into a single MPEG-2 stream at 45 Mbits/sec (DS-3). The MPEG-2 streams are then converted into an ATM stream before transport to the ATM edge multiplexer 1120. The ATM streams may be output at a 45 Mbits/sec (DS-3) rate for carrying up to six (6) MPEG-encoded programs, or on an optical fiber at 155 Mbits/sec (OC-3) for carrying up to twenty (20) MPEG-encoded programs.

Asynchronous transfer mode or "ATM" transport is an advanced, high-speed packet switching technology. In ATM, information is organized into cells having a fixed length and format. Each cell includes a header, primarily for identifying cells relating to the same virtual connection, and an information field or "payload". According to the preferred embodiment, a 53 byte ATM cell includes a cell header consisting of 5 bytes and a payload consisting of 48 bytes of payload data. The ATM cell header information includes a virtual path identifier/virtual circuit identifier (VPI/VCI) to identify the particular communication each cell relates to. For example, the virtual path identifier (VPI) may be used to identify a specific VIP 1114 or 1116, and the virtual channel identifier (VCI) may be used to identify a specific output port of that VIP. In such a case, for example, VIP 1114 could be assigned a VPI value of "65", and VIP 1116 could be assigned a VPI value of "66". Thus, the VPI/VCI value of the ATM cell header could be used to identify the source of the ATM stream.

In ATM, transfer is asynchronous in the sense that the recurrence of cells that contain information from any particular sender is not necessarily periodic. Each device using the ATM network submits a cell for transfer when they have a cell to send, not when they have an assigned or available transmission time slot. However, the ATM cells may ride in synchronous slots on a high-speed time division multiplexed media, such as a SONET optical fiber. ATM allows any arbitrary information transfer rate up to the maximum supported by the ATM network, simply by transmitting cells more often as more bandwidth is needed.

During the ATM conversion process, the individual programs from the MPEG packets are broken into cell payloads and VPI/VCI header information is added to map the programs into ATM virtual circuits in the corresponding output cell stream. As noted above, each MPEG packet consists of 188 bytes, whereas each ATM cell includes 48 bytes of payload data. The preferred mapping scheme uses two different adaptations. The first adaptation maps one 188 byte MPEG packet into five ATM 48 byte cell payloads. The second adaptation maps two 188 byte MPEG packets into eight ATM 48 byte cells payloads.

MPEG packets of 188 bytes map efficiently into ATM cells if pairs of packets are mapped into 8 cells. However, a delay is imposed on mapping of a first cell while waiting for the second cell in the pair. To minimize jitter during decoding, the packets carrying the PRC need to be encoded and transported quickly. To avoid delaying first packets containing a PRC while processing a second packet, the ATM multiplexer 1215 maps first packets containing a PRC immediately, using the five cell adaptation procedure. As noted above, the PRC is typically present in only 10 out of every 4000 packets. Also, at least some of those 10 packets likely will arrive as the second packet of a pair. Consequently, only a very small number of packets are mapped using the less efficient 5-cell adaptation.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/VCI.

As noted above, the VIP 1114 and/or VIP 1116 may transmit the ATM cells on a SONET optical fiber at an OC-3 rate, or may transmit the ATM cells at a DS-3 rate. The transmission of ATM cells in an asynchronous DS-3 signal may require a common clock reference in order to ensure frame alignment. In a preferred network implementation, the network interface 1100 receives the DS-3 signal carrying six MPEG-2 channels in ATM cell format from the ATM VIPs in accordance with a physical layer convergence protocol (PLCP). The PLCP is a framing structure used to ensure that ATM cells are aligned with respect to a corresponding video frame, even though there may exist drifting of a start and end of a typical DS-3 frame. Specifically, the PLCP references a DS-3 header and identifies the location of each ATM cell with respect to the DS-3 header. Since the DS-3 frame contains a maximum of twelve ATM cells, the PLCP notes the location of each of the cells 1–12 with respect to the DS-3 header. Therefore, even though there may be DS-3 frame drifting, the PLCP ensures alignment, from a cell perspective, between the cell layer and the DS-3 frame so that each of the twelve ATM cells within each DS-3 frame can be located.

The ATM edge multiplexer 1120 acts as a groomer for multiple VIP terminations to prevent extraneous data from using network resources. The ATM streams from the VIPs 1114 and 1116 may arrive in either DS-3 format or via optical fiber in OC-3 format. The ATM edge device 1226 provides a grooming function, whereby ATM cells are analyzed, on a cell-by-cell basis, to determine if they should be transmitted on the network. Specifically, ATM cell headers that do not have valid data are dropped from the ATM stream. Each valid ATM cell is mapped on the basis of its corresponding VPI/VCI header either to a valid OC-3 output port of the ATM edge device 1120, or possibly to a null port. In addition, the ATM edge device 1120 maps the ATM idle bits containing no information that are present in the ATM stream from the VIPs to a null port, thereby rejecting the received ATM idle bits.

The ATM cell mapping, also referred to as cell translation, enables DS-3 ATM cell streams that are transmitted at less-than-full capacity to be mapped onto at least one OC-3c stream operating at full capacity. This is particularly effective when, for example, optical fibers used by the VIPs 1114 or 1116 to transport DS-3 ATM streams using optical fibers will not be operated at capacity, especially when VIPs using the optical fibers have varying bandwidth requirements over time. The ATM edge processor 1120 processes all incoming DS-3 bit streams received thereby, and maps the DS-3 bit streams into at least one condensed, or combined bit stream for transmission through the network. Specifically, the incoming DS-3 and OC-3 streams are supplied to corresponding first-in-first-out (FIFO) input buffers internal to the 1120 to supply the ATM cells to an internal multiplexer on a cell-by-cell basis. The internal multiplexer outputs the translated cells preferably to OC-3 output buffers for synchronous transmission on optical fibers 1121. Since the ATM cells are output at a rate of 155 MHz (OC-3), each of the optical fibers 1121 carry up to twenty (20) MPEG programs at 6 Mbits/sec. Thus, the ATM edge processor is able to fully load the downstream optical fibers 1121 thereby to fully load the capacity of the network. A more detailed description of the ATM cell multiplexer 1120 is found in copending and commonly-assigned application Ser. No. 08/380,744, filed Jan. 31, 1995, the disclosure of which is incorporated in its entirety by reference.

According to the preferred embodiment, the digital encoder 1118 outputs a digitally encoded data stream in DS-3 format (45 Mbits/s), and the ATM edge multiplexer 1120 outputs an ATM stream in OC-3c format (155.5 Mbits/s), to a SONET multiplexer 1122. The SONET multiplexer 1122 multiplexes the DS-3 and OC-3 signals from the digital encoder 1118 and the ATM edge multiplexer 1120 and outputs the consolidated broadcast data onto the unidirectional optical fiber broadcast ring 1102 operating at an OC-48 format (2488.3 Mbits/s). In other words, the SONET multiplexer 1122 may receive a plurality of OC-3 optical fibers 1121, either from the ATM edge multiplexer 1120 or a plurality of such multiplexers. In addition, the SONET multiplexer 1121 may receive a plurality of DS-3 signals from a corresponding plurality of encoders such as digital encoder 1118. The SONET multiplexer 1122 buffers the OC-3 and DS-3 input signals and multiplexes the input signals together at a rate of 2488.3 Mbits/sec. An exemplary SONET multiplexer is the FT-2000, manufactured by AT&T.

The broadcast ring 1102 is arranged as a drop-and-continue (D/C) SONET transport to service up to sixteen (16) VNHs 1104. Additional VNHs may be serviced by overcoming the distance limitations of the optical fibers. Although the broadcast ring 1102 preferably has one OC-48 fiber, the broadcast ring 1102 may be modified to include 2 or more OC-48 fibers for additional traffic, or for bidirectional traffic around the ring. As discussed below in detail with respect to FIG. 6, each VNH 1104 receives the broadcast ATM streams from the broadcast ring 1102, converts the ATM streams to MPEG-2 streams that are transmitted on an RF carrier, and adds local broadcast information (e.g., over-the-air access, public access channel) before transport to the associated LVANs 1112 as RF signals, preferably via optical fibers.

Each LVAN 1112 receives the consolidated broadcast data from the corresponding VNH 1104. The LVAN 1112 combines the received RF signals from the VNH 1104 with any data transmitted by the ATM backbone subnetwork 1106 addressed to a subscriber served by the LVAN 1112. The resulting RF signal is transmitted via a local loop distribution network 1124 to a number of customer premises 1126 (only one shown for convenience). As discussed below with reference to FIG. 8, the local loop distribution 1124 is preferably arranged as a hybrid fiber-coax distribution system, although an ADSL system or a fiber-to-the-curb system may be substituted.

The equipment at the subscriber site 1126 includes a network interface device (NID) for splitting the RF signal, a network interface module (NIM) for decoding encrypted data from the network and routing MPEG data streams, and a digital entertainment terminal (DET) for decoding the MPEG data streams passed by the NIM. Additional details regarding the NIM and the DET are discussed below with reference to FIG. 8.

As shown in FIG. 5, each LVAN 1112 has access to the ATM backbone subnetwork 1106 in order to send and receive network signaling information to and from the Level 1 Gateway 1108 and/or the video data control center 1110. For example, a video information user (VIU) who wishes service on the network via one of the LVAN's 1112 may request the service either by calling a network business office by telephone or by requesting a Level 1 Gateway session from his or her customer premises 1126 in order to perform on-line registration. As discussed in detail below, the ATM backbone subnetwork 1106 provides signaling information between the LVAN 1112 serving the VIU, the Level 1 Gateway 1108 and the video data control center 1110 in order to activate the VIU on the network, or to update the services available to the VIU.

The ATM backbone subnetwork 1106 also is adapted to communicate with the VIPs 1114 and 1116 in order to perform account management between the VIPs, the Level 1 Gateway 1108 and the video data control center 1110. For example, the VIP 1114 may supply a request to the Level 1 Gateway 1108 for a desired bandwidth in order to broadcast a pay-per-view event at a predetermined time. The Level 1 Gateway 1108 and the VIP 1114 will determine the appropriate VPI/VCI header to be loaded onto the ATM stream to be supplied to the ATM edge multiplexer 1120 of the broadcast consolidation section 1100. The Level 1 Gateway 1108 will inform the video data control center 1110 of the scheduled event, as well as the VPI/VCI of the video data stream. The Level 1 Gateway 1108 will also communicate with the VIPs 1114 and/or 1116 via the ATM backbone subnetwork 1106 in order to maintain up-to-date lists of authorized VIUs to receive the selected VIP services.

Finally, as discussed in detail below with respect to FIG. 9, the VIP 1116 may conduct an interactive (IMTV) session with a VIU via the ATM backbone subnetwork 1106 and the LVAN 1112 servicing the specific VIU. Although not shown in FIG. 5, the VIP 1116 can conduct IMTV sessions with a VIU using a level 2 gateway and an IMTV server internal to the VIP 1116. The level 2 gateway communicates with the Level 1 Gateway 1108 of the network, to receive and process requests for IMTV sessions that include routing information. The IMTV server outputs broadband data for the VIU as an ATM cell stream to the ATM backbone subnetwork 1106.

Communication between the network and the VIP 1116, as well as between the network and the VIU, is established under control the Level 1 Gateway 1108. From the VIU perspective, a user will communicate with the network via the Level 1 Gateway 1108 in order to select the VIP 1116 for an IMTV session. In a network providing access to multiple IMTV service providers, the user wishing to establish an IMTV session identifies the provider of choice to the Level 1 Gateway 1108 by inputting control signals to the user's DET, which supplies the appropriate signals upstream from the customer premises 1126 to the Level 1 Gateway 1108 via the corresponding LVAN 1112 and the ATM backbone subnetwork 1106. In response, the Level 1 Gateway 1108 controls the broadband routing functionality of the network to establish a downstream broadband communication link and a signaling link between the provider and the user.

The Level 1 Gateway 1108 receives notification of the status of broadband communications links as they are being set up and during ongoing communications through those links. The Level 1 Gateway 1108 therefore can inform a subscriber when a requested session can not be set up with a selected service provider, i.e. because the provider's server ports are all busy or because the subscriber is not registered with the particular provider or due to some technical problem. The Level 1 Gateway 1108 also recognizes when an established link develops a fault or is interrupted and can stop accumulating usage or billing data regarding that link. The Level 1 Gateway 1108 can also notify the subscriber and/or the service provider of the failure.

The Level 1 Gateway 1108 will also store various information relating to each subscriber's services and control service through the network accordingly. At least some of this stored data is accessible to the subscriber through a direct interaction with the Level 1 Gateway 1108. For example, the user can identify certain service providers to the Level 1 Gateway 1108 and define an authorization code or identification number which must be input before the network should provide a session with the user's equipment 1126 and the identified providers.

Many of the functions of the Level 1 Gateway 1108 relate principally to set up, monitoring and billing for point-to-point type interactive sessions. As noted above, however, a number of the Gateway functions also apply to broadcast services. For example, the interaction with the Level 1 Gateway 1108 can be used to advance order upcoming broadcast pay-per-view events. At the time for the event to begin, the Level 1 Gateway 1108 will transmit appropriate notice to the ordering subscriber's terminal. In response, the terminal may display the notice to the subscriber or the terminal may automatically turn on and/or tune to the appropriate communication link through the broadcast network to obtain the ordered event. The interactive features of the Level 1 Gateway 1108 also permit subscribers to specify limitations they wish to place on their broadcast services, e.g. total number of hours of usage within some defined interval and/or time of day/week of permitted usage. The Level 1 Gateway 1108 will then control the broadcast network and/or the subscriber's terminal in accord with the limits defined by the subscriber.

Figure 6:
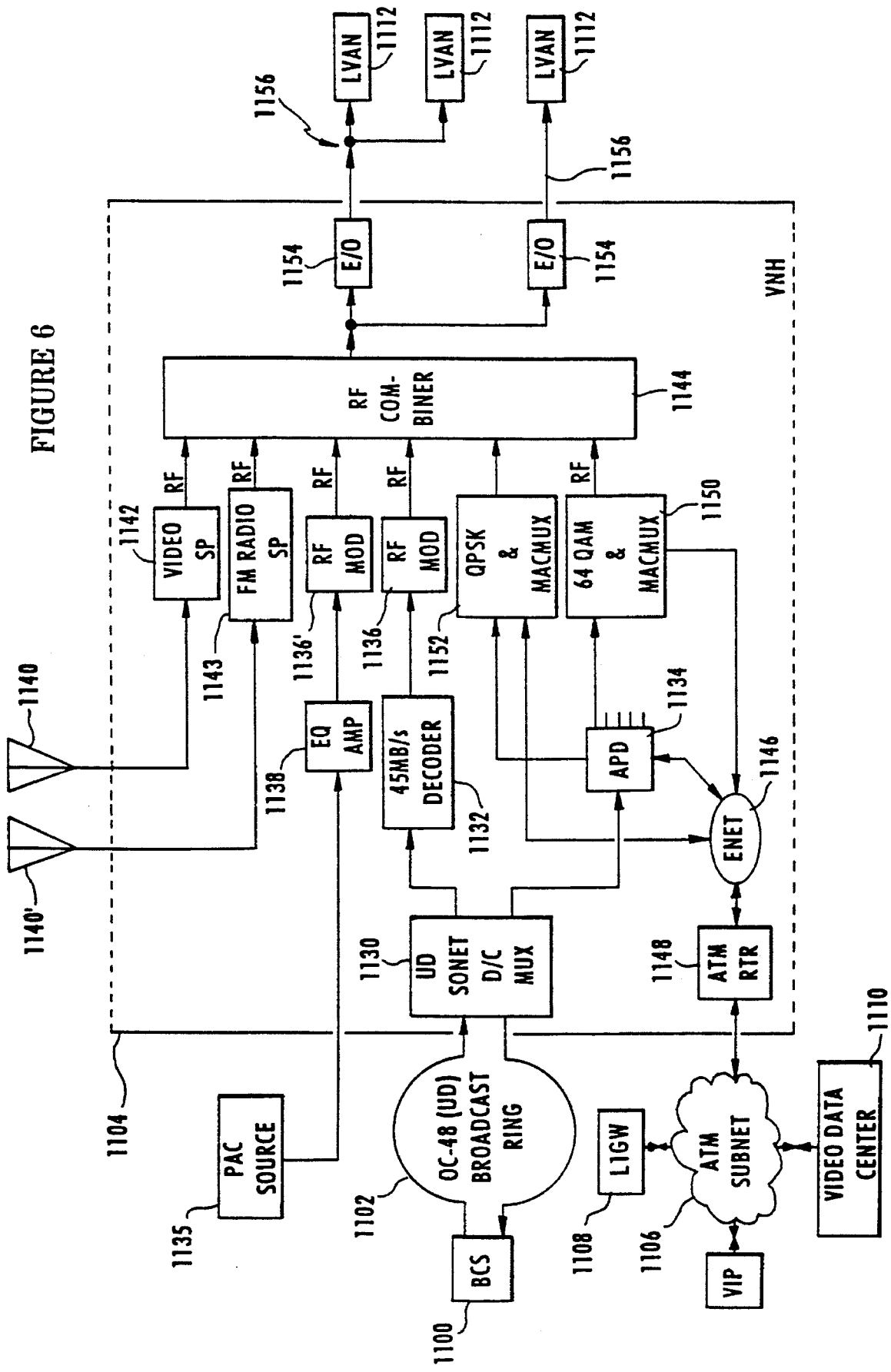
FIG. 6 is a block diagram of one of the video network hub offices shown in FIG. 5.

FIG. 6 is a block diagram of the network showing in detail a VNH 1104 in accordance with the preferred embodiment of the present invention.

As shown in FIG. 6, each VNH 1104, also referred to as a broadcast headend node, comprises a SONET multiplexer 1130 that receives the OC-48 signal from the broadcast ring 1102. The SONET multiplexer 1130 is a drop-and-continue (D/C) multiplexer that "drops" the OC-48 signal from the broadcast ring 1102 for local processing, and outputs the OC-48 signal to "continue" on the broadcast ring 1102. The SONET multiplexer 1130 converts the OC-48 signal to obtain the OC-3 ATM stream and the digitally-encoded (DS-3) baseband video signal output by the ATM edge multiplexer 1120 and the digital encoder 1118, respectively, as shown in FIG. 5.

The structure of ATM cells is generally recognized in the art. The ATM cell includes a header section and a payload section. In addition, the ATM cell may include additional overhead sections that provide additional vendor-proprietary features, such as priority level assignments, or forward error correction. The first byte of the header section includes a 4-bit GFC word which provides access control. The first byte of the header section also includes the lower four bits of an 8-bit virtual-path identifier (VPI). The second byte of the header section includes the upper four bits of the VPI and the first four bits of a 16-bit virtual circuit identifier (VCI). The third byte includes the next eight bits of the VCI. The fourth byte of the header section includes: the last four bits of the VCI; a 3-bit payload type (PT); and a cell loss priority (CLP) bit. The fifth byte of the header section 410 includes an 8-bit header error check (HEC) word. The CLP bit is used to manage traffic of ATM cells: in the event of network congestion, cells with CLP set to 1, indicating a lower priority, are dropped before cells with CLP set to 0.

The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference. According to the ATM User Network Interface Specification, the values 0–18 for the VCI are reserved; therefore, any ATM cell having valid data must have a VCI value greater than "18". Thus, prior to transmission on the network, the ATM edge multiplexer 1120 identifies ATM cells that do not have VCI values greater than "18" as idle cells that do not carry valid data.

Referring to FIG. 6, the SONET multiplexer 1130 extracts the ATM cells by analyzing the input stream in 5-byte increments in order to check the header/error/check (HEC) sequence for valid ATM data; if the SONET multiplexer 1130 verifies the HEC sequence, the 53-byte ATM cell is extracted and supplied to an ATM packet demultiplexer (APD) 1134. Although FIG. 6 shows only one ATM packet demultiplexer 1134, in the preferred embodiment the VNH 1104 includes a plurality of the demultiplexers.

The VNH 1104 includes an analog portion that receives analog baseband video signals from the VIPs, from a Public Access Channel (PAC) broadcast source 1135, and from Over-the-Air (OTA). Specifically, the SONET multiplexer 1130 outputs the DS-3 encoded baseband video signal to a DS-3 analog decoder 1132, which converts the DS-3 signal back to the VIP analog baseband video signal. The VIP analog baseband video signal is output from the analog decoder 1132 to a modulator 1136, which includes a tuner to mix the VIP baseband video signal from the analog decoder 1132 onto a specific 6 MHz bandwidth RF channel. The PAC Broadcast Source 1135 provides public access channel (PAC) programming related to community activities as a PAC baseband analog video signal, preferably via an optical fiber. A fiber optic receiver and equalizer amplifier 1138 converts the optical signal from the PAC Broadcast Source 1135 to a baseband analog PAC video signal that is supplied to a modulator 1136' for mixing to a specified 6 MHz channel.

The analog portion of the VNH 1104 also includes a plurality of antennas 1140 that receive Over-the-Air (OTA) broadcast signals at VHF and UHF frequencies. The OTA signals are supplied to an analog signal processor 1142, which performs signal conditioning and modulates the OTA signals to specified 6 MHz bandwidth RF channels. For example, the analog signal processor 1142 may modulate the OTA television channels 4, 7 and 9 to 24, 27, and 29, respectively, in order to avoid interference with the PAC or VIP analog video channels. The VNH 1104 may also include another antenna 1140' that receives FM radio signals and supplies the FM signals to an FM radio signal processor 1143. The signal processor 1143 outputs the FM radio signal within a specified RF band, preferably the FM radio band, to the RF combiner 1144.

Thus, the video signals output by the modulator 1136 and the analog signal processor 1142 are analog RF video signals at different 6 MHz RF channel frequencies, as well as the FM signals output by the signal processor 1143. The analog signals output from the FM radio signal processor 1143, the modulator 1136 and the analog signal processor 1142 go to an RF combiner 1144. The RF combiner 1144 is a passive combiner which combines the VIP, PAC and OTA analog video signals and the FM radio signal into a single RF signal. The video portion of the combined RF signal includes a plurality of analog 6 MHz channels. Thus, the VIP analog video signals, the PAC analog video signals and the OTA analog video signals can be received and viewed using a conventional television set, without the need for a digital entertainment terminal. Thus, these analog video signals could make up a basic video service analogous to the type offered by contemporary cable-TV companies. A video dial tone network subscriber can also receive FM radio broadcasts using a conventional FM receiver.

The RF combiner 1144, however, enables passive combining of different baseband analog video signals, as opposed to known cable-TV systems, which require a rewire of modulators whenever a change was made in channel allocation. Thus, changes in the channel allocation in the disclosed embodiment can be made merely by reprogramming the modulator 1136 and the analog signal processor 1142. As discussed below, the RF combiner 1144 is also adapted to combine RF signals carrying the compressed digital video signals from the VIP.

The digital portion of the VNH 1104 receives the compressed VIP digital video signals from the recovered OC-3c ATM stream output from the SONET multiplexer 1130. The OC-3c ATM stream is output from the SONET multiplexer 1130 to one of several ATM packet demultiplexers (APD) 1134 (only one shown for convenience). The APD 1134 performs ATM processing and repacketizes the MPEG-2 packets on the basis of the VPI/VCI headers of the incoming ATM streams. Specifically, the ATM packet demultiplexer 1134 buffers cells until it finds a cell having an ATM cell Adaptation Unit (AAU) value of "0" in its header (first cell) and another cell having an AAU value of "1" in its header (last cell). The ATM packet demultiplexer 1134 counts the number of cells from first to last to determine the type of adaptation used to map cells.

If the ATM packet demultiplexer 1134 has captured five cells, the receiver pulls out the payload data and uses the CRC data to check for errors. If there are no errors, the original MPEG packet is reconstructed from the appropriate bytes of payload data from the first four cells. Similarly, if the receiver has captured eight cells, the receiver pulls out the payload data, does the CRC based error check, and if there are no errors, the original pair of MPEG packets is reconstructed from the appropriate bytes of payload data from the eight cells.

The reconstructed MPEG packets are assigned new PID values based on the VPI/VCI value of the ATM stream that carried the MPEG packets. This mapping of a new PID values in response to the VPI/VCI of the ATM stream is based upon a translation table loaded into the ATM packet demultiplexer 1134 by the access subnetwork controller 1240, via a the ATM subnetwork and a signaling path 1146 (Ethernet or the like), discussed in detail below.

In a typical example, there are at least three PID values for packets of a particular program, a first PID value for packets containing video, a second PID value for packets containing audio and another PID value for a packet containing a program map. There often are more than three PID's associated with programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets continuing video, audio and/or data from the particular source.

In a combined MPEG packet stream carrying packets for two or more programs, the PID values for each program will be unique. For example, the program map for HBO might be found in packets corresponding to PID 132; the program map for TMC might be found in packets identified by PID 87 and so forth. The program map for HBO in the packet with PID 132 would then identify the PID numbers for the actual packetized elementary streams (PES) for the video, audio and data (if any) channels associated with the HBO program. The program map for TMC in the packet with PID 87 would then identify the PID numbers for the actual packetized elementary streams (PES) for the video, audio and data (if any) channels associated with the TMC program.

In the received OC-3c streams received by the APD 1134, the packets carried in the ATM cells have PID values assigned by the respective VIP's encoding equipment. The MPEG-2 standard also requires that a packet stream containing packets relating to one or more programs includes a program association table in a packet identified by PID 0. The program association table maps each program source with the PID value associated with the program map related to that source. In accord with the standard, the VIPs' encoders will construct the MPEG packet streams for each program to include a PID 0 packet containing the program association table. The program streams also include a packet identified by a PID value in that table containing the program map for that program. Thus, the APD can capture the program association table in packet PID 0 to identify the PID value for the program map from the source of programming and can capture the program map to identify the PID values applied by the source encoder to identify the data (if any), video and audio for the particular program. Alternatively, the APDs could be preprogrammed with the relevant PID values inserted by the VIPs' encoders. The translation table in the APD 1134 is used to map each PID value in the reconstructed packets of a particular program into a new PID value which is unique at least within the output stream of the particular output port of the APD, as a function of the VPI/VCI value of the received ATM cells.

For example, assume for convenience that the HBO program arriving at the APD consists of video packets with a PID value of 17 and audio packets with a PID value of 19. The program map is contained in a packet identified by PID value 3, and the program association table in packet PID 0 identifies PID '3' for the program map. The APD recognizes all of the packets as originating from a single program source based on the VPI/VCI of the ATM cells and maps the PID values into new unique values, e.g. 27 for video and 37 for audio. The APD also constructs a new program map containing the new PID values for video and audio and inserts the new map in a packet identified by PID value of 132.

The APDs provide five broadband (27 Mbits/s payload) output rails. Assuming 6 Mbits/s programs, the APDs combine four MPEG-2 packets streams of four such programs for output on each broadband rail. The APDs will combine more programs into each output transport stream if the programs use lower bit rates, e.g. 1.5 or 3 Mbits/s. If strict compliance with the MPEG-2 standard is necessary, the APDs can construct and insert a new PID 0 packet into each such broadband output stream. The PID 0 packet output in each broadband transport stream would include a new program association table for that transport stream, i.e. identifying the PID value of the program maps for the four or more programs contained in the broadband transport stream output.

As discussed in more detail below, reception of a particular digital program requires that the CPE terminal device know the RF channel transporting the program and at least one PID value associated with the program. Preferably, the PID value is that of the program map for the particular desired program, e.g. 132 in the above HBO example. Although the transport stream may include the program association table in packet PID 0 to insure compliance with the standard, the downloading of the PID value for the program maps eliminates processing time delays in channel surfing required to capture PID 0 packets.

The ATM packet demultiplexer 1134 outputs the reconstructed MPEG packets on one of five 27 Mbits/s digital signal paths or 'rails' to a corresponding modulator/multiplexer 1150. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six MHz channel allocation for transmission over a CATV type distribution network. Using 64 QAM (quadrature amplitude modulation), 4 channels of 6 Mbits/s MPEG encoded digital video information can be modulated into one 6 MHz bandwidth analog channel. Similarly, 16 VSB (vestigial sideband) yields 6 channels of 6 Mbits/s MPEG encoded digital video information modulated into one 6 MHz bandwidth analog channel. Each RF modulator produces a 6 MHz bandwidth output at a different carrier frequency.

In the illustrated preferred embodiment, the modulator/multiplexer 1150 is a Quadrature Amplitude Modulator (QAM) operating at 64 QAM, whereby media access control (MAC) is performed to ensure proper timing of the resulting time-division multiple access (TDMA) signal. Thus, each of the five 27 Mbits/s digital signals are 64 QAM modulated and multiplexed into an IF signal, which is upconverted into a specific 6 MHz channel. The QAM/multiplexer 1150 outputs the 6 MHZ channels to the RF combiner 1144 for combining with the other 6 MHz RF signals. The RF combiner 1144 thereafter outputs the combined RF signals to a lightwave transmitter 1154, which outputs the combined RF signals on an optical fiber 1156 for transmission to the local video access nodes 1112.

Although the disclosed network is designed to transport digital broadband data for high data-rate applications such as video, the network is also able to transport low data-rate information to be broadcast from an information provider to the VIUs. In such a case, the ATM packet demultiplexer 1134 will determine from the VPI/VCI that the received data is a low-rate data signal; consequently, the ATM packet demultiplexer 1134 will output the low-rate data signal in MPEG format to a quadrature phase-shift keyed (QPSK) modulator 1152, which modulates the low-rate data signal for RF transmission after passing through the RF combiner 1144. The low data rate transmission may carry text or signaling information from a VIP in some way relating to one or more services offered by that VIP.

Thus, the APDs 1134 map ATM cells into MPEG packets for both broadband services and narrowband information (e.g. signaling). The APD 1134 is programmed to map VPI/VCI values in the cells into certain PID values in the resultant packets. Based on the VPI/VCI value, the APD 1134 also will route the packets to an identified one of its outputs. The APD 1134 outputs broadband related packets and associated in-band signaling on one of five 27 (payload) Mbits/s output rails going to one of the 64 QAM modulators 1150. The APD 1134 outputs packets related to downstream out of band signaling on a separate 1.5 Mbits/s (payload) rail going to a QPSK 1152.

The signaling path 1146 coupled to the components of the VNH 1104 is preferably an Ethernet communication path. Although not shown in detail, the Ethernet signaling path 1146 provides signaling and control signals to each of the components of the VNH 1104. The Ethernet signaling path 1146 communicates with the video data control center 1110 via the ATM backbone subnetwork 1106 in order to provide the operating status of each of the components of the VNH 1104. Specifically, the Ethernet signaling path 1146 provides upstream signaling data to an ATM router 1148, which packets the Ethernet signals in ATM cell format, provides a VPI/VCI header for the intended destination of the Ethernet signal, and outputs the ATM stream onto the ATM backbone subnetwork 1106. The ATM backbone subnetwork 1106 routes the ATM stream from the ATM router 1148 of the VNH 1104 to a corresponding ATM router 1244 at the video data control center 1110 (FIG. 9). Preferably, the ATM backbone subnetwork 1106 routes ATM streams between the VNH 1104 and the video data control center 1110 along dedicated virtual paths. The ATM router 1244 at the video data control center 1110 receives the ATM stream, reassembles the Ethernet signals, and outputs the Ethernet signals on its local Ethernet bus with a destination corresponding to the VPI/VCI of the ATM stream. The ATM virtual circuit to the video data control center 1110 is a two-way circuit and carries instructions from the video data control center 1110 back to the components of the VNH 1104.

FIG. 7 discloses one of the network local video access nodes (LVAN) 1112 according to a preferred embodiment of the present invention. The disclosed LVAN 1112 is one of a plurality of LVANs that is distributed throughout the network service area in order to provide service to customers. In early implementation stages, however, it is anticipated that the first deployed LVAN 1112 may be collocated with the VNH 1104 in order to service a limited service area. Later deployed LVANs 1112 will be located remotely from the VNH 1104.

One of the electrical-to-optical converters 1154 in the video network hub (VNH) 1104 transmits the combined RF spectrum signal over an optical fiber 1156 to one of the local video access nodes (LVNs) 1112. As shown in FIG. 7, the LVAN 1112, also referred to as a video central office or video end office, includes an optical-to-electrical (O/E) receiver 1160 that converts the optical RF signal from the optical fiber 1156 to an electrical RF signal. The RF signal output from the O/E receiver 1160 is supplied to an equalization amplifier 1162 for signal conditioning before RF combination by an RF combiner 1164, similar to the RF combiner 1144 shown in FIG. 6. The combined RF signal is output from the RF combiner 1164 and reconverted to an optical signal by the electrical-to-optical (E/O) transmitter 1166. The E/O transmitter 1166 supplies the optical signal to the local loop distribution via optical fibers 1168.

If desired, the LVAN 1112 may also combine the RF signal from the VNH 1104 with a local PAC broadcast signal supplied by a local PAC source 1135. In such a case, the local PAC broadcast signal is received by a fiber optic receiver and equalizer amplifier 1138', which supplies the conditioned local PAC broadcast signal to the modulator 1136' for conversion to an RF signal at an available 6 MHz channel before combining by the RF combiner 1164.

The LVAN 1112 also provides signaling traffic between the VIU and the network, as well as broadband traffic for interactive multimedia television (IMTV) sessions. Specifically, the LVAN 1112 includes a SONET multiplexer 1170 that receives optical signals carrying ATM streams from the ATM backbone subnetwork 1106 via a unidirectional OC-48c optical fiber 1172. The SONET multiplexer 1170 converts the OC-48 signal into OC-3c signals carrying ATM streams. The ATM cells transport IMTV traffic and VIU signaling traffic from the VIPs and the network, respectively. The OC-3c signal is input to an APD 1134, which repacketizes the ATM cells into MPEG format and assigns PID values based on the VPI/VCI value of the received ATM cells. The APD 1134 preferably is identical to the ATM packet demultiplexer 1134 in the VNH 1104 and performs the packet reconstruction and PID value mapping in exactly the same manner as discussed above.

The APD 1174 determines from the VPI/VCI value whether the ATM cells transport broadband data such as video, or narrowband data such as VIU signaling information or text data. The APD 1174 outputs the broadband data in one of five 27 Mbits/s MPEG streams to one of five 64-QAM MACMUX modulators 1176. In addition, the APD 1174 outputs the narrowband data as an MPEG stream to a QPSK modulator 1178, which modulates the MPEG stream carrying narrowband data for combining by the RF combiner 1164. The 64-QAM MACMUX modulator 1176 outputs the modulated broadband signal to an RF upconverter 1180, which outputs the modulated broadband signal on an available 6 MHz RF channel for combining by the RF combiner 1164. Thus, the RF combiner outputs a combined RF stream carrying 6 MHz channels of information to the VIUs from different sources, including broadcast VIPs, PAC Broadcast Source 1135', IMTV VIPs, and network controllers for signaling traffic.

An additional feature of the present invention is that the information output by the RF combiner 1164 is not limited to broadband video from broadcast or IMTV VIPs, and signaling traffic from the network. Rather, since the VIU is able to transmit information to the LVAN 1112 via a optical fiber upstream signaling link 1184, the LVAN 1112 may be adapted to transmit to the VIUs information from any data source. For example, reference numeral 1182 denotes other data sources that can use the disclosed network for transport to the VIU: a user could remotely access a LAN source 1182a using the upstream signaling link 1184 for two-way communication; the network could control power to the user's DET, or alternatively work in conjunction with electric utilities to read a user's electric meter using a power management controller 1182b; or a reserved port 1182c could be set aside for future interactive data applications. In such a case, the data is output from one of the sources 1182 to a corresponding RF modulator 1186 before combining by the RF combiner 1164.

Upstream signaling from the VIU is received from the upstream signaling link 1184 by an E/O receiver 1188, which outputs the multiplexed RF signal from the VIUs to an RF splitter 1190. The RF splitter 1190 splits the RF spectrum and outputs the split RF spectrum on predetermined signal paths. For example, a predetermined RF channel will contain signaling information to be supplied from the VIU to the Level 1 Gateway 1108, such as a request for new service, or a request for an IMTV session with a VIP via a Level 2 gateway. This VIU signaling information will be supplied to a demodulator 1192 to demodulate the signaling information off the RF carrier. The demodulator 1192 will output the demodulated VIU request to one of thirteen (13) network controllers (NC) 1194, each of which processes VIU requests and identifies the destinations for the requests from a specified group of CPE devices. The NC 1194 passes each VIU request to an ATM router 1196, which receives inputs from the network controllers, packetizes the VIU request in an ATM cell stream, adds a VPI/VCI header to identify the destination of the request, and outputs the ATM stream onto the ATM backbone subnetwork 1106. The processing of the VIU request is discussed in more detail below.

As discussed above, the upstream signaling link 1184 may provide upstream signaling data for the other data sources 1182. For example, the RF splitter 1190 outputs an RF signal at a predetermined band to one of the demodulators 1198 corresponding to the devices 1182. The demodulators 1198 remove the RF carrier signal and output the demodulated signal to the corresponding device 1182.

As discussed above with respect to FIG. 6, the VNH 1104 includes an Ethernet control network to control the components of the VNH 1104. Similarly, the LVAN 1112 comprises an Ethernet system 1200 for controlling the components of the LVAN 1112. As discussed in detail below with respect to FIG. 9, the Ethernet system 1200 communicates with the network via the ATM router 1196, which passes Ethernet messages between the Ethernet system 1200 and remote Ethernet systems via the ATM backbone subnetwork 1106.

FIG. 8 discloses an exemplary implementation of the local loop distribution network 1124 shown in FIG. 5 in accordance with the preferred embodiment of the present invention. Although the local loop distribution 1124 shown in FIG. 8 is a hybrid-fiber coax system, one having ordinary skill in the art will appreciate that other local loop distribution systems may be used, such as Asymmetrical Digital Subscriber Loop (ADSL), Fiber-to-the-Curb, or direct fiber to the living unit. One preferred alternative utilizes a switched digital video fiber-to-the-curb access subnetwork such, as shown in FIG. 3 of the parent application.

As shown in instant FIG. 8, the combined RF signal output from the RF combiner 1164 is converted to an optical signal by the E/O transmitter 1166 and output to the local loop distribution 1124 on the optical fibers 1168. Generally, the optical signal will be provided to a plurality of optical fibers via an optical splitter, preferably a maximum of four optical fibers per combiner 1164. Each optical fiber 1168 carries the combined analog RF signal to a fiber node 1202. According to the preferred embodiment, each fiber node 1202 serves one broadcast service area (BSA) of up to 500 homes passed.

The fiber node 1202 comprises an O/E transceiver 1204 that provides two-way conversion between optical and electrical RF signals transmitted to and received from a plurality of terminal amplifiers 1206. Each terminal amplifier 1206 outputs the downstream electrical RF signal onto a coaxial cable 1208. The coaxial cable 1208 is designed to pass one hundred twenty five (125) homes. Specifically, a tap 1210 is installed along the 1208 for each living unit that wishes activation on the network. A coaxial drop cable 1212 is wired between the 1210 and the customer premises 1126. Thus, assuming each home receives a tap 1210 for service on the network, each coax cable 1208 will service up to 1125 homes.

As shown in FIG. 8, the customer premises 1126 includes a network interface device (NID) 1214, a network interface module (NIM) 1216, and a digital entertainment terminal (DET) 1218. The NID 1214 receives the coax drop 1212 and splits the RF signal into four coax signal paths. Each home or living unit 1126 is preferably allocated a capacity of four digital entertainment terminals 1218 (DET's). Each coax feed is supplied to the NIM 1216, which demodulates the downstream RF signal at a user-specified channel frequency. If the demodulated RF signal is an analog video signal from an analog source (such as the PAC 1135), the NIM 1216 passes the baseband analog video signal directly to the television set without further processing by the DET 1218.

If, however, the NIM 1216 receives an MPEG encoded signal, the NIM 1216 will de-encrypt the 27 Mbits/s MPEG encoded signal using a key downloaded from the network's ACC-4000 (described in detail below). Upon de-encrypting, the NIM 1216 supplies the 27 Mbits/s MPEG encoded signal to the main portion of the DET 1218 for further processing to present a selected program to the user.

The NIM 1216 also demodulates a downstream signaling channel carrying signaling data in MPEG packets. From the signaling channel, if the MPEG encoded signal has a PID value corresponding to the NIM address, the NIM 1214 processes the MPEG stream as NIM signaling data. If, however, the PID value corresponds to the DET address, the NIM 1214 extracts the data from the MPEG stream and outputs that data to the DET CPU. Alternatively, the NIM and DET may have a single PID value address, in which case, data within the signaling packet indicates whether the message is for the NIM or the main portion of the DET.

The DET of the present invention is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software, and at least one VIP (the VIP selling the DET) can download all or a part of the operating system. In non-volatile memory (ROM and non-volatile RAM), the DET will store a loader program and an operating system. The loader program and operating system in the ROM and the non-volatile RAM will include sufficient programming to control initial communications and define interfaces and drivers, e.g. for graphics to define the base line functionality of the DET for all service applications the DET will run.

The NIM 1216 provides the interface necessary for the DET 1218 to communicate with the local loop distribution system 1124. The structure of the NIM 1216 is dependent on the local access technology (in this case, hybrid-fiber coax), the NIM 1216 provides standardized control signals to and from the DET 1218, Consequently, the main portion of the DET 1218 can be implemented as a generic consumer product that is independent of the local access technology, whether it is hybrid-fiber coax, ADSL, satellite receiver, or fiber to the curb.

Although not shown in FIG. 8, the NIM 1216 presents two connections to the DET 1218, a high bit rate broadband connection and a low bit rate signaling connection. The broadband connection is a one-way downstream only connection, but the low-bit rate signaling connection is a two-way connection.

The NIM 1216 includes a frequency agile demodulator for processing the downstream narrowband transmissions. The demodulated data may relate to NIM functions or to functions of the main portion of the DET 1218. The NIM also includes a frequency agile QPSK modulator, to permit transmission of upstream signaling information over the coaxial cable on specified RF channels not used for downstream transport. The main portion of the DET can supply messages to the NIM for such upstream transmissions, and under certain circumstances, the NIM's internal control processor can transmit upstream messages in this manner.

As discussed below, the network assigns each NIM 1216 to a default channel for downstream reception and a default channel for upstream transmission. The QPSK demodulator and the QPSK modulator within the NIM can also shift to other channels allocated on a dynamic basis, e.g. to provide signaling for IMTV services requiring more bandwidth than is available through the default channels.

The main portion of the DET 1218 receives selected MPEG streams from the NIM 1216, and decompresses selected MPEG packets in order to recover the original digital signal. If the digital signal is narrowband signaling information for the DET 1218, the signaling information is supplied to the DET microprocessor as raw data, for appropriate processing. If the digital signal is broadband information, the NIM 1216 supplies the MPEG packet stream to the main portion of the DET via a broadband (e.g. 27 Mbits/s) interface. The DET determines whether the data in the broadband MPEG packets is digital video or audio data or other broadband data, and supplies the data through respective MPEG decoders to the television or to the DET microprocessor, accordingly.

The DET 1218 is adapted to receive and store downloaded control software. The DET 1218 can establish a link to the network via a Level 1 Gateway session to receive operation systems code, default channel maps, and permissions tables in order to receive broadcast services from multiple VIPs. In some cases, the DET may also establish a point to point link to a VIP's interactive equipment. For broadcast services, the DET captures a cyclically broadcast application, for example navigation software.

The DET 1218 captures and processes a digital channel based on the RF channel and the PID value associated with the program map for the particular source program. As noted above, the program map specifies the PID values for packets continuing video, audio and/or data from the particular source. For example, HBO might be one of four digital programs carried in RF channel 53, and the program map for HBO might be found in packets corresponding to PID 132. The program map for CBS in the packet with PID 132 would then identify the PID numbers for the actual packetized elementary streams (PES) for the data (if any), video and audio channels associated with the HBO program.

Once the DET 1218 identifies and captures the programming map, the MPEG decoder section can extract the video elementary stream, the audio elementary stream(s) and any associated data stream for decoding of the programming.

Within an identified video elementary stream, video sequence headers define things like frame rate, resolution, and the coordinates on the screen where display of the image should begin. Such coordinates are useful, for example, in defining pictures within a picture when multiple pictures are superimposed. In each video stream packet, after the video header sequence, the packet contains the actual video syntax which, in the case of MPEG, includes the normal frames associated with video compression, such as I frames and B frames, etc., in MPEG.

In the preferred network implementation, the NIM 1216 stores the decryption keys that are supplied from the APD 1134 via the downstream signaling channel output on the 64-QAM MACMUX modulator 1176 and the RF upconverter 1180 in FIG. 7. The NIM uses those keys to decrypt selected programs before supplying the program signals to the main portion of the DET. Thus, a user's DET 1218 receives only authorized MPEG data streams, thereby improving network security and reducing the ability of unauthorized users to access other video programming.

A more detailed description of the structure of the DET and NIM and the operations thereof involved in downloading applications software and operating system changes into the DET are disclosed in copending application Ser. No. 08/380,755, filed Jan. 31, 1995, incorporated herein in its entirety by reference.

FIG. 9 is a block diagram illustrating the relation of the ATM backbone subnetwork 1106, the video data control center 1110, and a Video Dial Tone (VDT) control center including the Level 1 Gateway 1108 shown in FIG. 5. As shown in FIG. 9, the video data control center 1110 includes an access subnetwork controller 1240, an ACC-4000 1242, and an ATM router 1244 for sending and receiving ATM cell streams to and from the ATM backbone subnetwork 1106.

The access subnetwork controller 1240 communicates with the elements in the VNHs 1104 and the LVANs 1112 via the ATM router 1244, dedicated virtual circuits through the ATM subnetwork 1106 and the ATM routers 1148, 1196 and associated Ethernets 1146, 1200 in the respective offices. The ACC 4000 1242 communicates with the APDs 1134, 1174 in the VNHs 1104 and the LVANs 1112 via the ATM router 1244, dedicated virtual circuits through the ATM subnetwork 1106 and the ATM routers 1148, 1196 and associated Ethernets 1146, 1200 in the respective offices. For example, through such communications, the access subnetwork controller 1240 downloads PID value mapping information based on the VPI/VCI values of incoming cells to the respective APDs, and the ACC 4000 1242 downloads encryption keys to the APDs. The ATM router 1244 and the ATM backbone network 1106 also permit the access subnetwork controller 1242 to communicate with the Level 1 Gateway 1108 of the present invention.

The VDT Control Center 1246 comprises the Level 1 Gateway 1108 and a Permanent Virtual Circuit (PVC) controller 1248. Although not shown, the VDT Control Center 1246 includes a corresponding ATM router to repacketize the ATM cells and supply the messages to the Level 1 Gateway.

The PVC controller 1248 is the external controller for the ATM subnetwork 1106. The ATM subnetwork 1106 includes at least one hub ATM switch 1252, as shown in FIG. 9. In future implementations providing IMTV services from larger numbers of VIPs to larger numbers of VIUs, the ATM subnetwork 1106 will include the hub switch 1252 and a number of ATM access switches (not shown). The access switches will provide connections from the hub switch to particular nodes of the access subnetwork.

As shown, the PVC controller 1248 connects directly to the ATM hub switch 1252. In one implementation, this is an X.25 connection. When upgraded to interact with multiple ATM switches, the PVC controller 1248 has an open interface to all of the ATM switches to allow communication with and control of switches produced by various manufactures. In the preferred multi-switch embodiment, an ATM signaling connection from the PVC controller 1248 provides communications with the programmed controller of the hub switch itself and provides virtual circuit connections through the hub switch to the programmed controllers of the various ATM access switches. Although not shown in FIG. 9, the ATM hub switch 1252 may also provide a dedicated permanent virtual circuit for the communications between the Level 1 Gateway 1108 and the PVC controller 1248.

The PVC controller 1248 interfaces to the network operations support system (OSS) 1109, the Level 1 Gateway 1108 and the one or more switches of the ATM subnetwork 1106. The PVC controller 1248 serves as the single point of contact between the Level 1 Gateway 1108 and the ATM backbone subnetwork 1106. All signaling and control messages to and from the ATM subnetwork 1106 are communicated between the PVC controller 1248 and the Level 1 Gateway 1108.

The PVC controller 1248 stores data tables defining all possible virtual circuits through the ATM switch network. These data tables define the header information and the particular input port and output port used to route cells from each interactive multimedia (IMTV) service VIP to an input point on the access subnetwork. The data tables thus define "permanent virtual circuits" (PVC's) between the providers and the input ports of the access subnetwork. The data tables within the PVC controller also define various dedicated circuits for communications between various controllers of the network and/or to the VIP's equipment. The tables in the PVC controller 1248 include current availability data for VPI/VCI values and an ongoing record of which VPI/VCI values are in use. Thus, at any given time the PVC controller 1254 knows what VIP/VCI values are available to and can be assigned dynamically to provide requested bandwidth for each new IMTV session.

The ATM backbone subnetwork 1106 also comprises a plurality of unidirectional SONET multiplexers 1254. Although only four (4) SONET multiplexers 1254 are shown in FIG. 9. It should be understood that all connections to and from the ATM switch 1252 are preferably at a transmission rate of OC-3 or OC-48.

According to the preferred embodiment, the ATM switch 1252 routes all ATM streams on the basis of the VPI/VCI of the cell streams. The ATM stream virtual path is controlled by the PVC controller 1248, which provides switching control instructions to the ATM switch 1252 to set up the virtual paths in the ATM switch 1252 from the source to the destination in response to assignments from the Level 1 Gateway 1108. In addition, each VNH 1104 and LVAN 1112 is assigned a predetermined virtual path for communication with the video data control center 1110, thereby relieving management requirements by the PVC controller 1248. Upstream signaling traffic from a VIU to the Level 1 Gateway 1108 or the video data control center 1110 is routed along dedicated virtual paths.

The access subnetwork controller 1240 controls all routing of broadband and narrowband data throughout the access subnetwork in response to bandwidth requirements supplied from the Level 1 Gateway 1108. For example, in the case of broadcast services such as pay-per-view, the broadcast VIP 1114 may desire to broadcast broadband data to be transported by the network. As shown in FIG. 9, the broadcast VIP 1114 communicates with the Level 1 Gateway 1108 via the ATM backbone subnetwork 1106 to exchange interactive broadcast signaling information in order to request a specified bandwidth at a scheduled time. Alternatively, the broadcast VIP 1114 may communicate with a business office in the network, whereby the broadcast information is loaded from the business office into an OSS system 1109, and from there, into the Level 1 Gateway 1108. The Level 1 Gateway 1108 will send an instruction to the access subnetwork controller 1240 that bandwidth is required at the scheduled time for a specified duration. The Level 1 Gateway will specify the logical network channel number for the channel that will carry the event. From that information the controller 1240 can identify the ATM stream having a VPI/VCI header value for the transmission from VIP. The access subnetwork controller 1240 sends signaling messages throughout the access subnetwork to establish the bandwidth at the correct time: the ATM edge multiplexer 1120 receives a message that the specified VPI/VCI is permitted to pass into the network; and the ATM packet demultiplexer 1134 is loaded with the appropriate PID values to map the ATM stream to an MPEG stream having a specified MPEG format. The access subnetwork controller 1240 will also send an instruction to the ACC-4000 1242 to send an encryption key to the ATM packet demultiplexer 1134 to encrypt the program before RF transmission to the LVANs 1112.

At the customer premises as shown in FIG. 8, an authorized VIU will have downloaded into the NIM 1216 the encryption key from the ACC-4000 1242 via a control channel (broadband) or an out-of-band signaling channel.

The VIU will access the Level 1 Gateway 1108 in order to initiate an IMTV session with an IMTV VIP 1260. As shown in FIG. 9, the system of the IMTV VIP 1260 includes a Level 2 gateway 1262 for communication with the Level 1 Gateway 1108 via the ATM backbone subnetwork 1106 and with the DET 1218, and an IMTV server 1264 for outputting broadband video data in ATM streams to the ATM backbone subnetwork 1106.

During the communication session between the subscriber and the IMTV VIP 1260, the DET 1218 can transmit control signalling upstream through the ATM subnetwork 1106 to the level 2 gateway IMTV VIP 1260. The level 2 gateway IMTV VIP 1260 can also send signaling information, such as control data and text/graphics, downstream through the same path to the DET or as in-band data included within the broadband output stream from the server 1264. For downstream transmission, the server 1264 will provide ATM cells with an appropriate header. The ATM switch 1252 will route the cells using the header and transmit those cells to the APD 1134 serving the requesting subscriber 1236 for conversion to MPEG format. In the presently preferred embodiment, the downstream signaling from the VIP is included as user data (in-band) as part of the broadband MPEG packet stream transmitted to the DET from the server 1264.

Certain VPI/VCI values would be assigned and available to each IMTV VIP, and other VPI/VCI values would be assigned to the access subnetwork. For each session, the access subnetwork controller would pick the port and VPI/VCI value for entry into the access subnetwork, and the VIP would pick the output port and the VPI/VCI value to be output by its equipment. The Level 1 Gateway supplies both port identifiers and the two end point VPI/VCI values as terminating and originating information to the PVC controller as part of the request for connection through the backbone subnetwork 1106. The PVC controller 1248 assigns VPI/VCI values within the ATM subnetwork.

Each physical port of the ATM subnetwork 1106 will have more than one VPI/VCI assigned to cells passing through that port. The PVC controller 1248 stores data corresponding to each port that indicates the VPI/VCI values in use for each connection ID. When the Level 1 Gateway 1108 requests a connection through the ATM subnetwork 1106, the PVC controller 1248 accesses its data tables to determine if the requisite bandwidth is available between the two identified ports. If not, the PVC controller 1248 returns a negative acknowledgement message indicating the reason for the inability to complete the requested connection. If the bandwidth is available, the PVC controller 1248 provides appropriate instructions to the switch or switches which will establish the link and provides a confirmation reply message to the Level 1 Gateway 1108 when the link through the ATM subnetwork 1106 is complete.

Level 1 Gateway Communications

As outlined in the above discussion of the preferred network architecture, the Level 1 Gateway 1108 will communicate with a VIU type subscriber through that subscriber's DET 1218 and associated television set. The Level 1 Gateway 1108 also communicates with IMTV VIPs level 2 gateways 1262. The Level 1 Gateway 1108 also communicates with the relevant subnetwork controllers, i.e. the access subnetwork controller 1240 and the PVC controller 1248. As shown in FIG. 5, the ATM subnetwork 1106 provides a connection to an Operations and Support System (OSS) 1109. The Level 1 Gateway 1108 will communicate with the OSS 1109 for a variety of provisioning and usage accounting functions. The OSS 1109 includes a number of information processing systems used for provisioning, the video provider service center (VPSC) and one or more billing systems, such as the CABS and CRIS systems discussed above. To facilitate understanding of the inventive Level 1 Gateway in the context of the preferred network architecture, the following discussion provides a detailed explanation of the types of signaling and communications that the Level 1 Gateway exchanges with these other network elements.

The OSS 1109 provides a variety of information regarding VIPs and VIUs to the Level 1 Gateway 1108. For example, in the preferred network architecture, the VIU information would include VIU profile information, such as the identities of VIPs from whom the VIU has subscribed for services, the type of services subscribed to etc. The information regarding each VIP relates to the types of services the VIP offers through the VDT network, e.g. number of channels, which channels provide pay-per-view service, etc.

The OSS 1109 can also send requests to the Level 1 Gateway 1108 to set-up, tear down and modify connections. For example, when a new VIU becomes a subscriber on the VDT network, the OSS 1109 provides the new subscriber profile information to the Level 1 Gateway and instructs the Level 1 Gateway 1108 to establish a permanent signaling connection to the new subscriber's DET 1218. The Level 1 Gateway 1108 then interacts with the PVC controller 1248 and the access subnetwork controller 1240 to establish the default signaling channel through the subnetworks, between the Level 1 Gateway 1108 and the subscriber's DET 1218. This process flow is described in more detail below in connection with FIG. 11.

When a VIU subscribes to broadcast services of a particular VIP, the VIP will identify the VIU to the OSS. The OSS 1109, in turn, instructs the Level 1 Gateway 1108 to make the broadcast services of that VIP available to the particular subscriber's DET(s) 1218. The steps involved in broadcast channel activation also appear as part of the VIU activation process flow shown in FIG. 11.

Broadcast service VIPs typically will offer some pay-per-view services. At least some of those VIPs will provide necessary information regarding individual pay-per-view events and VIUs who have purchased particular events to the OSS 1109. The OSS 1109, in turn, provides the information regarding individual pay-per-view events to the Level 1 Gateway 1108. The OSS 1109 also instructs the Level 1 Gateway 1108 to make a pay-per-view event available to each purchasing subscriber's DET(s) 1218 at the time of the particular event. Alternatively, the VIP's equipment may have a direct interface to the Level 1 Gateway 1108 to provide the event information and purchasing subscriber identifications directly to that Gateway.

The Level 1 Gateway 1108 transmits all usage information to the OSS 1109 for processing by one or more of the billing systems. For a given connection, the usage information may include bandwidth and connect time and/or an ATM cell count. For pay-per-view type services, the information will include an event identifier. The Level 1 Gateway 1108 also sends alarm or failure information relating to specific session connections between a VIU and an IMTV VIP to the OSS 1109 for processing by one or more maintenance related systems. The Level 1 Gateway 1108 may run its own internal diagnostic routines, in which case, the Gateway 1108 would also notify the OSS 1109 of any faults or failures in that Gateway.

The OSS may include an interface, e.g. a level 2 gateway and/or server, to permit VIPs and VIUs to interact directly with the OSS. This is one way that a VIU might modify or upgrade their VDT services. In an integrated network providing telephone services as well as video and/or data services (as discussed in more detail with regard to FIG. 4 in the parent case), the OSS 1109 would also serve as the operations support system for telephone services. Consequently, the interaction with the OSS through the VDT network would allow VIUs on-line access to modify their telephone services. For this interface to the OSS 1109, the Level 1 Gateway 1108 would provide notification of incoming calls to the OSS from VIPs or VIUs, in a manner similar to the notification provided to a level 2 gateway operated by an IMTV service VIP discussed in more detail later.

Alternatively, an application running in the Level 1 Gateway 1108 can interact with the VIU through the DET 1218 to modify services provided to the VIU via the network. In that case, the Level 1 Gateway would notify the OSS 1109 of the changes to service subscriptions made by the VIU.

As noted above, the Level 1 Gateway 1108 also communicates with the PVC controller 1248. The Level 1 Gateway 1108 transmits requests to establish and tear down connections to the PVC controller 1248. These requests will identify the entry and exit ports of the ATM subnetwork and the end point VPI/VCI values of the relevant virtual circuits. As discussed below, the Level 1 Gateway obtains one port identifier and associated VPI/VCI value from the VIP's level 2 gateway 1262 and another port identifier and VPI/VCI value from the access subnetwork controller 1240. The requests for connection also specify a bandwidth for the desired connection. The Level 1 Gateway 1108 may also transmit some form of connection identifier to the PVC controller 1248.

In response to a connection request, the PVC controller 1248 provides appropriate instructions to the ATM hub switch 1252 and any access switches (not shown) needed to make the connection. Specifically, the PVC controller 1248 instructs the switch(es) to provide a virtual circuit connection between the specified end points and to translate the input VPI/VCI value into the output VPI/VCI value. The PVC controller 1252 assigns any intermediate, VPI/VCI values used within the ATM subnetwork itself. In this manner, the Level 1 Gateway 1108 and the PVC controller 1248 interact to establish virtual circuit connections, for downstream broadband transmissions (one-way), for associated upstream signaling connections (one-way), and for two-way connections.

In the above discussed preferred operation, the Level 1 Gateway 1108 obtained the VPI/VCI values from the endpoints (the VIP and the access subnetwork) and supplied those values to the PVC controller 1248. Alternatively, the PVC controller 1248 could use its mapping tables to map the port ID information into appropriate termination and origination VPI/VCI values, or the Level 1 Gateway itself could administer and assign endpoint VPI/VCI values for each virtual connection it needs to establish through the ATM subnetwork.

ATM switches provide bidirectional virtual circuits. However, in the video dial tone network, many connections are unidirectional (particularly those for the downstream broadband connections). The requests for bandwidth can separately specify the bandwidth in each direction. For example, for unidirectional connections, the Level 1 Gateway 1108 will specify the required bandwidth in one direction, e.g. downstream, and specify a '0' bandwidth in the other direction.

The above discussion of connection set-up and tear down by the Level 1 Gateway, the PVC controller and the ATM switch(es) applies to the downstream broadband connection from the VIP to a port for IMTV services. The network also provides two-way signaling between the VIP's equipment and the DET 1218. For this purpose, the ATM subnetwork can provide a requested low bandwidth two-way virtual circuit in parallel to the downstream broadband virtual circuit. The downstream signaling information would originate from a port on the VIP's level 2 gateway 1262. If the downstream signaling is to appear as in-band information to the DET, however, the ATM subnetwork will supply the downstream cells to the same output port as for the broadband information, i.e. a port to one of the APDs 1174 in the serving LVAN 1112. The access subnetwork controller 1240 will instruct the APD 1174 to map both the broadband and the downstream signaling cells into MPEG packets having specified PID values and to output those packets on a specified one of the rails carrying data streams to one of the QAM modulators 1176 for transmission together in an assigned downstream RF channel. The input port to the ATM subnetwork for the upstream signaling would be a port connected to the ATM router 1196 in the same LVAN 1112. The ATM subnetwork would output the upstream cells to an input port of the level 2 gateway 1162.

Alternatively, the downstream signaling from the VIP's level 2 gateway to the subscriber's DET 1218 can consist of user data included in the MPEG-2 stream from the server. In this later case, the ATM subnetwork would only establish a narrowband upstream channel to the level 2 gateway for upstream signaling from the DET. In either case, the Level 1 Gateway 1108 requests the signaling connection, and the PVC controller 1248 instructs the ATM switch(es) to set up the portion of signaling link through the ATM subnetwork.

In normal operation, the Level 1 gateway 1108 requests establishment or tear down of specific connections through the ATM subnetwork 1106. When the ATM switch(es) perform the requested connection function, reports thereof are provided to the PVC controller 1248. The PVC controller in turn provides confirmation to the Level 1 Gateway 1108. If necessary resources are not available when the Level 1 Gateway 1108 requests a connection, the PVC controller 1248 will so inform the Level 1 Gateway.

The Level 1 Gateway 1108 can request audit or status information from the PVC controller 1248. In response, the PVC controller 1248 can supply the Level 1 Gateway 1108 with audit or status information relating to the condition of ports and connections with the ATM subnetwork 1106. The PVC controller 1248 will also provide the Level 1 Gateway 1108 alarm or failure reports relating to specification connections through the ATM subnetwork 1106.

The PVC controller 1248 may also provide usage information to the Level 1 Gateway 1108. In particular, the ATM switch(es) and PVC controller 1248 can count cells for each session connection through the ATM subnetwork and provide the cell count to the Level 1 Gateway as usage data. The cell count reflects the amount of data actually transmitted through the ATM subnetwork. For particularly bursty services, the cell count may actually provide a more accurate representation of usage than the combination of bandwidth and time duration.

As noted above, the Level 1 Gateway 1108 also communicates with the access subnetwork controller 1240. The Level 1 Gateway 1108 transmits requests to establish and tear down connections to the access subnetwork controller 1240. Such requests may relate to IMTV connections, to making certain broadcast services available to a particular VIU, defining pay-per-view events and activating pay-per-view events for VIUs who have purchased particular events, etc. In general, connection and tear down requests identify the DET and bandwidth or throughput in both directions. In the presently preferred embodiment, the DET identifier will take the form of an E.164 address.

Requests relating to broadcast services will include a channel identifier and may under some circumstances include VPI/VCI information. As discussed in more detail below, the Level 1 Gateway 1108 will request that the access subnetwork controller 'establish a connection' to the DET 1218 for each broadcast channel to which the VIU has subscribed. These 'connections' for broadcast channels make those channels available by enabling the DET to process each channel. Once the access subnetwork establishes such a broadcast availability connection, the VIU can view each channel simply by selecting that channel through the DET 1218, unless and until the Level 1 Gateway 1108 instructs the access subnetwork controller 1240 to tear down the particular broadcast connection.

The Level 1 Gateway 1108 issues requests relating to broadcast services to the access subnetwork controller 1240 only infrequently, i.e. when a VIU subscribes to a new broadcast service or when removing a broadcast service from availability to a particular VIU (e.g. a VIU that no longer subscribes to broadcast services of a specified VIP or that has not based bills for VDT services or services of the specified broadcast VIP).

Requests relating to IMTV service will include a connection identifier, VIU identifier and bandwidth. Unlike requests relating to broadcast services, the Level 1 Gateway 1108 frequently issues requests relating to IMTV services to the access subnetwork controller 1240, i.e. whenever a VIU requests an IMTV session.

Requests defining a broadcast pay-per-view event include an event identifier, start time, end time, channel and preview duration. Connection requests relating to activation of a purchased event for a particular VIU identify the DET and the event.

When the access subnetwork controller 1240 receives a connection establishment request from the Level 1 Gateway 1108, the access subnetwork 1240 transmits certain information back to that Gateway that other elements of the network need in order to set-up the end to end connection. For a broadcast channel to which the VIU subscribes, the DET needs a connection block descriptor for that channel. The connection block descriptor includes the network logical channel number and the RF channel carrying the particular program. For digital services, the connection block descriptor will also include one or more PID values (preferably the PID value for the respective program map) that the DET needs in order to capture and begin processing MPEG-2 packets relating to the particular program.

In the preferred embodiment, the access subnetwork controller administers the connection block descriptors and the VPI/VCI values available on each port of the access subnetwork.

When the access subnetwork controller 1240 receives a connection establishment request for an IMTV session, the access subnetwork controller first identifies an APD 1174 having available bandwidth capable of supporting the requested session. The access subnetwork controller 1240 provides the port ID and an available one of the VPI/VCI values assigned to that APD 1174 to the Level 1 Gateway 1108. As noted above, in the preferred embodiment, the Level 1 Gateway 1108 forwards the port identifier for the APD 1174 and the assigned VPI/VCI value to the PVC controller 1248.

Figure 14A:
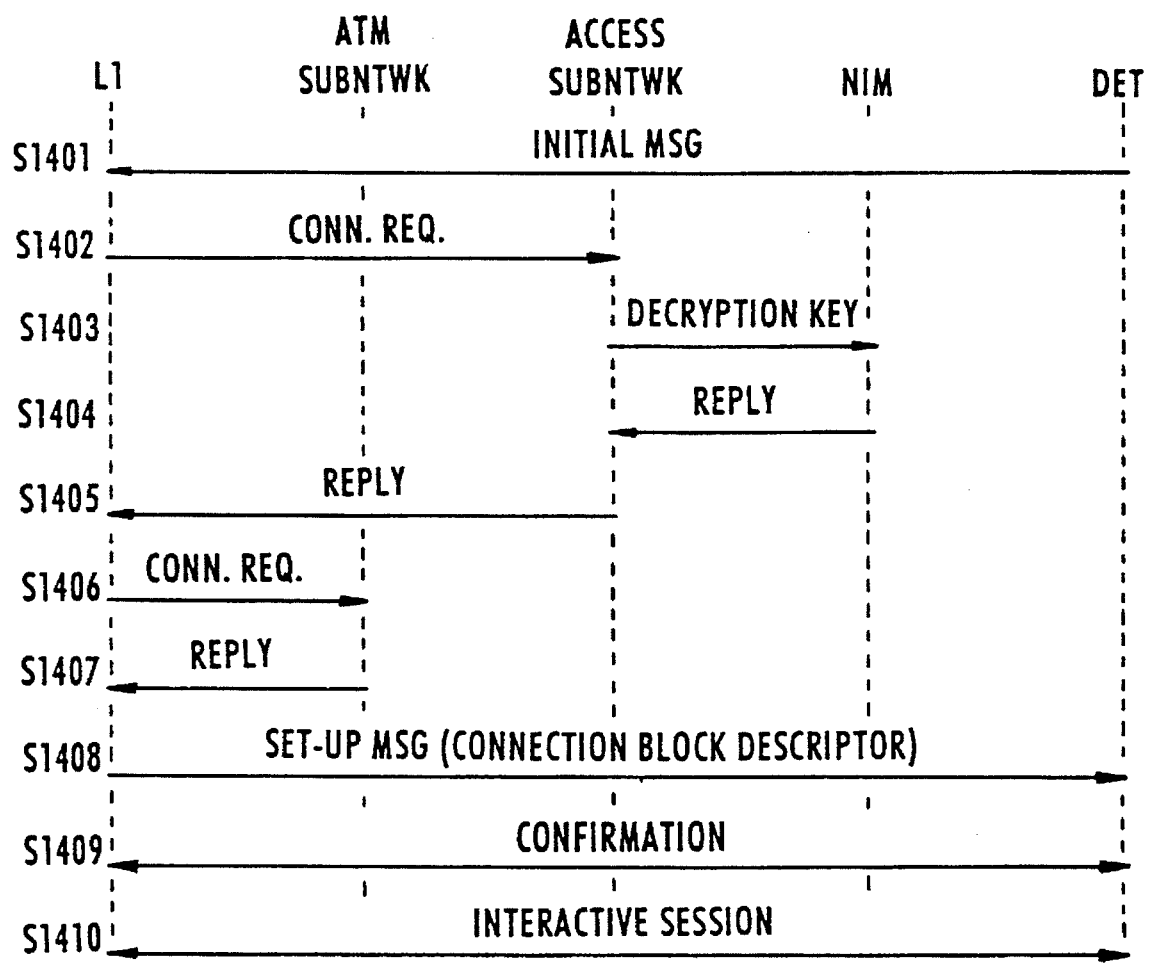
FIGS. 14A and 14B illustrate, in simplified form, the flow of messages between various components of the network of FIGS. 5–9 during establishment of an interactive broadband communication session with an IMTV VIP.
Figure 14B:
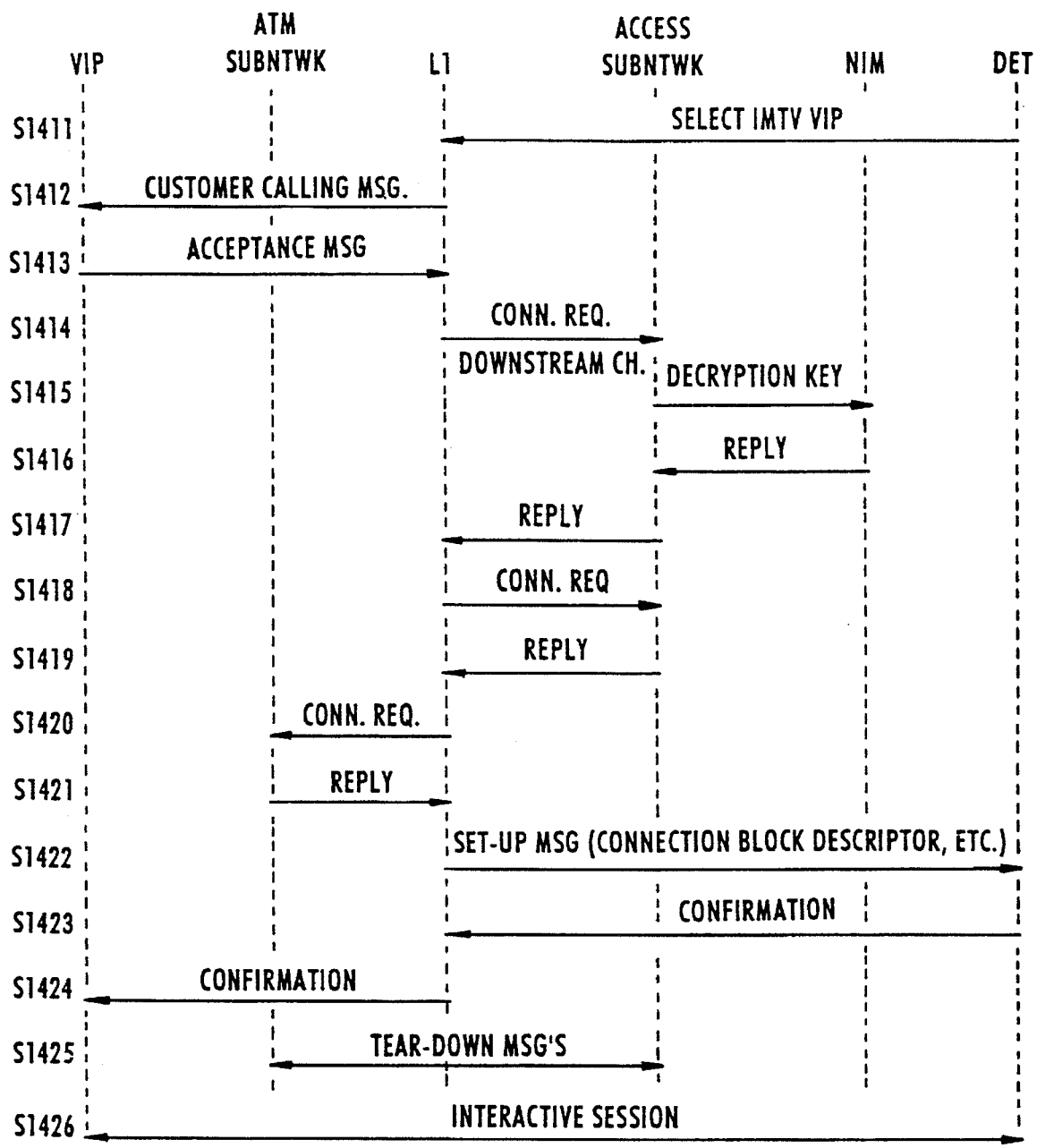

The APD 1174 is preprogrammed by the access subnetwork controller 1240 to map ATM cells having the VPI/VCI value into MPEG packets having particular PID values and supply those packets through a specific one of its output rails for RF transmission on a particular channel. The access subnetwork controller 1240 therefore knows the connection block descriptor corresponding to the bandwidth it assigned to the requested IMTV session. The access subnetwork controller 1240 supplies that connection block descriptor back to the Level 1 Gateway 1108, and that Gateway forwards the connection block descriptor to the DET 1218 to permit tuning to the correct RF channel and capturing and processing of MPEG packets from that RF channel. The discussion of FIGS. 14A and 14B provides a more detailed explanation of the full process flow for establishing an IMTV session.

The Level 1 Gateway 1108 could store the connection block descriptors for all broadcast services. However, in the preferred implementation, the access subnetwork controller 1240 administers the connection block descriptors for broadcast services in a manner similar to that done for IMTV connection, albeit on a more static basis than for IMTV. When the access subnetwork controller 1240 receives a connection establishment request for a broadcast channel from the Level 1 Gateway 1108, the access subnetwork 1240 knows the applicable connection block descriptor for that channel. The access subnetwork 1240 transmits that connection block descriptor back to the Level 1 Gateway 1108. The Level 1 Gateway 1108 in turn forwards the connection block descriptor to the DET 1218.

In response to a connection request (establishment or tear down), the access subnetwork controller 1240 provides appropriate instructions to the elements of the access subnetwork needed to perform the connection function. For example, for an IMTV session, the access subnetwork may instruct the APD 1174 to map cells having a specified VPI/VCI into MPEG packets having specified PID values and output those packets on a specified one of its five output rails, to thereby place the packets in a particular RF channel.

For a pay-per-view event, the access subnetwork controller provides the event definition information to the ACC 4000 1242. The ACC 4000 in turn instructs the APD 1134 to encrypt the program using a specific key at a specific start time. The access subnetwork controller identifies the DETs 1218 of VIUs who purchase the event, and the ACC 4000 1242 provides the decryption key needed to decode the program to the NIMs 1216 associated with those DETs 1218, at the appropriate times. At the end of an event, the ACC 4000 instructs the APD 1134 to change the encryption key, thereby terminating decryption by those DETs having a now obsolete decryption key.

In normal operation, the Level 1 Gateway 1108 requests establishment or tear down of specific IMTV connections through the access subnetwork. When the elements of the access subnetwork perform the requested connection function, reports thereof are provided to the access subnetwork controller 1240. The access subnetwork controller 1240 in turn provides confirmation to the Level 1 Gateway 1108. The level 1 Gateway 1108 will time the period for confirmations, and if an expected confirmation is not received in the expected time period, the Level 1 Gateway recognizes a fault in the access subnetwork. If necessary resources are not available when the Level 1 Gateway 1108 requests a connection, the access subnetwork controller 1240 will so inform the Level 1 Gateway.

The Level 1 Gateway 1108 can request audit or status information from the access subnetwork controller 1240. In response, the access subnetwork controller 1240 can supply the Level 1 Gateway 1108 with audit or status information relating to the condition of various channels and sessions through the access subnetwork. The access subnetwork controller 1248 will also provide the Level 1 Gateway 1108 will alarm or failure reports relating to specification connections through the access subnetwork.

At the CPE, the Level 1 Gateway 1108 communicates with the main portion of the DET 1218, and through that portion of the DET, with the actual VIU operating the DET. Logically speaking, the NIM 1216 may be considered a part of the access subnetwork. The ACC 4000 1242 communicates with the NIM 1216, whereas the Level 1 Gateway 1108 and level 2 gateways 1262 communicate with the main portion of the DET 1218.

Through its communications with the main portion of the DET, the Level 1 Gateway 1108 sends menus to the VIU. The Level 1 Gateway 1108 also receives selections and related inputs from the VIU through this communication.

The communications from the Level 1 Gateway 1108 to the main portion of the DET carry a variety of information. For example, these communications include downloading of necessary connection block descriptors to the DET to permit reception of broadcast channels and dynamically assigned channels carrying IMTV downstream transmissions from the VIP. The Level 1 Gateway 1108 may also download applications programming and/or operations system software into the main portion of the DET 1218. The above incorporated copending application Ser. No. 08/380,755, filed Jan. 31, 1995, provides a more detailed description of the software download capabilities of the DET. If certain services require the DET to recognize some form of network address, the Level 1 Gateway 1108 would also transmit that address to the main portion of the DET for storage.

The subscriber input information transmitted upstream from the DET 1218 to the Level 1 Gateway 1108 can relate to pay-per-view event purchases, selection of a broadcast VIP and selection of an IMTV VIP. The input information may also indicate that the VIU has requested a session with an internal application running on the Level 1 Gateway 1108, for example to establish or modify PIN routines, customize menus, access account information, modify broadcast subscriptions, etc. If the OSS 1109 provides a VIU user interface, the information from the input from the VIU might also request connection to that interface through the video dial tone network.

If the subscriber request to the Level 1 Gateway 1108 identifies a broadcast service VIP, the Level 1 Gateway 1108 transmits a connection block descriptor of one of that VIP's channels back to the DET 1218. This connection block descriptor corresponds to a digital broadcast channel on which the selected VIP repeatedly broadcasts customized software for downloading into the DET. Typically, the software captured by the DET 1218 controls navigation through the particular VIP's broadcast services.

The Level 1 Gateway 1108 can provide its menus in two or more different languages. Through an interactive session between the subscriber's DET 1218 and the Level 1 Gateway 1108, the user can establish a preference for one language. Subsequently, the Level 1 Gateway 1108 transmits menus to that DET 1218 in the preferred language. The user also has the option to override the preference and obtain menus in any of the other languages available during each interaction with the Level 1 Gateway.

As noted above, the Level 1 Gateway 1108 also communicates with level 2 gateways 1262 operated by IMTV VIPs. For example, as part of its processing of a VIU's request for an IMTV session connection to a VIP, the Level 1 Gateway 1108 transmits a connection request to the chosen VIP's level 2 gateway 1262. This request includes the identity of the calling VIU and provides the VIP with the opportunity to accept or reject the call from the particular VIU. The VIP may reject the call for a number of reasons, e.g. because all of its server equipment is busy, because the particular VIU is not a subscriber to this VIP's services, the particular VIU has not paid his bills, etc. In the preferred embodiment, the Level 1 Gateway 1108 transmits a connection request to the chosen VIP's level 2 gateway 1262 only for IMTV type services. However, the Level 1 Gateway 1108 could transmit such a request to the level 2 gateway 1262 for pay-per-view services and broadcast services, if the particular VIP chose to offer their services in a manner requiring the VIP's acceptance or authorization before providing a requested service.

The Level 1 Gateway 1108 provides information relating to network conditions to the level 2 gateway 1262, for specific connections to that VIP's equipment. For example, when a VIP accepts a call and the Level 1 Gateway 1108 instructs the various network elements to set up a session, the Level 1 Gateway 1108 informs the level 2 gateway 1262 of completion of the call set-up procedure, so that the level 2 gateway 1262 can instruct the associated server 1264 to commence transmission to the subscriber. The Level 1 Gateway 1108 will also notify the level 2 gateway 1262 of failures in specific connections to that VIP's equipment.

The level 2 gateway 1262 also provides certain information back to the Level 1 Gateway 1108. If the VIP accepts a call from a particular VIU, the level 2 gateway 1262 transmits a server port identifier and preferably a VPI/VCI, that will service the call. The level 2 gateway 1262 will also specify the bandwidth or throughput requirement for the particular IMTV service.

As noted above, broadcast VIPs offering pay-per-view service will provide information about events and purchasers to the network. If the VIP has a direct connection to the Level 1 Gateway 1108, e.g. from a level 2 gateway 1262, the VIP would supply that information directly to the Level 1 Gateway without going through the OSS.

The Level 1 Gateway may also provide the VIP with menus and accept selection inputs from the VIP, if the network is administered to allow VIPs to initiate calls. Such VIP initiated calls at least would go to the OSS 1109. The preferred embodiment is adapted to provide connections between a VIP and a VIU only in response to an initial request by the VIU. However, if customer demand warrants, the Level 1 Gateway could allow VIPs to initiate calls to VIUs from the level 2 gateways 1262. In that case, the Level 1 Gateway might also signal the DET 1218 and ask the VIU if the VIU will accept the call from the calling VIP.

Process Flows in the Preferred Network

Figure 10:
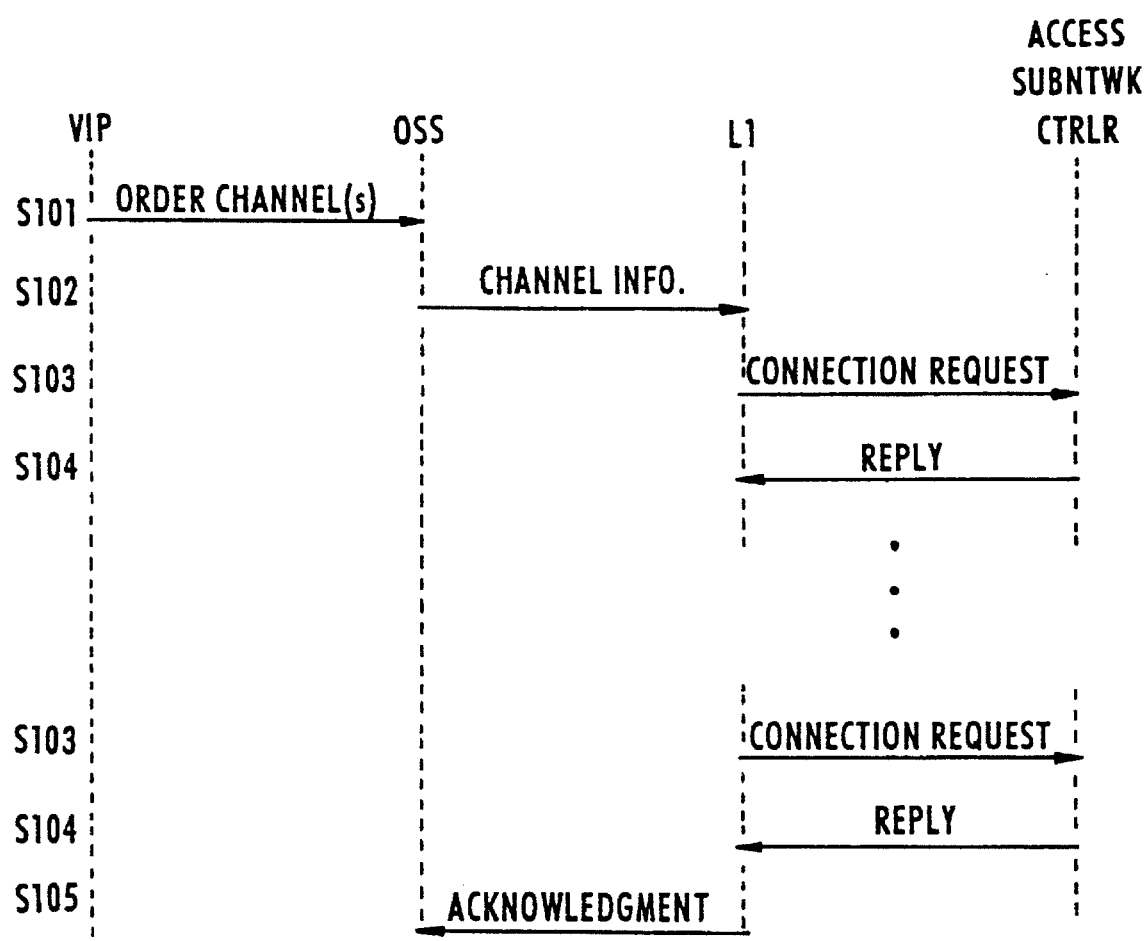
FIG. 10 illustrates, in simplified form, the flow of messages between various components of the network of FIGS. 5–9 during provisioning of broadcast channels.

The Level 1 Gateway controls initial establishment of services, e.g. provisioning, for new broadcast services offered by the broadcast VIPs and for activation of service to individual subscriber VIUs. Provisioning of a new broadcast service will be considered first. FIG. 10 depicts a simplified flow of messages between various components of the enhanced video dial tone network during provisioning of broadcast channels.

When a new VIP wants to offer broadcast services through the enhanced video dial tone network or an existing VIP wants to add additional channels to the VIP's services broadcast through the network, the VIP places an order for a number of channels with the OSS 1109 (step S101). OSS personnel will go into the field and make any necessary new physical connections of the VIP's equipment into the network. The OSS system 1109 will provide relevant provisioning information to the Level 1 Gateway 1108 (step S102).

The provisioning information transmitted to the Level 1 Gateway 1108 includes a VIP ID and the number of channels as well as a channel ID and network input port ID (at the Broadcast Consolidation Section (BCS) 1100) for each channel. The information will also specify the type of service on each channel, i.e. whether the service is analog, digital broadcast, digital pay-per-view, enhanced pay-per-view, etc. The VIP also specifies the desired maximum bandwidth for each new channel ordered, and the OSS 1109 relays that information to the Level 1 Gateway 1108. The Level 1 Gateway stores the information in a table in memory.

The Level 1 Gateway 1108 now sends a connection request to the access subnetwork controller 1240 via a signaling channel through the ATM backbone subnetwork 1106 (step S103). This connection request instructs the access subnetwork controller 1240 to activate the broadcast service throughout the access subnetwork. The information in the request message includes the VIP ID as well as the channel ID, the input port ID, the service type (analog or digital) and the maximum bandwidth for one new channel. For convenience, further discussion here will concentrate on activation of a digital broadcast service.

When the access subnetwork controller 1240 receives a broadcast channel connection establishment request from the Level 1 Gateway 1108, the access subnetwork 1240 identifies an APD 1134 having available bandwidth capable of supporting the requested channel, in each of the video network hubs 1104 and assigns a VPI/VCI corresponding to the available bandwidth to the newly requested channel, as discussed in more detail below. The access subnetwork controller 1240 transmits a reply message back to the Level 1 Gateway 1108 which includes at least the assigned VPI/VCI value (step S104).

The APDs 1134 in the video network hubs 1104 are essentially duplicates of each other and have commonly assigned VPI/VCI values for the channels that they are to broadcast to the respective local video access node offices 1112. The APDs 1134 in the video network hubs 1104 are wired in the same manner to QAM modulators 1150 so that in each video network hub 1104, the APDs 1134 and modulators 1150 output each particular broadcast program channel on the same RF channel. The access subnetwork controller 1240 also instructs the corresponding APDs 1134 in all of the hubs 1104 to map assigned VPI/VCI values into the same MPEG PID values.

The SONET drop and continue multiplexers 1130 are programmed to drop a copy of cells having a specified VPI/VCI value to the corresponding one of the APDs 1134 in each respective video network hubs 1104. Thus, by assigning one VPI/VCI to a newly requested program channel, the access subnetwork controller 1240 assigns the channel to a particular APD 1134 in each video network hub office 1104, and assigns the broadcasts of that program to an identified RF channel and PID values.

For example, in response to a request for connection of the VIP's broadcast service identified as network logical channel 1, the access subnetwork controller might assign a VPI/VCI of 1001/001. Assume now for discussion purposes that the VPI of 1001 identifies the first APD 1134 in each video network hub 1104. The SONET mux 1130 in each video network hub office 1104 therefore supplies a copy of each cell containing the VPI/VCI value of 1001/001 to the first APD 1134 in that respective office. The first APD 1134 in each hub 1104 in turn is programmed to output the reconstructed MPEG packets from the ATM cells on a specified one of its output ports and to include specified PID values in those packets.

Continuing the example, the access subnetwork controller 1240 might program the first APD 1134 in each hub office 1104 to map the cells containing the VPI/VCI value of 1001/001 into MPEG packets containing three PID values of (001, 007 and 010) and output those packets on the first output port of that APD. The APD 1134 would construct a program map indicating that the PID values 007 and 010 identify video and audio packets for the program and would insert that new program map in the output packets containing PID 001. The access subnetwork controller knows the RF channel frequency of the QAM modulator 1150 connected to that output port, and that frequency is the same for all of the video network hub offices 1104. For example, the RF channel might correspond to CATV standard television channel 42. The access subnetwork controller 1240 stores tables of connection block descriptors for all channels in the access subnetwork. In the example, the newly established connection block descriptor would identify network logical channel 1, RF channel 42 and PID value 001.

The reply to the Level 1 Gateway (S104) in response to the connection request for logical network channel 1 would include at least the VPI/VCI of 1001/001. If the Level 1 Gateway 1108 stores tables of connection block descriptors, that reply message would also include the connection block descriptor for that channel. In the example, the connection block descriptor would identify network logical channel 1, RF channel 42 and PID value 001. In the preferred embodiment discussed later, the access subnetwork controller 1240 supplies connection block descriptors to the Level 1 Gateway 1108 as part of a procedure for activating specific channel services for a VIU.

The connection request and reply procedure (steps S103, S104) between the Level 1 Gateway 1108 and the access subnetwork controller 1240 is repeated for each new broadcast channel ordered by the VIP in step S101. The Level 1 Gateway 1108 in turn provides one or more acknowledgement messages back to the OSS (step S105). For each channel, the acknowledgement identifies the VIP, the channel, the input port, and the VPI/VCI value. OSS personnel use this information to program the ATM cell mux 1120. Specifically, they obtain port and VPI/VCI information for each input channel the VIP will broadcast and program the mux 1120 to translate the VIPs VPI/VCI values into the corresponding VPI/VCI values assigned by the access subnetwork controller 1240 to each new program.

A similar procedure can be used to provision analog channels. In the preferred embodiment, however, the analog channels are broadcast on the bottom 40 RF channels. Rather than administer the connection block descriptors for these channels through the access subnetwork controller 1248, the OSS 1109 can supply these to the Level 1 Gateway 1108 for storage during initial set-up of the network.

In the above discussion, the access subnetwork controller 1240 assigned one digital broadcast program into a single channel (RF channel and PID value) for broadcast throughout the entire network controlled by that controller 1240. In a broadcast network serving a particularly large area, there will be more than one access subnetwork controller 1240. Each access subnetwork controller 1240 will control a number of video network hubs 1104 and the subtending local video access nodes 1112. The access subnetwork controllers 1240 serving different areas may arbitrarily assign one digital program into different channels in their respective areas. Alternatively, the access subnetwork controllers 1240 may be programmed to coordinate channel assignments, so that one program channel appears on the same channel (RF channel and PID value) throughout the network.

In the preferred implementation, a broadcast VIP will have a signaling connection into the network. Accordingly, when a broadcast VIP 1114 first establishes a presence on the video dial tone network, the Level 1 Gateway will transmit a request to the PVC controller 1248 requesting the signaling connection through the ATM backbone subnetwork 1106. In the preferred embodiment, this signaling connection establishes a permanent virtual circuit connection between the VIP's equipment and the Level 1 Gateway 1108, for example, to allow the VIP to input information regarding upcoming pay-per-view events.

In the preferred embodiment, the Level 1 Gateway 1108 will not accumulate usage statistics relating to broadcast services. The network operator will bill on a flat fee basis for broadcast services. The network operator may bill the broadcast VIPs, in which case, those VIPs pass on the charges to their subscribers. Alternatively, the network operations company and the VIP may agree that the network operator should develop a combined bill for network charges and VIP charges. In this later case, the network operations company would send out the combined bills, collect payments, and divide the revenue between the network operating company and the VIP.

A description will now be given for activation of a new customer. When a party requests activation of a new customer (typically requested by a VIP selling video services to new subscribers or a contractor selling DET's to consumers), that party submits a request message. If requested by the VIP, the VIP may send the activation request to the network company's operations support system (OSS) 1109 which in turn forwards the request to the Level 1 Gateway. Alternatively, the VIP may request VIU activation over the direct signaling link to the Level 1 Gateway 1108. For subscribers already active on the network, they may request modifications or upgrades in services, e.g. to add broadcast services of another available VIP, by a direct interaction through the network with the OSS 1109 or with an application running within the Level 1 Gateway 1108.

Figure 11:
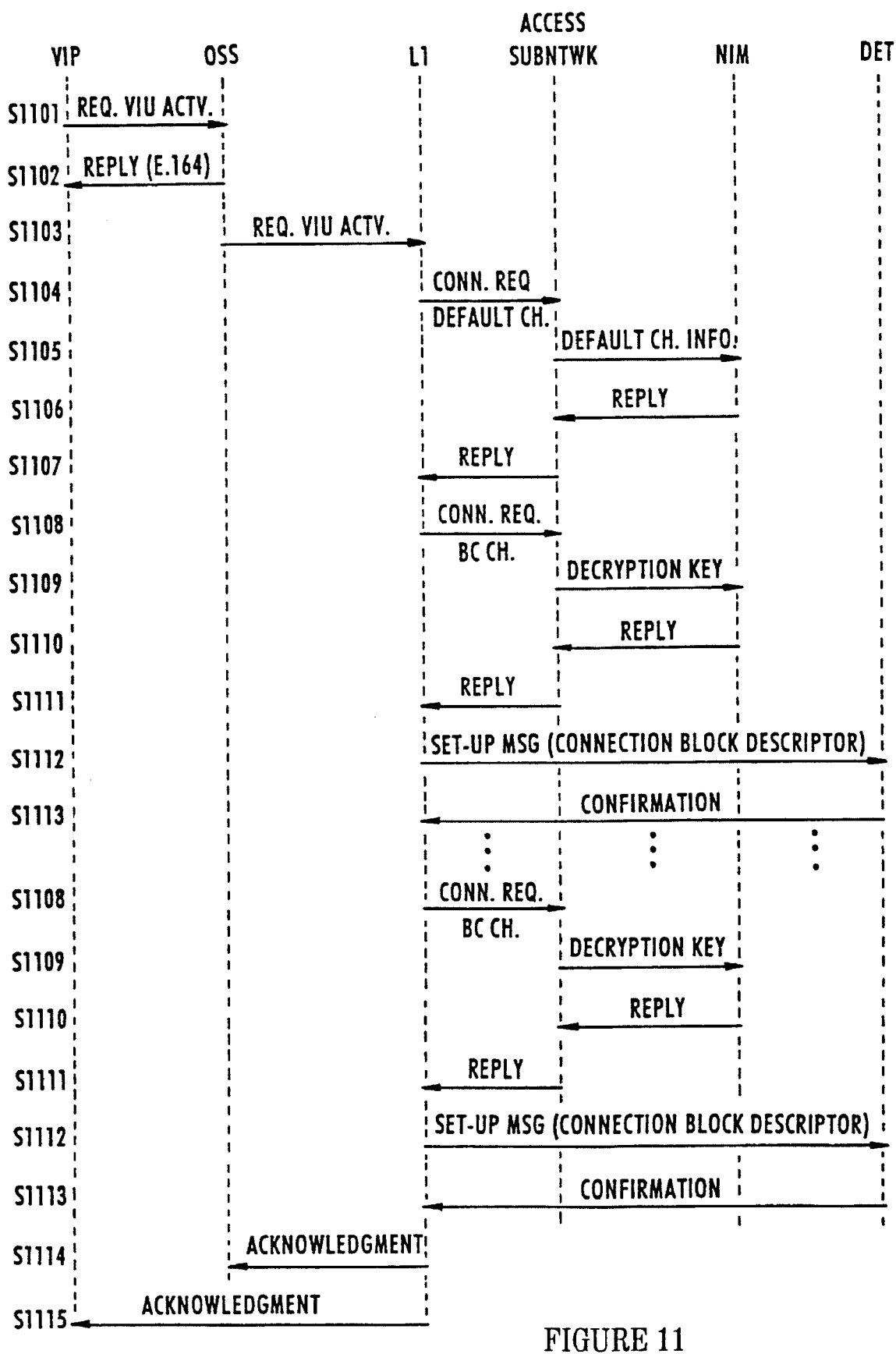
FIG. 11 illustrates, in simplified form, the flow of messages between various components of the network of FIGS. 5–9 during activation of broadcast services to a new video information user.

For simplicity of discussion and illustration in the flow diagram of FIG. 11, it is assumed that the VIP transmits the request for activation to the OSS 1109 (step 1101). The VIU activation request includes a variety of customer related information, as well as the number of DET's this customer is purchasing. The request also identifies the party requesting the activation, in the present example, the VIP. The OSS 1109 will assign and return an E.164 address for each DET 1218 to the party requesting activation (step S1102). The party activating the DET's will enter the respective E.164 address into each DET, using the remote control, the television display and an initialization routine programmed into the DET. The entered E.164 is thereafter considered the DET's global ID.

As discussed above with respect to FIG. 8, each DET will connect into a fiber node 1202 serving up to 500 homes. One access subnetwork controller 1240 as shown in FIG. 9 will control a number of such fiber nodes 1202 through the respective LVANs 1112. For each DET 1218 of the new customer, the OSS 1109 will transmit a message to the Level 1 Gateway 1108 (step S1103). The message to the Level 1 Gateway 1108 identifies the DET 1218 by its E.164 address, identifies the VIP, identifies the broadcast channels to which the VIU has subscribed, and provides an identification of the fiber node 1202 serving the particular subscriber.

For each new DET 1218, the Level 1 Gateway 1108 sends a series of connection request messages to the access subnetwork controller 1240 that will service the customer. For example, the first connection request might request establishment of a default signaling channel between the DET 121 and the Level 1 Gateway 1108. Subsequent connection requests would then relate to specific broadcast channels for broadcast VIP services to which the VIU has subscribed. Each activation request provides the access subnetwork controller 1240 with necessary information for activating service, including the node ID for the new customer, the E.164 address of the particular DET 1218 and information identifying the specific type of channel requested (e.g. signaling, broadcast, etc.).

According to the preferred embodiment, each DET 1218 is assigned default RF channels for downstream signaling with the Level 1 Gateway 1108, the ACC-4000 1242, the elements of the local video access node 1112 and the access subnetwork controller 1240, as well as for upstream signaling. Each QPSK mux 1178 broadcasts approximately 1.5 Mbits/s of signaling information downstream on a different assigned channel. The signaling data on each QPSK channel is encapsulated in MPEG-2 packets, therefore, within the downstream signaling channel, each DET assigned to that RF signaling channel also is assigned a PID value which effectively corresponds to the network address of the NIM. The main position of the DET 1218 may be assigned a separate PID value as discussed briefly above, but for simplicity of discussion here, it is assumed that the data within the MPEG packets on the default signaling channel will differentiate between NIM messages and DET messages.

The downstream default channel through the access subnetwork preferably provides each DET 16 kbits/s of signaling capacity within the 1.5 Mbits/s stream which is QPSK modulated by one of the QPSK modulators 1178 shown in FIG. 7 into a portion of the RF spectrum not used for broadband transmission. Also, the NIM 1216 of the DET 1218 includes a QPSK transmitter for sending signaling information upstream through the hybrid-fiber-coax loop distribution plant (FIG. 8) on an assigned channel outside the portion of the spectrum carrying the broadband transmissions to one of the network controllers (NCs) 1194. The upstream signaling channel is preferably 400 bits/s.

The default channels and corresponding default VPI/VCI values provide dedicated two-way signaling communications from the DET 1218 up as far as the Level 1 Gateway 1108. For example, the DET 1218 sends a message to the Level 1 Gateway by QPSK modulating the appropriate data in the upstream default channel. The network controller 1197 shown in FIG. 7 receives the message and passes the message to the ATM router 1196 which repacketizes the message as one or more ATM cells identified by the upstream default VPI/VCI value for communication with the Level 1 Gateway 1108. The ATM router 1196 sends the ATM cell(s) through the ATM subnetwork 1106 to the Level 1 Gateway 1108. For messages from that gateway intended for the particular DET, the Level 1 Gateway 1108 formulates an ATM cell containing the downstream message data. This cell uses the downstream default VPI/VCI value. The ATM switch routes this cell through the APD 1174 to the QPSK modulator 1178 in the local video access node 1112 serving this subscriber. The APD 1174 repacketizes the data from the ATM cell payload as an MPEG packet data message bearing the NIM network address PID, and the QPSK modulator 1178 transmits that message through the QPSK signaling channel for downstream default signal transport.

Although the order of the requests to the access subnetwork controller 1240 could differ, assume now that the Level 1 Gateway 1108 first requests establishment of the default signaling channel (step S1104) and then sequentially requests activation of a series of broadcast channels. In this example, the first connection request that the Level 1 Gateway 1108 transmits to the access subnetwork controller 1240 relates to the default signaling channel.

In response to the default signaling channel activation request from the Level 1 Gateway 1108, the access subnetwork controller 1240 assigns default channels to each new DET. The access subnetwork controller 1240 also assigns upstream and downstream port identifiers and VPI/VCI values for communications between the DET 1218 and the Level 1 Gateway 1108. The port identifier and the VPI for downstream signaling communications correspond to an input of one of the APDs 1174 in the local video access node 1112 serving the VIU. The port and VPI value for the upstream signaling corresponds to the ATM router 1196 and one of the network controllers (NCs) 1194 in the local video access node 1112 serving the VIU.

The access subnetwork controller 1240 will return one or more reply messages relating to each connection request from the Level 1 Gateway 1108. With regard to the default signaling channel, the access subnetwork controller may return an immediate reply message not shown, containing the assigned port identifiers and VPI/VCI values. Alternatively, the access subnetwork controller may return that information as part of the reply message (S1106) after it completes activation of the default channels through the NIM (S1105).

The virtual circuits through the ATM subnetwork 1106 for the default signaling channels, e.g. from the Level 1 Gateway 1108 to the OC3c input port of one of the APDs 1174, all are preprovisioned as part of the network set-up. The signaling channels are allocated to each DET 1218 as part of the DET activation routine. Hence it is sufficient to assign VPI/VCI values and ports, from inventory, to the default channels to each DET. The Level 1 Gateway 1108 does not need to request channel set up through the ATM backbone subnetwork, as for other services such as the IMTV session set-up discussed below.

The NIM 1216 may be considered as part of the access subnetwork. When the access subnetwork controller 1240 assigns the bandwidth for the default signaling channels, the controller 1240 executes a procedure to activate the default channels all the way through the access subnetwork to the NIM 1216 (step S1105). Specifically, the access subnetwork controller 1240 gives the E.164 address and the QPSK values for the RF default channels to the ACC-4000 1242. The ACC-4000 1242 in turn assigns a NIM network address to the new DET 1218. The NIM network address is also correlated with the assigned upstream default channel bandwidth. In the presently preferred embodiment, the NIM network address corresponds to a PID value for MPEG packets carried on the assigned downstream QPSK modulated signaling channel, as noted above.

The ACC-4000 1242 formulates a packet containing the E.164 and the PID value. The ATM router 1244 encapsulates that packet in one or more ATM cells having the downstream default VPI/VCI value and transmits those cells through the ATM backbone subnetwork. In a manner similar to broadcast digital video information, the VPI value identifies an input port of an APD, in this case one of the APDs 1174 in the local video access node 1112 serving the subscriber. The ATM backbone subnetwork 1106 outputs the cells on an OC3c input port of the APD 1174 assigned to process signaling communications for the subscriber. The APD 1134 converts the payload data from the ATM cells into one or more MPEG packets and outputs those packets on the 1.5 Mbits/s (payload) rail going to the associated QPSK modulator 1178 for broadcast on the downstream default channel.

As part of the initialization routine noted above, the DET 1218 will generate an initialization menu for display on an associated television. As part of the resultant initialization procedure, the DET 1218 will prompt for and receive a keyed input of the assigned E.164 address. The main portion of the DET 1218 will transfer the E.164 address to memory in the NIM 1216. When the user or technician connects the NIM 1216 to the hybrid-fiber-coax distribution line, the new NIM 1216 will scan for and capture the broadcast transmission containing the E.164 address and the PID value corresponding to its assigned NIM network address. The NIM 1216 will also capture other relevant information, such as the channel assignments for the upstream and downstream default signaling channels.

After the NIM 1216 is initialized with the network address etc., the NIM 1216 transmits back an acknowledgement signal to the access subnetwork controller 1240. The access subnetwork controller 1240 in turn provides appropriate information to the various network nodes, e.g. the Level 1 Gateway 1108 and the ACC-4000 1242, indicating that the default channel to the DET 1218 is now activated through the access subnetwork (step S1107).

In the exemplary procedure illustrated in FIG. 11, the Level 1 Gateway sequentially requests broadcast channel connections, after completion of the procedure for establishing the default signaling channels. More specifically, the Level 1 Gateway 1108 transmits a connection request for a first broadcast channel to which the VIU has subscribed (step S1108). The connection request identifies the DET 1218 by its E.164 address and identifies the channel by its network logical channel number.

The access subnetwork controller 1240 provides an instruction to the ACC-4000 1242, and in response, the ACC-4000 1242 sets up a communication with the NIM 1216 and downloads decryption key for the channel for storage in the NIM (step S1109). More specifically, the ACC-4000 1242 transmits a message to the NIM 1216 using the default channel and the PID value assigned as the NIM network address for the particular DET 1218. This message specifies at least the RF channel number and the decryption key needed to decode the particular RF channel. The NIM 1216 monitoring its default channel, recognizes its network address and captures the packet of message data for further processing. In the present case, the NIM 1216 responds to the message by adding the decryption key for the channel to its memory.

The NIM 1216 transmits back a confirmation message type reply (step S1110), and the ACC-4000 1242 so informs the access subnetwork controller 1240. The access subnetwork controller 1240 provides a reply message to the Level 1 Gateway 1108 indicating activation of the channel through to the NIM 1216 and provides the Level 1 Gateway 1108 with the connection block descriptor for the particular channel (step S1111).

The Level 1 Gateway 1108 transmits a 'set-up' message containing the connection block descriptor to the main portion of the DET 1218 through the downstream default signaling channel (step S1112), and the main portion of the DET 1218 returns a confirmation message back through the upstream default signaling channel (step S1113). The Level 1 Gateway 1108 repeats the sequence of steps for activating a channel through the NIM and providing the connection block descriptor (steps S1108–S1113) for each of the channels to which the VIU has subscribed. As a result, the NIM 1216 will receive and store a table of decryption keys for the VIUs available channels, and the main portion of the DET 1218 will receive and store a default channel map.

The default channel map consists of connection block descriptors for the channels the subscriber is permitted to receive. Each connection block descriptor includes the logical network channel number used to identify and select the channel and the RF channel in which the channel transmission appear on coaxial cable drop into the subscribers premises. For digital broadcast services, the connection block descriptor also includes one or more PID values needed to capture and begin decoding MPEG packets containing program information for the specific service (from 27 Mbits/s streams containing four broadband programs and possibly some in-band signaling information). Preferably, the PID value identifies the program map packet for the particular channel.

At some point in the procedure, e.g. after confirmation of the last set-up request by the DET, the Level 1 Gateway 1108 provides an acknowledgement back to the OSS indicating that services have been activated to the particular VIU, for billing purposes (step S1114). The Level 1 Gateway 1108 also provides an acknowledgement back to the VIP (step S1115). Depending on the interface through which the VIP requested activation of the VIU, the acknowledgement may go back through the OSS 1109, or the acknowledgement may go directly through the signaling link through ATM backbone subnetwork from the Level 1 Gateway 1108 to the VIP's equipment 1114.

The Level 1 Gateway 1108 and the ACC-4000 1242 will update the data stored in the NIM/DET as necessary, e.g., if the subscriber changes the services to which she subscribes, if the encryption key changes or if connection block descriptors change because of movement of channels to other slots on the network.

For upgrades or additions to services provided to a VIU through a particular DET, the Level 1 Gateway 1108 receives a request for the service modification. The request may come directly from the DET 1218, from the OSS 1109 or from the broadcast VIP 1114. If from the DET, the Level 1 Gateway 1108 may ask for authorization from the broadcast VIP 1114. The Level 1 Gateway 1108 will initiate a series of connection requests to the access subnetwork controller 1240 to make the newly requested channels available through the DET 1218, in a manner similar to steps S1108 through S1113 in FIG. 11.

When the subscriber selects a digital broadcast channel, the main portion of the DET 1218 accesses the connection block descriptor for that channel stored in the current version of the default channel map. The main portion of the DET 1218 supplies a 'connect' message to the NIM requesting that the NIM supply signals from the specified RF channel number to the main portion of the DET. In response to the RF channel number, the selected NIM 1216 tunes to the identified channel, and the NIM 1216 uses the decryption key from its memory to descramble the tuned RF signal. As a result, the NIM 1216 passes digital signals from the RF channel through the interface to the main portion of the DET 1218. In turn, the main portion of the DET 1218 uses the PID value from the connection block descriptor to begin MPEG decoding of the selected program. Thus, for broadcast services, the DET/NIM stores all necessary permission data and can begin reception and decoding in response to a selection by the user, without any upstream signaling to any other node of the network.

Although not shown in FIG. 11, the Level 1 Gateway 1108 may signal the broadcast VIPs equipment 1114 for an authorization before activating broadcast channels for a particular VIU. For example, if a VIU is already active on the video dial tone network, the Level 1 Gateway 1108 may offer on-line service upgrade options, including the option to subscribe to additional VIPs' services. The user would first establish an interactive session with an appropriate software application running on the Level 1 Gateway 1108, in a manner discussed in more detail below. The user would then interact with the software application to select a new broadcast service, e.g. view option menus and select a particular package of broadcast services from a selected VIP. The Level 1 Gateway 1108 would execute the steps S1108 through S1113 to activate the relevant broadcast channels to the user's DET only after requesting and obtaining authorization to do so from the VIP 1114. The signaling for this authorization procedure could go through the OSS 1109, but preferably the signaling link through the ATM backbone subnetwork 1106 carries this communication for automatic real-time authorization.

There will be a flat rate monthly video dial tone charge for each VIU connected to the network. The network operations company may bill this charge directly to the VIU. Another option is for the network operations company to bill each VIU a flat monthly charge for each VIU connected to that VIP's broadcast services. In this later case, the VIP may choose to pay the video dial tone connect charge for their subscribers and absorb that expense as part of their own rate calculations. The network could also charge VIUs for the number of broadcast channels which the network has enabled them to receive. In response to the acknowledgement message from the Level 1 Gateway 1108 to the OSS 1109 when the network activates the various services, the billing systems within the OSS record appropriate code in the billing record for the VIP and the VIUs.

As discussed above, the network can bill the VIPs for the network charges, in which case, the VIPs bill the VIUs. Alternatively, the VIPs may provide billing information for their broadcast services to the OSS 1109, and the billing systems within the OSS combine that information with network billing related information to develop a combined bill to send to the VIU. In this case the network collects the bill payments and disburses an agreed amount to the VIPs. The preferred network implementation is flexible enough to allow different VIPs to select each alternative type of billing arrangement for their respective broadcast services.

Figure 12:
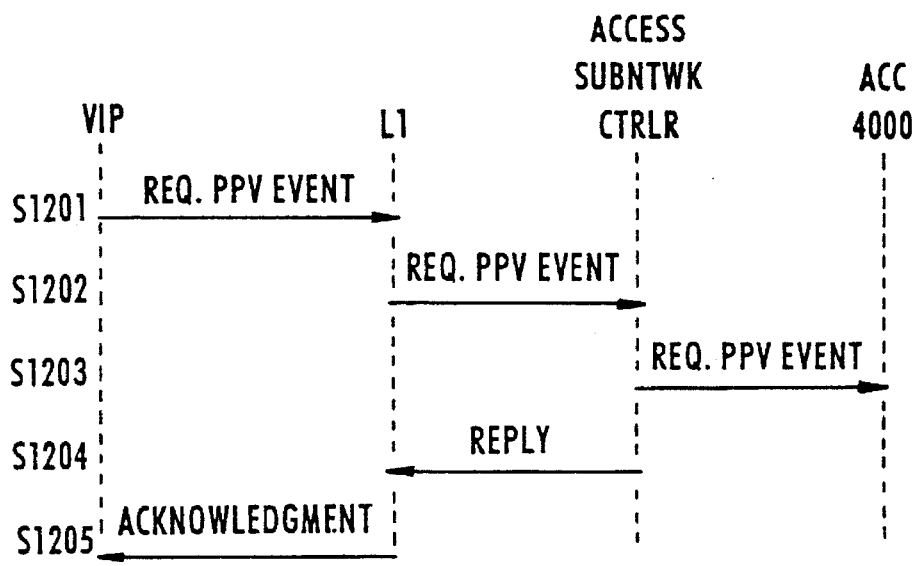
FIG. 12 illustrates, in simplified form, the flow of messages between various components of the network of FIGS. 5–9 during set-up of an upcoming pay-per-view event.

FIG. 12 is a simplified flow diagram illustrating the exchange of messages between various components of the network of FIGS. 5–9 during set-up of an upcoming pay-per-view event. As shown, the VIP 1114 transmits a request for the pay-per-view (PPV) event to the Level 1 Gateway 1108 (step S1201). The Level 1 Gateway 1108 can receive this request directly from the VIP's equipment via the signaling link through the ATM backbone subnetwork 1106. The request indicates the logical network channel on which the event will appear, the start time for the event, and either the event duration or the stop time of the event. The request may also specify one or more windows, for free previews and/or cancellation of purchase orders. Alternatively, the VIP may supply the information regarding the event to the OSS 1109, and then the OSS relays the relevant information in the necessary format to the Level 1 Gateway 1108.

The Level 1 Gateway 1108 assigns an event ID to the requested event. The Level 1 Gateway 1108 provides the event ID together with the information regarding the event to the access subnetwork controller 1240 (step S1202), and the access subnetwork controller 1240 in turn relays the request including the relevant information to the ACC 4000 (step S1203). The access subnetwork controller 1240 provides a confirmatory reply message back to the Level 1 Gateway 1108 (step S1204), and the Level 1 Gateway 1108 provides an acknowledgement message back to the VIP 1114. The acknowledgement message sent to the VIP 1114 includes the event ID that the Level 1 Gateway 1108 assigned to the VIP's pay-per-view event.

At the time of the event specified in the VIP's request, the ACC-4000 transmits a new encryption key to the APD 1134 processing the signals for the network logical channel specified in the request. Only a NIM 1216 storing a corresponding decryption key can decode the event broadcast for display via the associated MPEG decoder in the DET 1218 and the associated television. As discussed below, the network will supply the necessary decryption key only to the NIMs for subscribers who have purchased the particular pay-per-view event. At the end of the event, the ACC 4000 1242 transmits a new encryption key to the APD 1134, effectively disabling reception through NIMs storing the old decryption key. The Level 1 Gateway of the present invention permits both advance ordering of pay-per-view events and impulse ordering at or about the actual start time of the event.

Figure 13:
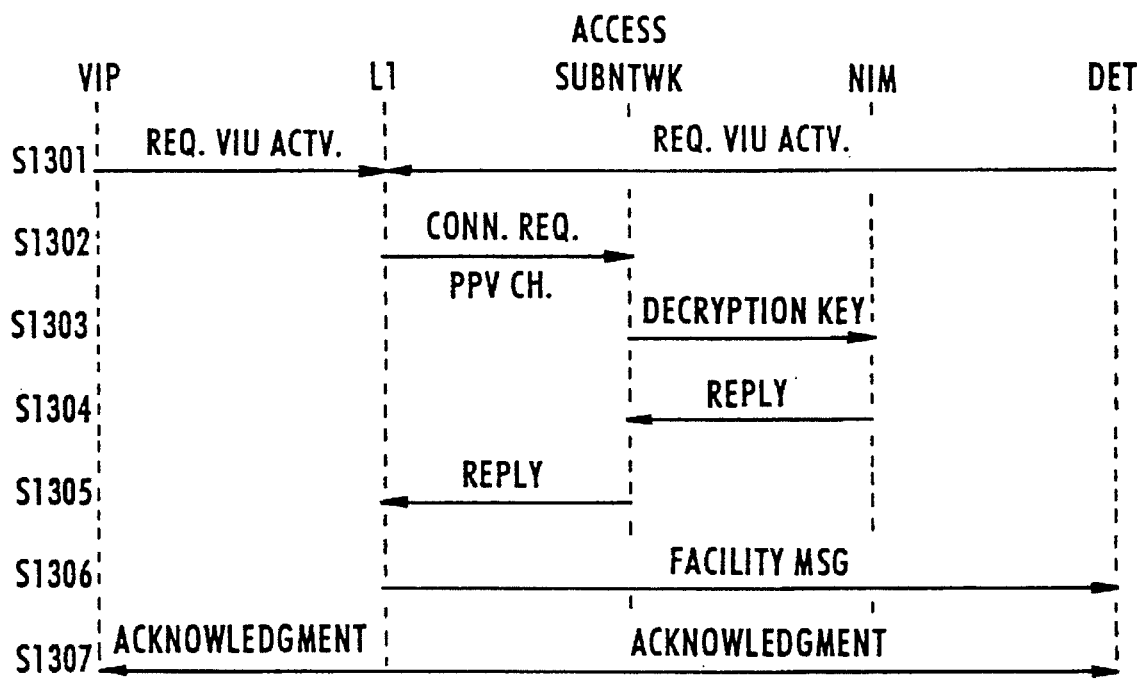
FIG. 13 illustrates, in simplified form, the flow of messages between various components of the network of FIGS. 5–9 during activation of pay-per-view event reception for a video information user who has purchased the event.

FIG. 13 is a simplified flow diagram illustrating the exchange of messages between various components of the network of FIGS. 5–9 during activation of pay-per-view event reception for a video information user (VIU) or subscriber who has purchased the event.

Subscribers will be able to order pay-per-view events in a number of different ways, and each VIP offering such services may elect to allow subscribers to use any one or more of the available ordering techniques, depending on how each VIP chooses to set up the VIP's pay-per-view services. The VIU may place an order with the VIP, either by a standard telephone call or during an interactive session through the video dial tone network. In these cases, the VIP will provide the order information to the Level 1 Gateway (step S1301), either directly through the ATM backbone subnetwork 1106 or through the OSS 1109.

Alternatively, the VIU may order pay-per-view events through an on-line interaction with the Level 1 Gateway 1108 (step S1301). The Level 1 Gateway 1108 provides menus through the DET 1218 and the associated television, and the user operates the remote control of the DET to transmit selection information (VIP and pay-per-view event) back to the Level 1 Gateway. Different VIPs 1114 will require different levels of security. For example, a first broadcast VIP may choose to pre-authorize pay-per-view purchasing by all VIUs who subscribe to that VIP's broadcast pay-per-view services. The Level 1 Gateway 1108 therefore would only need to check its internal database to determine if the current VIU subscribes to the pay-per-view services of the selected VIP. Alternatively, another VIP may require that the Level 1 Gateway 1108 signal the VIP's equipment 1114 to identify the VIU and the ordered event, so that the VIP can validate subscription and authorize or deny the purchase for each VIU purchasing the event. The Level 1 Gateway of the present invention can support a variety of other security scenarios, for example preauthorization for all of the VIP's subscriber's for events priced below a specified threshold value and validation of the VIU purchase by the VIP for events priced above the specified threshold value.

In each of the ordering techniques described above, the Level 1 Gateway receives a request message to activate the VIU for reception of the pay-per-view event (step S1301). The activation request identifies the VIU's DET, e.g. by its assigned E.164 address, and includes the event ID for the pay-per-view event that this VIU has purchased.

The Level 1 Gateway 1108 transmits a connection request, for connecting the pay-per-view event to the VIU who purchased the event, to the access subnetwork controller 1240 (step S1302). This connection request identifies the DET 1218 by its E.164 address and includes the pay-per-view event ID number. The access subnetwork controller 1240 instructs the ACC-4000 1242 to enable reception of the pay-per-view event. The instruction to the ACC-4000 1242 includes the pay-per-view event ID and an identifier of the DET (either the E.164 or the NIM network address assigned within the access subnetwork).

In response to the instruction, the ACC-4000 1242 sets up a communication with the NIM 1216 and downloads a decryption key for the channel for storage in the NIM (step S1303). More specifically, the ACC-4000 1242 transmits a message to the DET 1218 using the default channel and the PID value assigned as the NIM network address for the particular DET 1218. This message specifies start time, event duration and the decryption key needed to decode the selected event. The NIM 1216 monitoring its default channel, recognizes its network address and captures the packet of message data for further processing. In the present case, the NIM 1216 responds to the message by adding the decryption key for the program to its memory and stores the duration information.

The NIM 1216 may transmit back a confirmation message (step S1304), and the ACC-4000 1242 so informs the access subnetwork controller 1240. The access subnetwork controller 1240 provides a reply message to the Level 1 Gateway 1108 indicating activation of the reception of the ordered pay-per-view event through to the NIM 1216 (step S1305).

The reply message may provide the Level 1 Gateway 1108 with the connection block descriptor for the particular channel, in a manner similar to the activation of a broadcast channel discussed above. In the preferred embodiment, however, the connection block descriptors for pay-per-view channels are supplied to the DET 1218 as part of the activation routine. The ACC-4000 changes the encryption key for those channels frequently, i.e. at least for each new event. Accordingly, actual reception of a pay-per-view event on a particular channel requires only that the ACC-4000 download the decryption key for the particular event, as was done in step S1303.

In response to the reply message (step S1305), the Level 1 Gateway 1108 does transmit a message to the main portion of the DET 1218 through the downstream default signaling channel (step S1306). This message, termed a 'facility' message contains at least the event ID and the start time. The facility message may also include the current time and the end time or duration of the event. If the 'facility' message includes the current time, the DET 1218 uses that time value to reset its internal clock to the current value of the network time clock.

If the network has not already supplied the connection block descriptor, the 'facility' message would provide the connection block descriptor to the main portion of the DET 1218. The main portion of the DET 1218 stores the information from the 'facility' message in memory.

The Level 1 Gateway 1108 provides a confirmation message to the VIP (step S1307) indicating activation of reception of the particular event by the particular VIU, e.g. to allow the VIP to bill the VIU for the purchase of the event. If the VIU ordered the event via a direct interaction with the Level 1 Gateway 1108 (step 1301), the Level 1 Gateway will also transmit an acknowledgement message back through the DET 1218 to provide an acknowledgement display on the associated television (step S1308).

The Level 1 Gateway 1108 transmits a request for pay-per-view event connection to the access subnetwork controller 1240, for each VIU who purchased an event (step 1302), essentially causing a repeat of steps S1302 through S1308 for each of those VIUs. At the time of the event, a user activates the DET 1218 to select viewing of the pay-per-view event. The main portion of the DET 1218 accesses the stored connection block descriptor for the channel carrying the event. The main portion of the DET 1218 supplies a 'connect' message to the NIM requesting that the NIM supply signals from the specified RF channel number to the main portion of the DET. In response to the RF channel number, the selected NIM 1216 tunes to the identified channel, and the NIM 1216 uses the encryption key from its memory to descramble the tuned RF signal. As a result, the NIM 1216 passes digital signals from the RF channel through the interface to the main portion of the DET 1218. In turn, the main portion of the DET 1218 uses the PID value from the connection block descriptor to begin MPEG decoding of the selected program and provide signals to the associated television set so as to provide an audio/visual display of the ordered pay-per-view event.

The 'facility' message from the Level 1 Gateway 1108 to the DET 1218 (step S1306) could initiate additional control functions. As noted, the 'facility' message specifies the start time of the event. In one example of an additional control function, a software application downloaded by the selected VIP may provide additional automatic operations for pay-per-view event viewing. Specifically, the software may respond to the start time either to display information on the television indicating that the purchased event is about to begin and recommending that the viewer tune to the correct channel to view the purchased event. Alternatively, the software may automatically turn the DET 1218 on and select the appropriate channel for reception and decoding at the beginning of the event.

Although not illustrated in the process flow of FIGS. 12 and 13 for simplicity, the pay-per-view event information supplied by the vendor will specify at least a preview window and may specify a cancellation time period. The ACC-4000 may instruct the relevant APD 1134 to modify the encryption key at different times, e.g. use a first key during the preview and a second key for the remainder of the event, and then provide the appropriate decryption keys for use at the correct times to the various NIMs 1216. Alternatively, the preview may be transmitted 'in-the-clear' without encryption. In this later case, the ACC-4000 only supplies the correct encryption and decryption keys, to the APD 1174 and the NIMs 1216 respectively, together with instructions to begin use the respective keys at the end of the preview window.

At the end of a pay-per-view event, the ACC-4000 supplies a new encryption key to the APD 1134. In response, the APD 1134 changes to encryption of the program channel, and the old decryption key stored in the NIMs for the previous event is no longer valid. The NIM/DETs not having the corresponding new decryption key can not receive and decode any new information transmitted on the pay-per-view channel.

In the preferred embodiment, the Level 1 Gateway 1108 maintains a list of the VIUs successfully activated to receive each purchased pay-per-view event. The Level 1 Gateway 1108 forwards this list to an appropriate billing system within the OSS 1109. If the VIP has elected to bill the VIUs for pay-per-view purchases, the purchase statistics go from the Level 1 Gateway to the CABS system to provide an itemized bill to the VIP who in turn adds the correct amounts to the VIUs' bills. Alternatively, the purchase statistics go from the Level 1 Gateway to the CRIS system so that the network operations company can bill the VIUs directly.

IMTV sessions through the network of FIGS. 5–9 will be discussed below with regard to the simplified message flow diagrams of FIG. 14A and 14B.

Some limited applications on the Level 1 Gateway 1108 may utilize the default channels. However, for most purposes, the default channels carry only certain limited initial signaling, particularly in the downstream direction. For most applications running on the Level 1 Gateway 1108, the exchange of signals between the Level 1 Gateway 1108 and the DET 1218 requires more bandwidth, at least in the downstream channel, than is available through the default channel. The Level 1 Gateway 1108 therefore controls the network to set up an interactive session between itself and the DET 1218 (See FIG. 14A). If a result of that session is a selection of an IMTV VIP 1260, the Level 1 Gateway 1108 then interacts with the relevant network control elements to establish a new communication session between the VIP's equipment and the DET 1218 (see FIG. 14B).

In the preferred embodiment, an interactive session begins when the user activates a button on the remote control specifying the Level 1 Gateway 1108. In response, the DET 1218 transmits an initial services request message through the upstream default channel through the access subnetwork and the ATM subnetwork to the Level 1 Gateway 1108 (step 1401 in FIG. 14A). Based on the VPI/VCI value and/or identification information in the message, the Level 1 Gateway identifies the DET 1218.

The Level 1 Gateway 1108 transmits a connection request to the access subnetwork controller 1240 through the dedicated virtual circuit through the ATM backbone subnetwork 1106. The request at least identifies the DET 1218 and specifies the desired downstream bandwidth. If the signaling application for the Level 1 Gateway predicts a need for more upstream bandwidth than provided by the upstream default channel, this request or a separate request from the Level 1 Gateway will request additional upstream capacity. For convenience of discussion here, it is assumed that the Level 1 Gateway only requests a downstream channel and will rely on the upstream default channel for upstream signaling transport.

In response to the connection establishment request, the access subnetwork controller 1240 first identifies an APD 1174 having available bandwidth capable of supporting the requested session and allocates a VPI/VCI value preassigned to that APD. The Level 1 Gateway 1108 will use a standard data transmission format, not necessarily MPEG. For non-MPEG transmissions, the APD 1174 will extract data from ATM cell payloads and encapsulate the data in MPEG-2 packets. Preferably the APD 1174 is preprogrammed to process cells having the allocated VPI/VCI value in a particular manner, i.e. to provide the correct PID values in the resultant MPEG packets and to output the packets on an identified one of the five output rails to result in transmission over a known RF channel. If not preprogrammed, the access controller 1240 instructs the assigned APD 1174 to provide the correct PID value in the MPEG packets and to output the packets on the identified output rail for result in transmission over a known RF channel. The access subnetwork controller 1240 therefore effectively determines the connection block descriptor that will apply for this session between the Level 1 Gateway 1108 and the DET 1218.

The access subnetwork controller 1240 also identifies the NIM or the DET to the ACC-4000 1242 and indicates the relevant network logical channel number. If the channel is encrypted, the ACC-4000 1242 sets up a communication with the NIM 1216 and downloads a decryption key for the channel for storage in the NIM (step S1403). More specifically, the ACC-4000 1242 transmits a message containing the decryption key to the NIM 1216 using the default channel and the PID value assigned as the NIM network address for the particular DET 1218. The NIM 1216 monitoring its default channel, recognizes its network address and captures the packet of message data for further processing. In the present case, the NIM 1216 responds to the message by adding the decryption key for the program to its memory.

The NIM 1216 may transmit back a confirmatory reply message (step S1404), and the ACC-4000 1242 so informs the access subnetwork controller 1240. The access subnetwork controller 1240 provides a reply message to the Level 1 Gateway 1108 indicating activation of the downstream channel through to the NIM 1216 (step S1405). The reply message will include the connection block descriptor (logical channel number, RF channel, and PID value) for the assigned channel and the port ID and VPI/VCI value assigned for this session.

Internally, the Level 1 Gateway 1108 assigns one of its own ATM output ports and a VPI/VCI value for this session with the DET 1218. The Level 1 Gateway 1108 transmits a connection request to the PVC controller 1248 of the ATM subnetwork 1106 (step 1406). This connection request message includes an originating port ID, an originating VPI/VCI value, a terminating port ID, and a terminating VPI/VCI value. The originating port ID and VPI/VCI value are those of the Level 1 Gateway 1108, and the terminating port ID and VPI/VCI value are those of the access subnetwork. The connection request to the PVC controller 1248 also specifies bandwidth.

The PVC controller 1248 provides appropriate instructions to the ATM hub switch 1252 and/or to an ATM access switch (not shown) to establish an active ATM virtual circuit between the output port of the Level 1 Gateway 1108 and the assigned input port of the APD 1174 and to perform the necessary translation(s) between the originating VPI/VCI and the terminating VPI/VCI. The PVC controller 1248 then provides a confirmatory reply back to the Level 1 Gateway 1108 (step 1407).

The Level 1 Gateway 1108 transmits a 'set-up' message containing the connection block descriptor to the main portion of the DET 1218 through the downstream default signaling channel (step S1408). The main portion of the DET 1218 stores the connection block descriptor and returns a confirmation message back through the upstream default signaling channel (step S1409). At this point, the Level 1 Gateway 1108 can begin transmitting downstream information through the assigned virtual circuit through the ATM backbone subnetwork 1106 and the assigned logical channel through the access subnetwork. The main portion of the DET 1218 supplies a 'connect' message (not shown) to the NIM 1216 requesting that the NIM supply signals from the RF channel number specified in the connection block descriptor to the main portion of the DET. In response to the RF channel number, the selected NIM 1216 tunes to the identified channel, and the NIM 1216 uses the decryption key from its memory to descramble the tuned RF signal. As a result, the NIM 1216 passes digital signals from the RF channel through the interface to the main portion of the DET 1218. In turn, the main portion of the DET 1218 uses the PID value from the connection block descriptor to begin decoding and processing of MPEG packetized signals from the Level 1 Gateway 1108.

A two-way interactive session ensues between the VIU operating the DET 1218 and the Level 1 Gateway 1108 (step 1410). Although the Level 1 Gateway may request and obtain additional upstream signaling bandwidth, the example given relies only on the upstream default channel for signaling from the DET 1218 up to the Level 1 Gateway 1108. The Level 1 Gateway 1108 transmits information back to the DET 1218 for processing and/or presentation to the VIU via the newly established link downstream to the DET.

Although encapsulated in MPEG packets, either by the Level 1 Gateway itself or preferably by the APD 1174, the data can be video, audio or user data. The user data typically is text, signaling and control information for processing by the microprocessor in the main portion of the DET 1218. The information from the Level 1 Gateway may comprise still frame video information, limited and/or full motion video, as well as accompanying audio.

The interactive session between the VIU and the Level 1 Gateway 1108 can relate to a variety of applications available through that Gateway. Examples of such applications include on-line pay-per-view event ordering, parental control functionalities, help, change PIN numbers, customize menus, select menu languages, check billing/account information, service changes/upgrades, etc. Many of these applications run entirely within the Level 1 Gateway 1108 and do not result in establishment of any further connection of the DET 1218 to other elements of the network.

Other applications running on the Level 1 Gateway 1108 result in a need to establish a new connection between the DET 1218 and some other service element on the network. The connection may go to an element of OSS 1109, e.g. to allow the VIU to review and/or modify her services. This type of situation also results when a user selects an IMTV service type VIP. In this later case, the preferred embodiment of the network will establish a broadband downstream connection between the VIP 1262 and the DET 1218 and at least an upstream signaling connection between the DET 1218 and the VIP 1262. Typically, the VIP has a level 2 gateway 1262 and a broadband multi-media server 1264. The broadband server 1264 transmits broadband information together with downstream signaling messages from the level 2 gateway 1262 through the downstream channel. The level 2 gateway 1262 receives signaling messages from the main portion of the DET 1218 through the somewhat narrower upstream channel.

In the present example, now assume that the interactive session with the Level 1 Gateway 1108 (S1410) results in the VIU selecting a specific one of the IMTV VIPs connected to the enhanced video dial tone network (step S1411 in FIG. 14B).

In response, to the selection message from the DET (S1411), the Level 1 Gateway 1108 communicates over the locked up or dedicated "permanent" virtual circuit through the ATM backbone subnetwork 1106 with the level 2 gateway 1262 of the selected VIP 1260. Specifically, the Level 1 Gateway 1108 contacts the level 2 gateway and indicates, through a standard message, that it has a customer calling (step S1412). The Level 1 Gateway 1108 identifies the customer to the level 2 gateway, e.g. by the E.164 address of the DET 1218. The Level 1 Gateway 1108 may also provide CPE identification information and CPE-type information for the DET 1218, in a manner similar to the procedure discussed above with regard to FIGS. 1 and 2. The VIP's level 2 gateway 1262 may accept or reject the call after receiving the initial request indicating a customer is available, in essentially the same manner as described earlier with regard to steps S8, S8₂ and S8₃ in FIG. 2.

If the VIP accepts the call, the level 2 gateway 1262 identifies a server output port and VPI/VCI value available for this session. The level 2 gateway 1262 sends an acceptance message back to the Level 1 Gateway 1108 through the dedicated virtual circuit through the ATM backbone subnetwork 1106 (step S1413). This message includes the server port ID, the VPI/VCI value and the downstream bandwidth. The level 2 gateway 1262 may also identify a signaling port on the level 2 gateway, a second VPI/VCI value and a bandwidth for the necessary upstream signaling connection and include this information in the acceptance message.

The Level 1 Gateway 1108 will send requests to the respective subnetwork controllers to establish the broadband downstream link and the narrowband upstream signaling link. In a preferred embodiment, the Level 1 Gateway would transmit a single request to each subnetwork controller. The ATM backbone subnetwork inherently provides two-way connections of specified bandwidths in each direction. The access subnetwork, however, may be viewed as only providing individual one-way connections. As a result, in an initial implementation, set-up of the downstream and upstream channels through the access subnetwork will require two separate requests and two separate procedures for establishing the desired channels.

FIG. 14B illustrates a multi-connection request procedure for establishing the broadband downstream channel and the upstream signaling channel through the access subnetwork. In the illustrated example, the Level 1 Gateway 1108 first requests the downstream channel and then requests the upstream channel. Other sequences are possible to establish the same upstream and downstream channels.

At step S1414, the Level 1 Gateway 1108 transmits a connection request for the downstream channel to the access subnetwork controller 1240 through the dedicated virtual circuit through the ATM backbone subnetwork 1106. The request at least identifies the DET 1218 and specifies the desired downstream bandwidth. In response to the connection establishment request, the access subnetwork controller 1240 first identifies an APD 1174 having available bandwidth capable of supporting the newly requested session. The APD 1174 has a VPI value and a range of VCI values assigned thereto. The access subnetwork controller 1240 allocates a VCI value to this session and thereby defines an assigned VPI/VCI value for the downstream part of this session.

In the present example, assume that the IMTV VIP's equipment 1260 transmits all downstream data in MPEG packets, both for program information and in-band signaling messages ('user data'). Preferably the APD 1174 is preprogrammed to process cells having the assigned VPI/VCI value in a particular manner, i.e. to provide the correct PID values in the reconstructed MPEG packets and to output the packets on an identified one of the five output rails to result in transmission over a known RF channel. If not preprogrammed, the access controller 1240 instructs the assigned APD 1174 to provide the correct PID value in the MPEG packets and to output the packets on the identified output rail for result in transmission over a known RF channel. The access subnetwork controller 1240 therefore effectively determines the connection block descriptor (logical channel number, RF channel and PID value) that will apply for the downstream portion of the session between the server 1264 and the DET 1218.

The access subnetwork controller 1240 also identifies the NIM or the DET to the ACC-4000 1242 and indicates the relevant network logical channel number. If the assigned channel is encrypted, the ACC-4000 1242 sets up a communication with the NIM 1216 and downloads a decryption key for the channel for storage in the NIM (step S1415). More specifically, the ACC-4000 1242 transmits a message containing the decryption key to the NIM 1216 using the default channel and the PID value assigned as the NIM network address for the particular DET 1218. The NIM 1216 monitoring its default channel, recognizes its network address and captures the packet of message data for further processing. In the present case, the NIM 1216 responds to the message by adding the decryption key for the program to its memory.

The NIM 1216 may transmit back a confirmation message (step S1416), and the ACC-4000 1242 so informs the access subnetwork controller 1240. The access subnetwork controller 1240 provides a reply message to the Level 1 Gateway 1108 indicating activation of the downstream channel through to the NIM 1216 (step S1417). The reply message will include the connection block descriptor (logical channel number, RF channel, and PID value) for the assigned channel, as well as the port ID and VPI/VCI value assigned for this session.

The Level 1 Gateway 1108 next sends a connection request to the access subnetwork controller 1240 for an upstream signaling channel (step S1418). Based on available resources identified within its internal databases, the access subnetwork controller assigns RF bandwidth and an identifier for the upstream channel between the NIM and the demodulator 1192 and associated network controller (NC) 1194. The access subnetwork controller also identifies a port identifier and VPI/VCI value for the upstream communication.

The port and VPI value for the upstream signaling correspond to the ATM router 1196 and one of the network controllers (NCs) 1194 in the local video access node 1112 serving the VIU. The access subnetwork controller 1240 instructs the assigned network controller 1192 to convert upstream messages carrying the assigned identifier (temporarily corresponding to the DET 1218) to an Ethernet format for transport through the local video access node 1112 to the ATM router 1196. In accord with this instruction, the network controller will apply an Ethernet address which the ATM router 1196 will map into the assigned VPI/VCI value when it encapsulates the message into ATM cell(s).

The access subnetwork controller 1240 transmits a reply message to Level 1 Gateway 1108 (step 1419). The reply message contains the assigned port ID and VPI/VCI value for the upstream signaling channel.

The Level 1 Gateway 1108 next transmits a connection request to the PVC controller 1248 of the ATM subnetwork 1106 (step S1420). This connection request includes an originating port ID, an originating VPI/VCI value, a terminating port ID, a terminating VPI/VCI value and bandwidth, for both the upstream connection and the downstream connection. The originating IDs and VPI/VCI values are those of the server 1264 and associated level 2 gateway 1262, as previously assigned by the level 2 gateway. The terminating IDs and VPI/VCI values are those of the access subnetwork, assigned by the access subnetwork controller 1240.

The PVC controller 1248 provides appropriate instructions to the ATM hub switch 1252 and/or to an ATM access switch (not shown) to establish an active two-way ATM virtual circuit between the specified VIP ports and the assigned ports of the APD 1174 and the ATM router 1196. The PVC controller 1248 also instructs the switch(es) to perform the necessary translation(s) between the originating VPI/VCIs and the terminating VPI/VCIs for transmissions in both directions through the ATM backbone subnetwork 1106. The PVC controller 1248 then provides a confirmatory reply back to the Level 1 Gateway 1108 (step S1421).

The Level 1 Gateway 1108 transmits a 'set-up' message to the main portion of the DET through the still existing downstream interactive link with the DET 1218 (step S1422). This message contains the connection block descriptor for the downstream channel and the RF channel assignment and packet identifier assigned for the upstream channel. The main portion of the DET 1218 stores the connection block descriptor in its memory and supplies the upstream channel information to the control processor of the NIM 1216 for use in transmitting upstream signaling messages. The DET 1218 returns a confirmation message back through the upstream signaling channel to the Level 1 Gateway 1108 (step S1423). In the present example, this message goes through the upstream default channel.

The 'set-up' message and corresponding reply message also indicate an end to the current session between the Level 1 Gateway 1108 and the DET 1218. The Level 1 Gateway transmits a message to the level 2 gateway 1262 indicating establishment of the broadband and signaling links (step S1424), and the Level 1 Gateway 1108 initiates a billing record for the call. The Level 1 Gateway also transmits tear down instructions to both the PVC controller 1248 and the access subnetwork controller 1240 to take down the upstream and downstream session links between the Level 1 Gateway 1108 and the DET 1218 (step S1425).

At this point, the level 2 gateway 1262 instructs the server 1264 to begin transmitting downstream information through the assigned virtual circuit through the ATM backbone subnetwork 1106 and the assigned logical network channel through the access subnetwork. The main portion of the DET 1218 supplies a 'connect' message (not shown) to the NIM 1216 requesting that the NIM supply signals from the RF channel number specified in the connection block descriptor to the main portion of the DET. In response to the RF channel number, the selected NIM 1216 tunes to the identified channel, and the NIM 1216 uses the decryption key from its memory to descramble the tuned RF signal. As a result, the NIM 1216 passes digital signals from the RF channel through the interface to the main portion of the DET 1218. In turn, the main portion of the DET 1218 uses the PID value from the connection block descriptor to begin decoding and processing of MPEG packetized signals from the Level 1 Gateway 1108.

For each upstream signaling message, e.g. responsive to a user input, the processor in the main portion of the DET 1218 supplies a message to the processor of the NIM 1216. Under the later processor's control, the NIM packetizes the message using the assigned identifier and transmits the packet(s) upstream over the assigned RF channel, using QPSK modulation. The demodulator 1192 demodulates the transmitted message and supplies the packet(s) to the network controller 1194. The network controller 1194 in turn routes the message over Ethernet 1200 to the ATM router 1196. The ATM router 1196 encapsulates the message into ATM cell(s), applies the upstream terminating VPI/VCI value assigned by the access subnetwork controller 1240 and outputs those cells to the ATM subnetwork 1106. The ATM subnetwork 1106 routes the cells to the port of the level 2 gateway 1262 and maps the upstream terminating VPI/VCI value into the upstream originating VPI/VCI value originally assigned by the level 2 gateway.

Using these established downstream and upstream paths, a two-way interactive session ensues between the VIU operating the DET 1218 and the IMTV VIP system 1260 (step S1426).

The Level 1 Gateway 1108 times periods for confirmations or reply messages from the subnetwork controllers 1240 and 1248 and the DET 1218 in a manner substantially similar to that of the embodiment of FIGS. 1 and 2 to identify processing failures. Although not discussed in detail with regard to this embodiment, the Level 1 Gateway 1108 will provide displays to the VIU regarding various network conditions relating to IMTV call processing which are similar to the displays shown in FIGS. 2A to 2M.

When a broadband session ends, e.g. as indicated by an exchange of appropriate messages between the DET 1218 and the level 2 gateway 1262, the level 2 gateway instructs the Level 1 Gateway 1108 to tear down the broadband session connections. The instruction includes the DET identifier (typically the E.164 address) and the VIP's port identification numbers for the VIP ports used for the broadband and signaling communications. In response, the Level 1 Gateway 1108 stops the billing timing for that broadband session and transmits an instructions to the PVC controller 1248 and the access subnetwork controller 1240 to tear down the broadband and signaling connections through the respective subnetworks.

The Level 1 Gateway 1108 creates a usage record for each IMTV session which will at least identify the VIU, the VIP, the start time and either the duration or the end time of the session. The Level 1 Gateway 1108 periodically uploads these usage records to billing systems within the OSS 1109. The billing systems bill the VIP or the VIU in precisely the same manner as discussed above with regard to the embodiment of FIG. 1.

The Level 1 Gateway 1108 creates a log record that contains specific information including the time that the Level 1 Gateway received or sent each message. The subnetwork controllers provide failure reports, indicating the session to which the failure relates, to the Level 1 Gateway 1108. The Level 1 Gateway 1108 then notifies the level 2 gateway 1262 and possibly the DET 1218 of the network failure and terminates the billing record for the IMTV session.

For simplicity, the above discussion assumed that the IMTV VIP 1260 determined the downstream bandwidth for the interactive session when the Level 1 Gateway 1108 first notified the level 2 gateway 1262 of the incoming call. The present invention will also permit the VIP to renegotiate the bandwidth for either the downstream or the upstream connections, during an ongoing IMTV session. For example, at call set-up, the VIP might arbitrarily select a medium bandwidth requirement. If the VIU orders a high definition video requiring a higher bandwidth during the session, the VIP's level 2 gateway 1262 would transmit a request for higher bandwidth to the Level 1 Gateway 1108. The Level 1 Gateway would instruct the subnetworks to tear down existing connections and establish new connections as needed, in a manner similar to the procedure starting at step S1414 in FIG. 14B, to set-up the new higher bandwidth downstream link and/or modify the upstream signaling channel. The Level 1 Gateway 1108 would record the time and new bandwidth, as part of the record of this session.

Commonly assigned U.S. Pat. No. 5,544,161, entitled, "ATM Packet Demultiplexer for Use in a Full Service Network Having Distributed Architecture," provides a more detailed description of the structure and operation of the APDs, the NIM and the DET, and the description of those elements from that case is incorporated herein by reference.

Although preferred embodiments of the Level 1 Gateway operation and digital video distribution networks using that Gateway in accord with the invention have been described in detail above, it should be clear that the present invention is capable of numerous modifications as would be apparent to one of ordinary skill in the art. For example, the detailed discussion of the Level 1 Gateway above concentrated on data/signaling communications between that Gateway and the DET. Consequently selection menus, etc., from the Level 1 Gateway took the form of text, graphics and/or still frame data. The Level 1 Gateway could transmit full motion MPEG encoded video information through the network in essentially the same manner as the IMTV VIP's equipment. Also, the Level 1 Gateway need not be a stand alone device. All or part of the functionality of that Gateway may be combined with that of other network components, such as the PVC controller or the access subnetwork controller. These and any other apparent modifications all fall within the purview of the appended claims.

As noted, the preferred embodiment utilizes an ATM switch based architecture for the backbone subnetwork $15_1$. However, a variety of other point-to-point routing technologies could be used. For example, the ATM switches could be replaced with digital cross connect switches, similar to those used in the embodiment of FIG. 1.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A communication network comprising:

a plurality of digital entertainment terminals for receiving and processing digital broadband information and transmitting control signals in response to user inputs;

a plurality of interactive information provider systems;

a backbone subnetwork providing point-to-point two-way communication sessions for broadband interactive multimedia communications signals with a selected one of the interactive information provider systems;

a backbone subnetwork controller controlling establishment of point-to-point communication sessions through the backbone subnetwork;

an access subnetwork receiving digital broadband information signals from the selected interactive information provider system from the backbone subnetwork for transmission to one of the digital entertainment and supplying control signals from the one digital entertainment terminal to the backbone subnetwork for transmission to the selected interactive information provider system, and receiving broadcast digital broadband information signals from a plurality of broadcast information providers for selective distribution to the digital entertainment terminals;

an access subnetwork controller controlling the access subnetwork to provide two-way communications between the one digital entertainment terminal and the backbone subnetwork and to control access to the broadcast digital broadband information signals through the digital entertainment terminals; and a gateway interacting with the backbone subnetwork controller, the access subnetwork controller and at least the one digital entertainment terminal to establish communication between the one digital entertainment terminal and the selected interactive information provider system and interacting with the access subnetwork controller to make certain broadcast services available to authorized digital entertainment terminals.

2. A communication network as in claim 1, wherein the backbone subnetwork comprises at least one asynchronous transfer mode (ATM) switch.

3. A communication network as in claim 2, wherein the backbone subnetwork controller comprises a permanent virtual circuit (PVC) controller.

4. A communication network as in claim 1, wherein the access subnetwork comprises:

a broadcast provider interface receiving digital signals from the broadcast information providers, said broadcast provider interface comprising:

(1) means for combining asynchronous transfer mode (ATM) cell streams having specified VPI/VCI values and each containing one of the digital signals into a consolidated broadcast signal, and (2) means for optically transmitting the consolidated broadcast signal;

a plurality of broadcast headend nodes receiving the optically transmitted consolidated broadcast signal, each broadcast headend node comprising:

(i) at least one ATM converter receiving two or more ATM cell streams having specified VPI/VCI values from the consolidated broadcast signal and recovering two or more of the digital signals from the received ATM cell streams, (ii) at least two modulators, each modulator modulating a recovered digital signal onto an assigned channel, (iii) a combiner combining modulated channel signals from the modulators into a first combined spectrum signal, and (iv) means for optically transmitting the first combined spectrum signal;

groups of central offices, each group of central offices receiving the first combined spectrum signal from a broadcast headend node servicing the group, each central office comprising:

(a) means for producing at least one additional signal;

(b) a combiner combining the at least one additional signal with the received first combined spectrum signal to form a second combined spectrum signal, and (c) means for transmitting the second combined spectrum signal; and for each central office, a local distribution network transporting the second combined spectrum signal from that central office to a group of the digital entertainment terminals.

5. A communication network as in claim 4, wherein the backbone subnetwork comprises an ATM network.

6. A communication network as in claim 5, wherein the means for producing at least one additional signal comprises:

another ATM converter which receives an ATM cell stream having a specified VPI/VCI value from the ATM network and recovers a digital broadband signal from the received ATM cell stream; and a modulator modulating the recovered digital signal onto an assigned channel.

7. A communication network comprising:

a plurality of user terminals receiving and processing broadband information and transmitting control signals in response to user inputs;

a plurality of information provider systems;

a backbone subnetwork providing point-to-point two-way communication sessions for interactive multimedia communications with a selected one of the information provider systems;

a backbone subnetwork controller controlling establishment of point-to-point communication sessions through the backbone subnetwork;

an access subnetwork providing dynamically allocated two-way communications between one of the user terminals and the backbone subnetwork, and receiving broadcast information signals and distributing the broadcast information signals to authorized ones of the user terminals;

an access subnetwork controller controlling the access subnetwork to provide two-way communications between the one user terminal and the backbone subnetwork and to control terminal authorizations for reception of the broadcast information signals; and a gateway interacting with the backbone subnetwork controller, the access subnetwork controller and the user terminals to control at least the two-way communications through the communication network.

8. A communication network as in claim 7, wherein:

at least one information provider system comprises a server capable of transmitting digital, compressed broadband information through the communication network; and each user terminal is capable of processing digital, compressed broadband information received through the communication network to provide presentations of broadband information to the user.

9. A communication network as in claim 7, further comprising an operations and support system supplying provisioning data to the gateway to control operations thereof.

10. A communication network as in claim 9, wherein:

the backbone subnetwork comprises at least one asynchronous transfer mode (ATM) switch; and the operations and support system communicates with the gateway through the at least one asynchronous transfer mode (ATM) switch.

11. A communication network comprising:
   a plurality terminals receiving and processing broadband information;
   a plurality of information provider systems;
   a backbone subnetwork providing point-to-point two-way communication sessions for interactive multimedia communications with a selected one of the information providers;
   an access subnetwork receiving broadcast information signals and distributing the broadcast information signals to authorized ones of the terminals;
   an access subnetwork controller controlling terminal authorizations for reception of the broadcast information signals; and
   a gateway interacting with the access subnetwork controller to activate reception of identified ones of the broadcast information signals at identified ones of the terminals.

12. A communication network as in claim 11, wherein:
   at least one information provider system comprises a server capable of transmitting digital, compressed broadband information through the communication network; and
   each user terminal is capable of processing digital, compressed broadband information received through the communication network to provide presentations of broadband information to the user.

13. A communication network as in claim 11, an operations and support system supplying provisioning data to the gateway to control operations thereof.

14. A communication network as in claim 12, wherein:
   the backbone subnetwork comprises at least one asynchronous transfer mode (ATM) switch; and
   the operations and support system communicates with the gateway through the at least one asynchronous transfer mode (ATM) switch.

* * * * *